(12) United States Patent
Takahara et al.

(10) Patent No.: US 9,929,660 B2
(45) Date of Patent: Mar. 27, 2018

(54) ELECTRIC POWER CONVERSION DEVICE

(71) Applicant: Mitsubishi Electric Corporation, Chiyoda-ku (JP)

(72) Inventors: Takaaki Takahara, Chiyoda-ku (JP); Satoshi Murakami, Chiyoda-ku (JP); Ryota Kondo, Chiyoda-ku (JP); Masaki Yamada, Chiyoda-ku (JP); Naohisa Uehara, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/327,072

(22) PCT Filed: Sep. 25, 2015

(86) PCT No.: PCT/JP2015/077174
§ 371 (c)(1),
(2) Date: Jan. 18, 2017

(87) PCT Pub. No.: WO2016/063678
PCT Pub. Date: Apr. 28, 2016

(65) Prior Publication Data
US 2017/0237354 A1    Aug. 17, 2017

(30) Foreign Application Priority Data

Oct. 20, 2014 (JP) .................................. 2014-213396

(51) Int. Cl.
*H02M 3/335* (2006.01)
*H02M 1/08* (2006.01)
(Continued)

(52) U.S. Cl.
CPC .......... *H02M 3/33546* (2013.01); *H02M 1/08* (2013.01); *H02M 1/42* (2013.01); *H02M 2001/0009* (2013.01)

(58) Field of Classification Search
CPC ...... H02M 3/33546; H02M 1/08; H02M 1/42; H02M 2001/0009
See application file for complete search history.

(56) References Cited

U.S. PATENT DOCUMENTS

2008/0101096 A1* 5/2008 Takayanagi ........... H02J 7/0013
363/17
2009/0290385 A1* 11/2009 Jungreis .............. H02M 1/4241
363/17

FOREIGN PATENT DOCUMENTS

| JP | 2002-084680 A | 3/2002 |
| JP | 2005-229731 A | 8/2005 |

(Continued)

OTHER PUBLICATIONS

International Search Report dated Nov. 24, 2015 in PCT/JP2015/077174 filed Sep. 25, 2015.

(Continued)

*Primary Examiner* — Emily P Pham
(74) *Attorney, Agent, or Firm* — Oblon, McClelland, Maier & Neustadt, L.L.P.

(57) ABSTRACT

An electric power conversion device includes a transformer composed of three or more windings magnetically coupled with each other, wherein power supply sources, are connected to at least two windings, via switching circuits, a load is connected to at least one winding, and a control circuit temporally divides, within one switching period, a total ON time during which power is supplied, in accordance with the number of the power supply sources, to supply power, the one switching period being the minimum repetitive unit during which power is supplied alternately. The control circuit allocates the divided ON times to the respective switching circuits, and the switching circuits, supply power (Continued)

from the power supply sources, to the load side during the allocated ON times, respectively.

19 Claims, 73 Drawing Sheets

(51) Int. Cl.
*H02M 1/42* (2007.01)
*H02M 1/00* (2006.01)

(56) References Cited

FOREIGN PATENT DOCUMENTS

| JP | 2008-118727 A | 5/2008 |
| JP | 4263736 B2 | 5/2009 |
| JP | 2012-120275 A | 6/2012 |

OTHER PUBLICATIONS

Office Action dated Nov. 28, 2017 in corresponding Japanese Patent Application No. 2016-555142, with machine-generated translation.

* cited by examiner

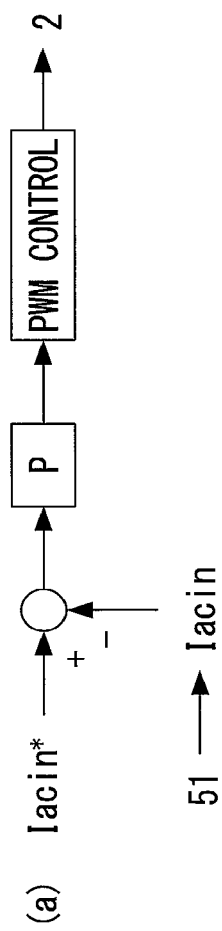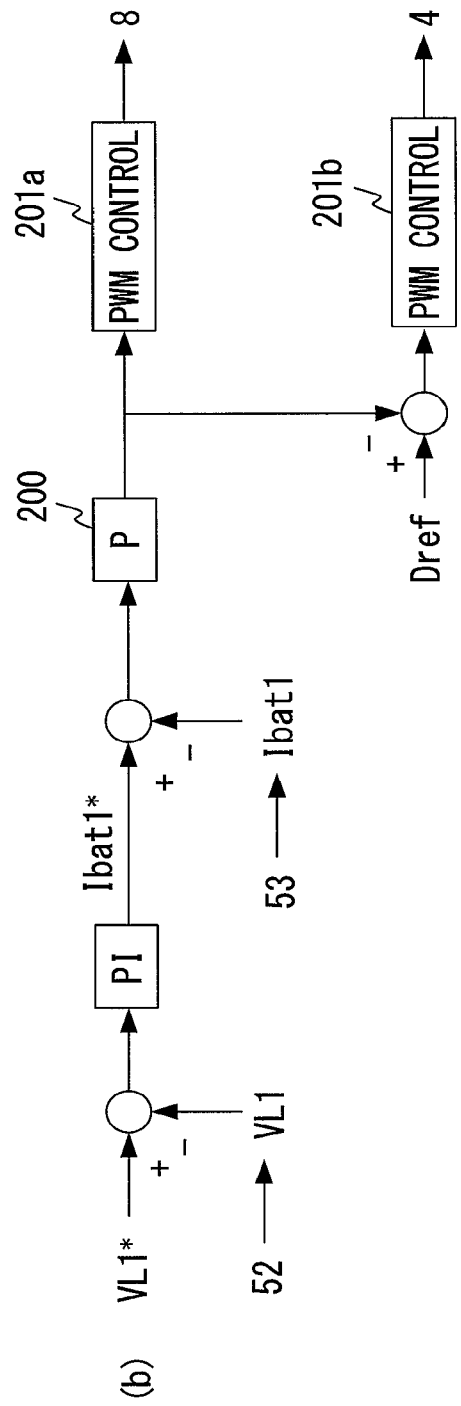
FIG. 27

FIG. 28
(a) 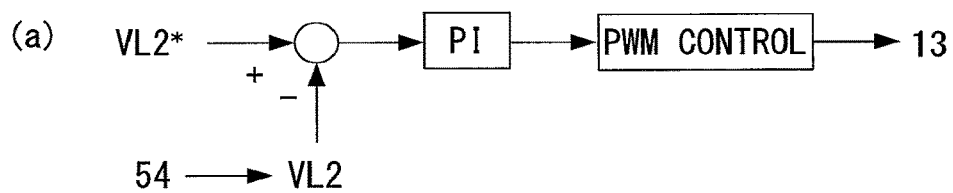
(b) 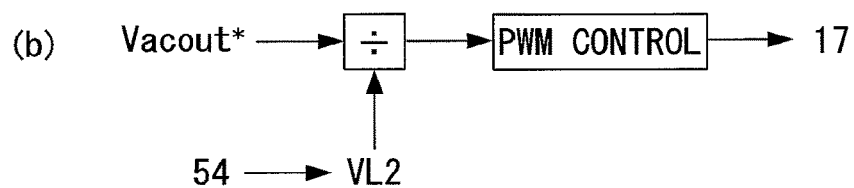
(c) 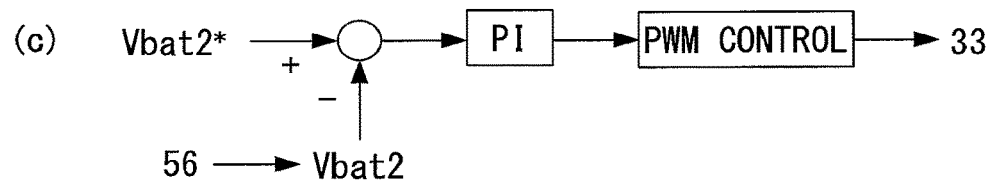

FIG. 32
(a) 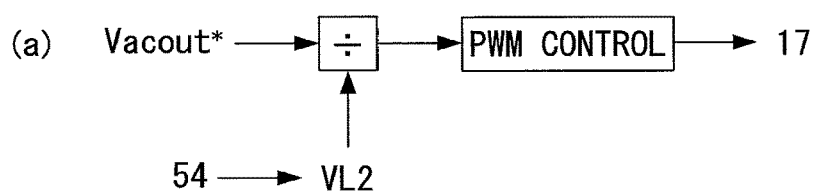
(b) 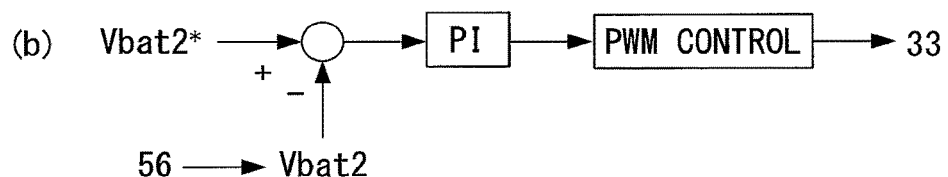

FIG. 60
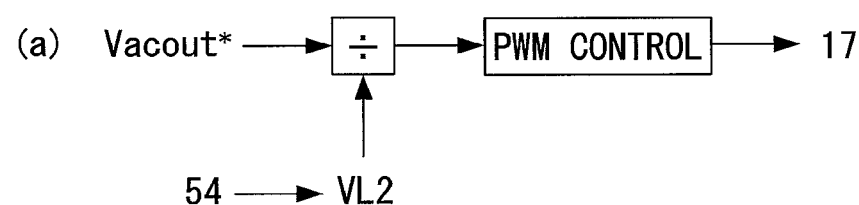
(a)
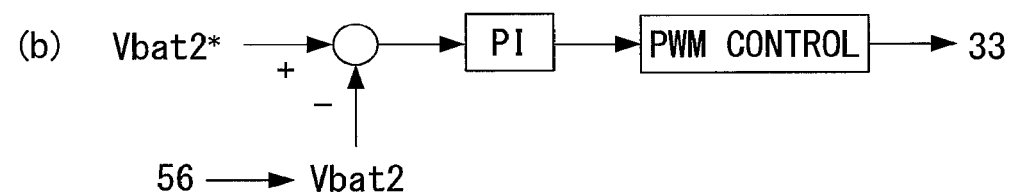
(b)

ELECTRIC POWER CONVERSION DEVICE

TECHNICAL FIELD

The present invention relates to an electric power conversion device capable of supplying power from a plurality of power supplies to a load and capable of switching the power supply source in accordance with the states of the load and the power supplies.

BACKGROUND ART

Some conventional electric power conversion devices use complex windings for a transformer, to obtain a multioutput power supply configuration (for example, see Patent Document 1 below). That is, an object of the conventional-art electric power conversion device is to, in charging two DC power supplies with power from an AC power supply using a transformer having complex windings magnetically coupled with each other, set a priority on one of the DC power supplies to be charged. In the case where there is no AC power supply, one of the DC power supplies is used as a supply source to charge the other DC power supply by using a bidirectional switch.

CITATION LIST

Patent Document

Patent Document 1: Japanese Patent No. 4263736

SUMMARY OF THE INVENTION

Problems to be Solved by the Invention

The conventional electric power conversion device described in the above Patent Document 1 is provided with a detection unit for detecting whether or not AC input voltage is supplied, and when determining from a result of detection by the detection unit that AC input voltage is not supplied, supplies power from a DC power supply. However, depending on the power capacity on the AC input side, there is a situation in which power cannot be sufficiently supplied to a load even though the AC input voltage exists.

The present invention has been made to solve the above problem, and an object of the present invention is to provide an electric power conversion device in which a plurality of power supplies are connected to a plurality of windings magnetically coupled with each other and which is capable of continuously and stably supply power to a load by using a plurality of power supply sources, e.g., in the case where input power from one power supply is insufficient for the load power, by supplying power also from another power supply as well as the one power supply.

Solution to the Problems

An electric power conversion device according to the present invention includes:

a transformer composed of three or more windings magnetically coupled with each other, power supply sources being connected to at least two of the three or more windings, a load being connected to at least one of the three or more windings;

a plurality of switching circuits via which the at least two of the three or more windings are respectively connected to the power supply sources; and a control circuit for controlling the plurality of switching circuits.

The control circuit temporally divides, within one switching period, a total ON time during which power is supplied, in accordance with the number of the plurality of power supply sources to supply power, the one switching period being a minimum repetitive period during which power is supplied alternately, and the control circuit allocates the temporally divided ON times to the plurality of switching circuits connected to the power supply sources to supply power, respectively.

The plurality of switching circuits operate so as to supply power to a load side from the power supply sources connected to the respective switching circuits, during the respective ON times allocated by the control circuit.

Effect of the Invention

The electric power conversion device according to the present invention can supply power to the load side from any of the plurality of power supply sources in parallel, thus enabling continuous and stable supply of power to the load.

BRIEF DESCRIPTION OF THE DRAWINGS

FIG. 27 is a diagram illustrating a control unit for achieving the power flow shown in FIG. 3 and FIG. 4.

FIG. 28 is a diagram illustrating the control unit for achieving the power flow shown in FIG. 3 and FIG. 4.

FIG. 32 is a diagram illustrating the control unit for achieving the power flow shown in FIG. 3 and FIG. 4.

FIG. 60 is a diagram illustrating the control unit for achieving the power flow shown in FIG. 35 and FIG. 36.

DESCRIPTION OF EMBODIMENTS

Embodiment 1

Figure 1:
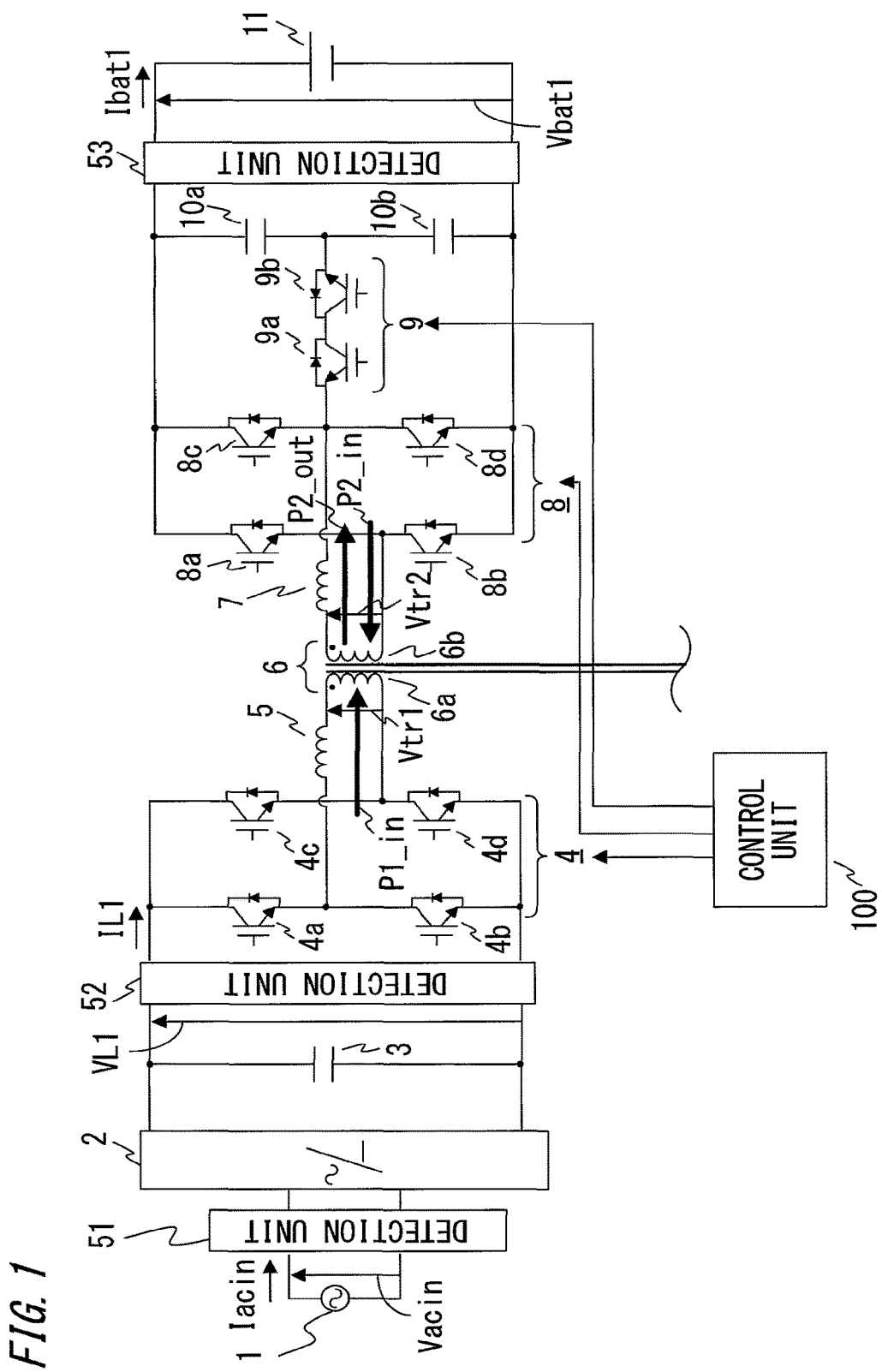
FIG. 1 is a circuit configuration diagram of an electric power conversion device according to embodiment 1 of the present invention.
Figure 2:
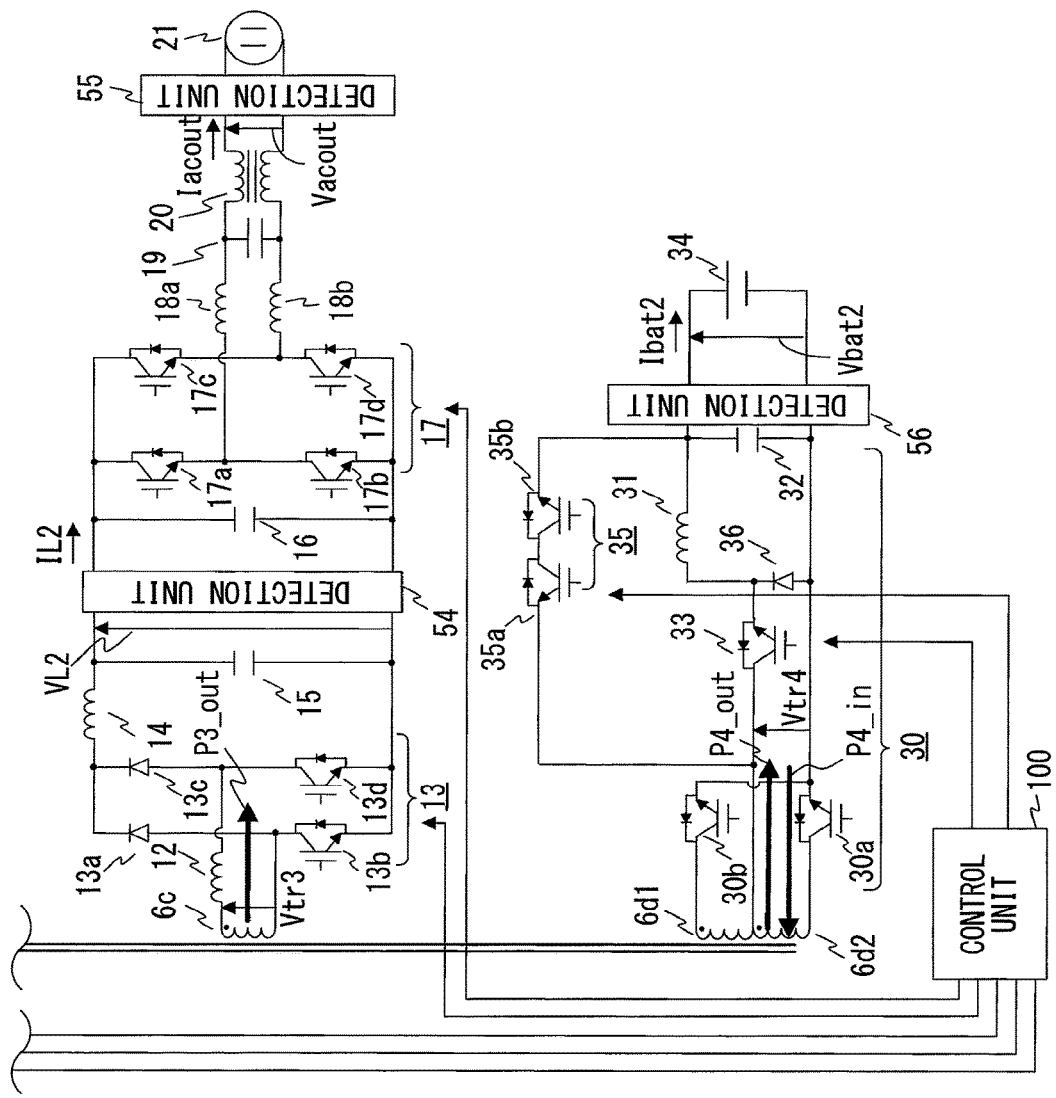
FIG. 2 is a circuit configuration diagram of the electric power conversion device according to embodiment 1 of the present invention.

FIG. 1 and FIG. 2 are circuit configuration diagrams of an electric power conversion device according to embodiment 1 of the present invention.

An AC power supply 1, a first DC power supply 11, and a second DC power supply 34 which serve as a plurality of power supply sources are connected to the electric power conversion device in the present embodiment 1, and the electric power conversion device is connected to a load via an inverter 17 and a load device connection end 21. The electric power conversion device in the present embodiment 1 is applied to, for example, a power supply system around a charger for an electric vehicle. That is, the present embodiment 1 is applicable to a system in which: an AC power supply 1 is a commercial AC power supply, a private power generator, or the like; a first DC power supply 11 is a high-voltage battery for vehicle travelling; a second DC power supply 34 is a lead battery serving as a power supply for a vehicle electric component; and an inverter 17 and a load device connection end 21 operate as a power supply of AC 100V which can be used in the vehicle.

The AC power supply 1 is connected to an AC/DC converter 2 via a voltage current detection unit 51. AC voltage Vacin is stored as DC voltage VL1 in a capacitor 3. The DC voltage VL1 is converted to AC voltage Vtr1 by a first switching circuit 4. The first switching circuit 4 is configured as an inverter having four switching elements 4a to 4d connected in a bridge form, and controls the power reception amount of input power from the AC power supply 1. The AC/DC converter 2 has a rectification function of converting voltage of the AC power supply 1 to DC voltage, and a power factor correcting function of causing the phases of input voltage and input current of the AC power supply 1 to be close to each other. In this case, the AC/DC converter 2 corresponds to a power factor conversion circuit in the claims. The AC/DC converter 2 may have only a rectification function of converting voltage of the AC power supply 1 to DC voltage. In this case, the AC/DC converter 2 corresponds to a rectification circuit in the claims.

A first end of a step-up coil 5 is connected to a first AC end of the first switching circuit 4, and a first end of a first winding 6a on a primary side of a complex winding transformer (hereinafter, simply referred to as a transformer) 6 is connected to a second end of the step-up coil 5. A second end of the first winding 6a is connected to a second AC end of the first switching circuit 4.

A first end of a second winding 6b on a secondary side of the transformer 6 is connected to a first end of a step-up coil 7, and a second end of the step-up coil 7 is connected to a first AC end of a second switching circuit 8 and a first end of a switch 9 including two switching elements 9a and 9b. A second end of the second winding 6b is connected to a second AC end of the second switching circuit 8. The second switching circuit 8 has four switching elements 8a to 8d connected in a bridge form, and functions as a step-up chopper when the first DC power supply 11 is to be charged.

A second end of the switch 9 is connected to a connection point between first ends of two capacitors 10a and 10b connected in series. A DC plus terminal of the second switching circuit 8 is connected to a second end of the capacitor 10a, and to a plus end of the first DC power supply 11 via a voltage current detection unit 53. A DC minus terminal of the second switching circuit 8 is connected to a second end of the capacitor 10b, and to a minus end of the first DC power supply 11 via the voltage current detection unit 53. Here, the two capacitors 10a and 10b have the same capacitance.

A first end of a third winding 6c on a tertiary side of the transformer 6 is connected to a first end of a step-up coil 12, and a second end of the step-up coil 12 is connected to a first AC end of a third switching circuit 13. A second end of the third winding 6c is connected to a second AC end of the third switching circuit 13. The third switching circuit 13 is formed by two legs connected in parallel, one of which is composed of a rectification element 13a and a switching element 13b connected in series, and the other one of which is composed of a rectification element 13c and a switching element 13d connected in series. The third switching circuit 13 normally functions as a rectification circuit, and when DC voltage VL2 occurring on a smoothing capacitor 15 described later is lower than a predetermined value, functions as a step-up chopper.

AC output voltage Vtr3 occurring on the third winding 6c of the transformer 6 is converted to DC voltage by the third switching circuit 13, smoothed by a smoothing coil 14 and the smoothing capacitor 15, and then stored, as DC voltage VL2, in a capacitor 16 via a voltage current detection unit 54. The capacitor 16 is connected to a DC input end of the inverter 17 composed of four switching elements 17a to 17d. To an AC output end of the inverter 17, smoothing coils 18a and 18b, a smoothing capacitor 19, a common mode choke coil 20, a voltage current detection unit 55, and the load device connection end 21 are connected in this order. At the load device connection end 21, an AC power supply Vacout is generated which is a power supply for supplying power to various devices (not shown) (hereinafter, referred to as an AC load) connected to the load device connection end 21.

Fourth windings 6d1 and 6d2 on a quaternary side of the transformer 6 are configured in a center-tap form, and first ends of two switching elements 30a and 30b composing a fourth switching circuit 30 are respectively connected to both ends of the fourth windings 6d1 and 6d2. To a connection point as the center tap between the fourth windings 6d1 and 6d2, a first end of a switching element 33 is connected and also a first end of a switch 35 composed of two switching elements 35a and 35b is connected.

A second end of the switching element 33 is connected to a connection point between a flyback diode 36 and a first end of a smoothing coil 31. A second end of the smoothing coil 31, a second end of the switch 35, and a first end of a smoothing capacitor 32 are mutually connected, and then connected to a plus end of the second DC power supply 34 via a voltage current detection unit 56. Second ends of the switching elements 30a and 30b are connected to each other, and are connected to an anode end of the flyback diode 36, a second end of the smoothing capacitor 32, and a minus end of the second DC power supply 34. The fourth switching circuit 30 is composed of the two switching elements 30a and 30b, the switching element 33, the flyback diode 36, and the smoothing coil 31. A configuration including the switching element 33, the flyback diode 36, and the smoothing coil 31 functions as a step-down chopper.

Here, the first switching circuit 4 connected to the AC power supply 1, the second switching circuit 8 connected to the first DC power supply 11, and the fourth switching circuit 30 connected to the second DC power supply 34 are, in the claims, referred to as switching circuits connected to power supply sources. The second switching circuit 8 and the fourth switching circuit 30 are, in the claims, referred to as a second switching circuit connected to a DC power supply.

Each switching element composing the first to fourth switching circuits 4, 8, 13, and 30, and each switching element composing the inverter 17 may be IGBTs (Insulated Gate Bipolar Transistor), MOSFETs (Metal Oxide Semiconductor Field Effect Transistor), or the like. A control unit 100 has a function of controlling operations of the first to fourth switching circuits 4, 8, 13, and 30 and the inverter 17.

Next, a power flow in the electric power conversion device according to embodiment 1 of the present invention will be described with reference to FIG. 3 to FIG. 6.

Figure 3:
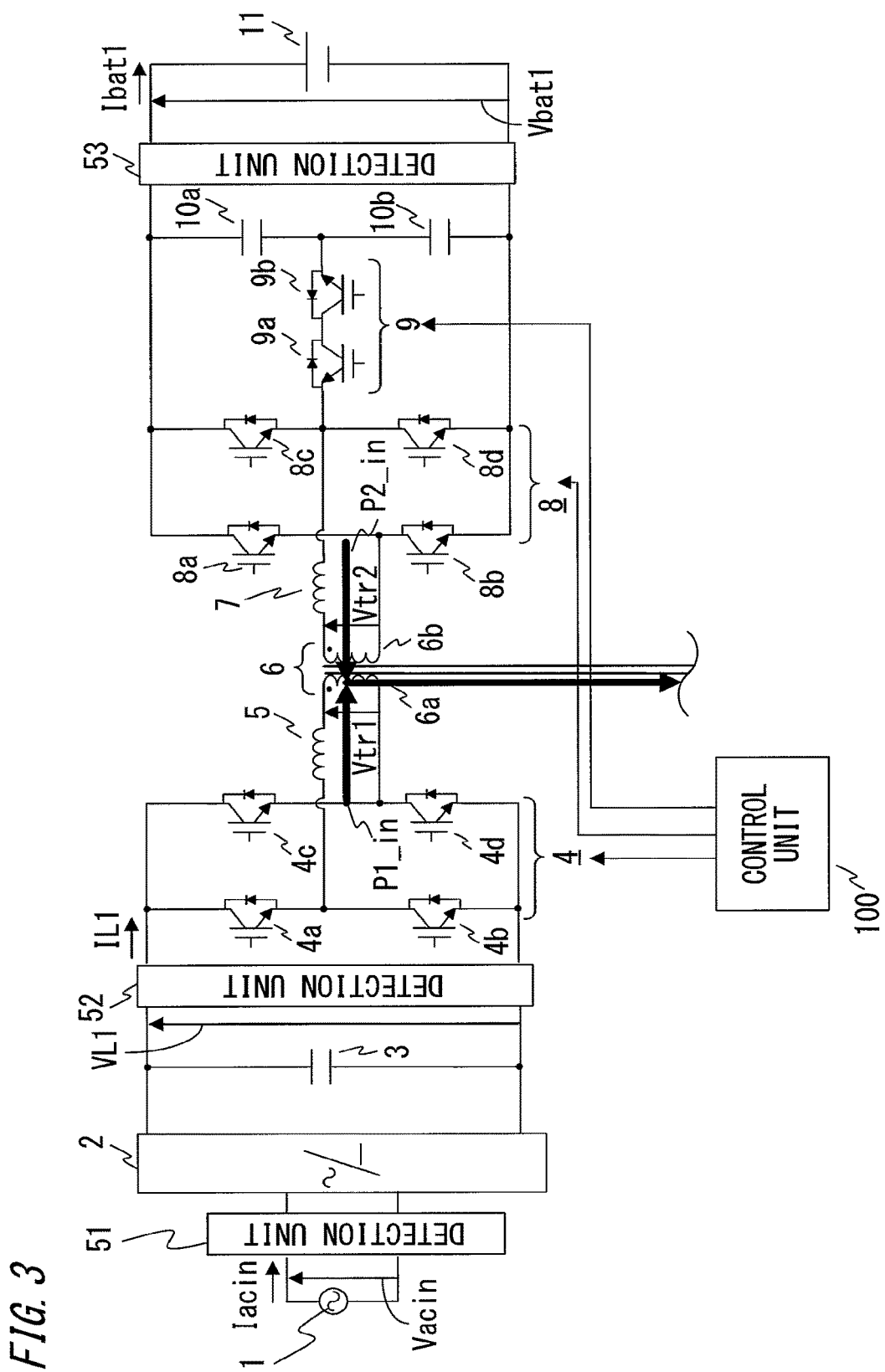
FIG. 3 is a diagram illustrating a power flow in the electric power conversion device according to embodiment 1 of the present invention.
Figure 4:
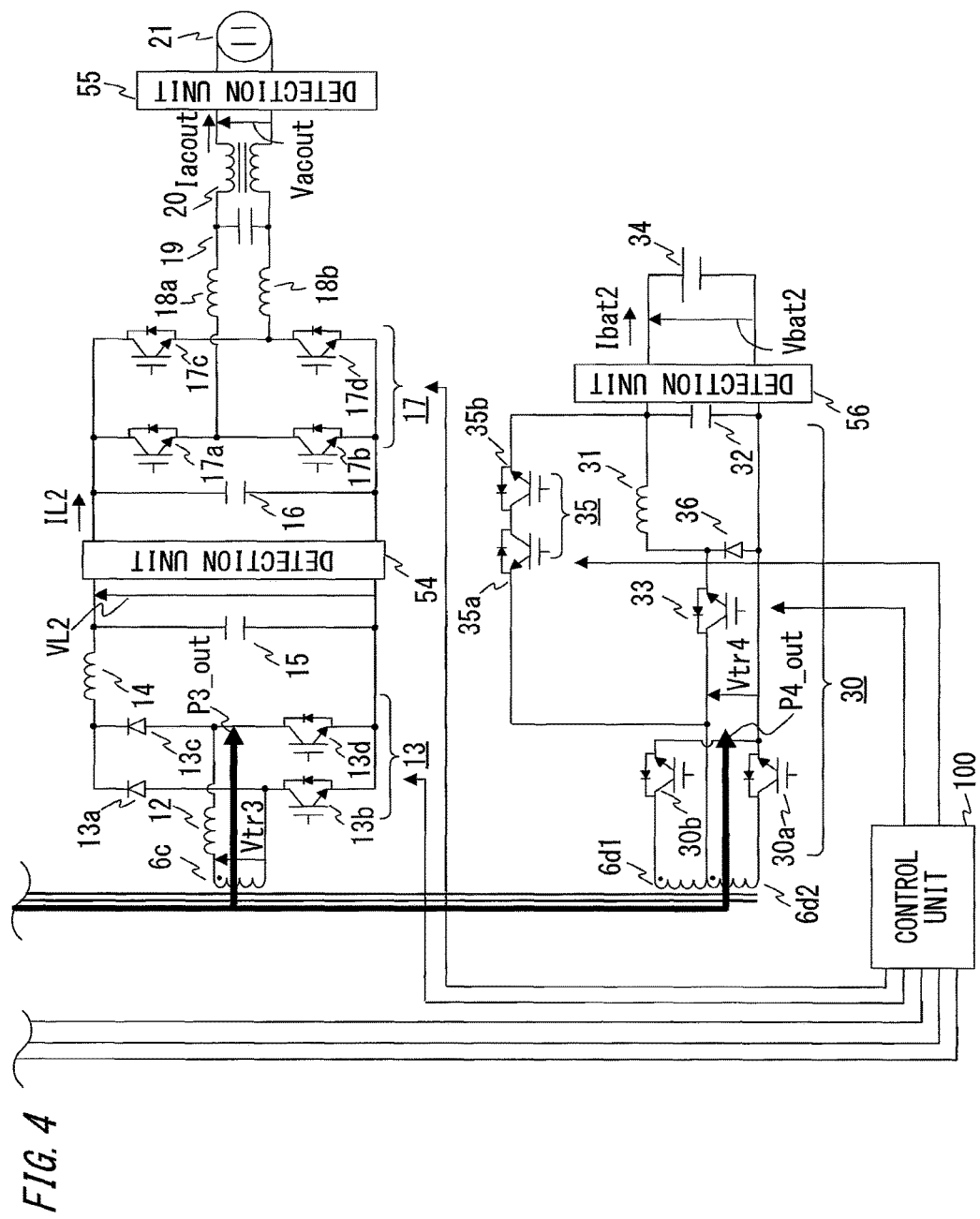
FIG. 4 is a diagram illustrating the power flow in the electric power conversion device according to embodiment 1 of the present invention.

As shown in FIG. 3 and FIG. 4, for example, in such a case where a private power generator is used as the AC power supply 1, if power supplied from the AC power supply 1 is insufficient and therefore the AC power supply 1 and the first DC power supply 11 are both used as power supply sources, supply power P1_in from the AC power supply 1 and supply power P2_in from the first DC power supply 11 are distributed into supply power P3_out for the AC load connected to the load device connection end 21, and supply power P4_out for the second DC power supply 34. In this case, in the claims, the AC power supply 1 and the first DC power supply 11 are power supply sources, and the AC load connected to the load device connection end 21 and the second DC power supply 34 are loads.

Figure 5:
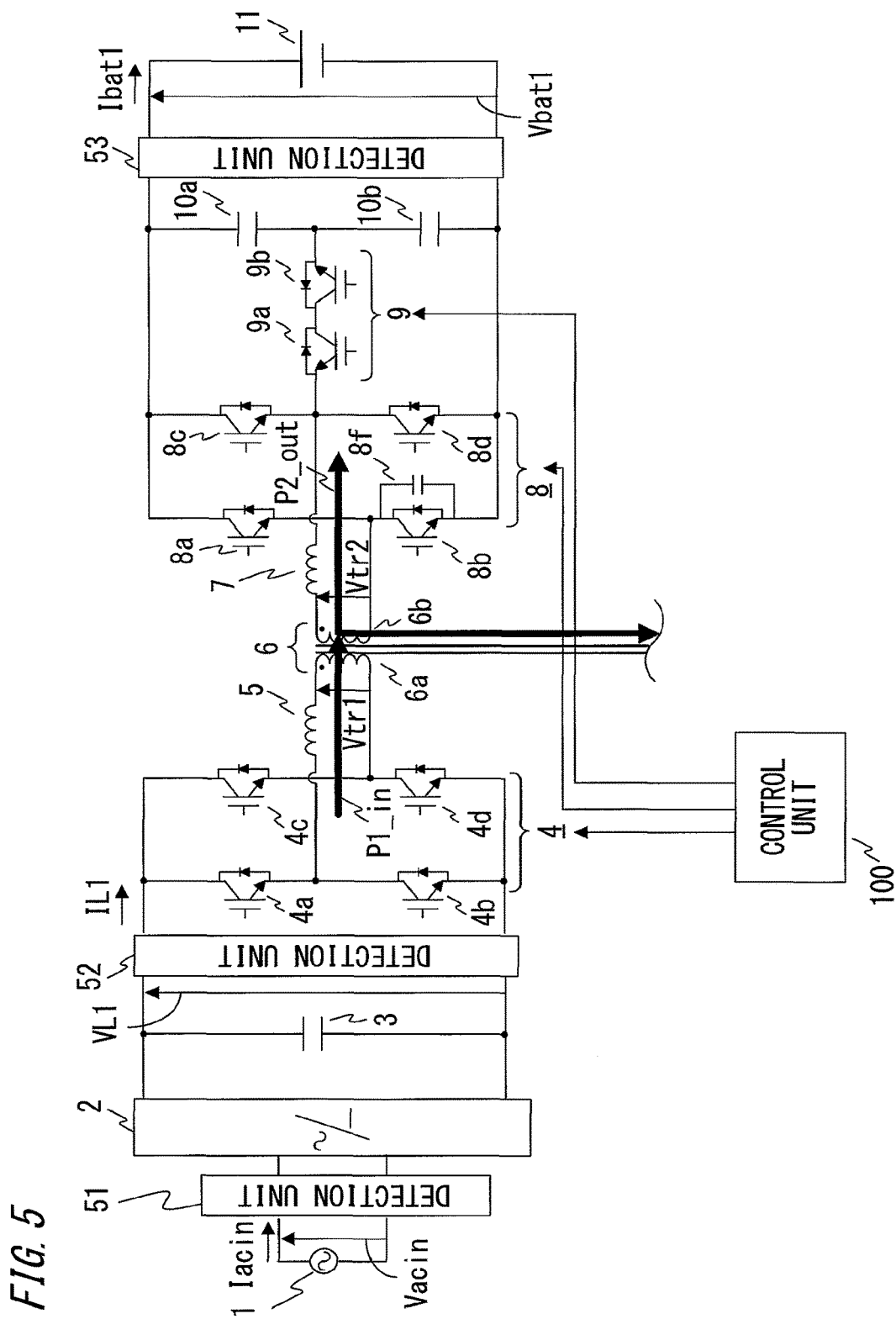
FIG. 5 is a diagram illustrating another power flow in the electric power conversion device according to embodiment 1 of the present invention.
Figure 6:
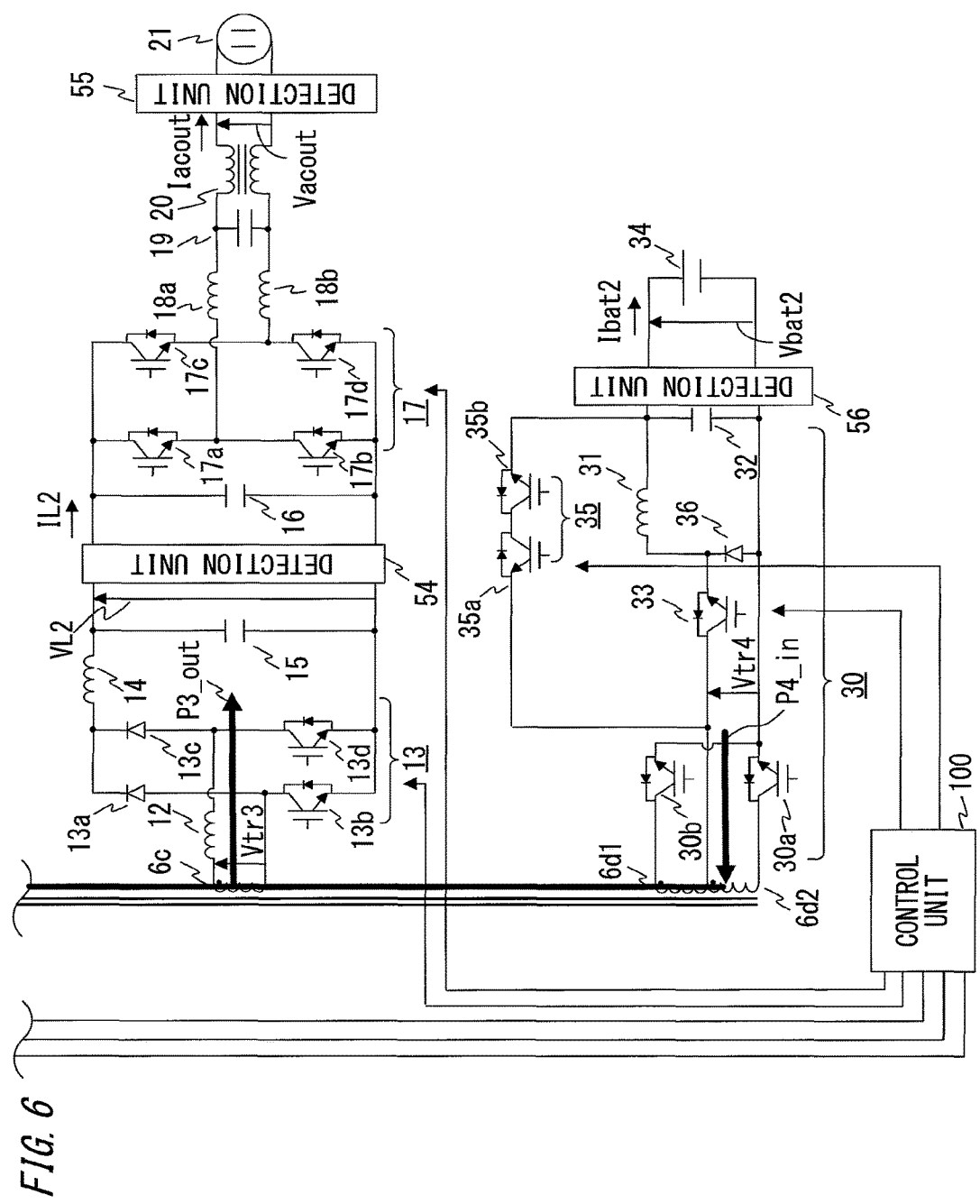
FIG. 6 is a diagram illustrating the other power flow in the electric power conversion device according to embodiment 1 of the present invention.

As shown in FIG. 5 and FIG. 6, for example, in such a case where a private power generator is used as the AC power supply 1, if power supplied from the AC power supply 1 is insufficient and the charge amount of the first DC power supply 11 is insufficient, and therefore the AC power supply 1 and the second DC power supply 34 are both used as power supply sources, supply power P1_in from the AC power supply 1 and supply power P4_in from the second DC power supply 34 are distributed into supply power P3_out for the AC load connected to the load device connection end 21 and supply power P2_out for the first DC power supply 11. In this case, in the claims, the AC power supply 1 and the second DC power supply 34 are power supply sources, and the AC load connected to the load device connection end 21 and the first DC power supply 11 are loads.

A switching pattern for achieving the power flow shown in FIG. 3 and FIG. 4, i.e., for achieving supply of power using both the AC power supply 1 and the first DC power supply 11 as power supply sources, will be described below.

Figure 7:
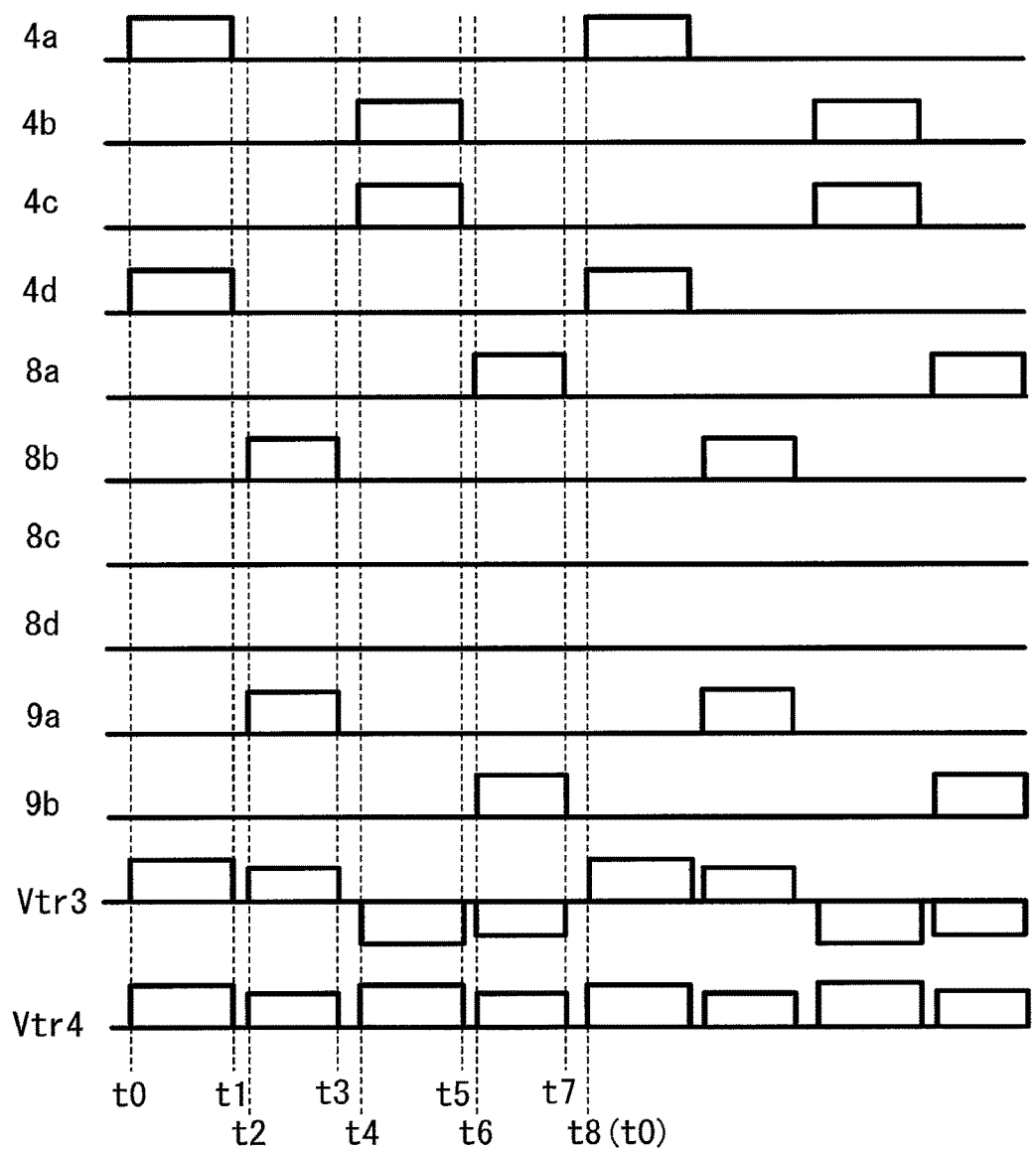
FIG. 7 is a diagram illustrating a switching pattern for achieving the power flow shown in FIG. 3 and FIG. 4.

The power flow in this case can be achieved by the switching pattern in FIG. 7. FIG. 7 is a switching pattern for causing the second switching circuit 8 to perform half-bridge operation to discharge the first DC power supply 11.

FIG. 7 shows: gate signals for the switching elements 4a to 4d of the first switching circuit 4, the switching elements 8a to 8d of the second switching circuit 8, and the switching elements 9a and 9b composing the switch 9; the output voltage Vtr3 of the third winding 6c of the transformer 6, on the load side; and the voltage Vtr4 obtained by rectifying the output voltage of the fourth windings 6d1 and 6d2 of the transformer 6, on the load side. FIG. 8 to FIG. 15 show current flows occurring by the switching pattern in FIG. 7. In these cases, it is assumed that the AC power supply 1 operates in a positive-half-wave manner. However, even in the case of negative half wave, the same operation is performed.

Figure 8:
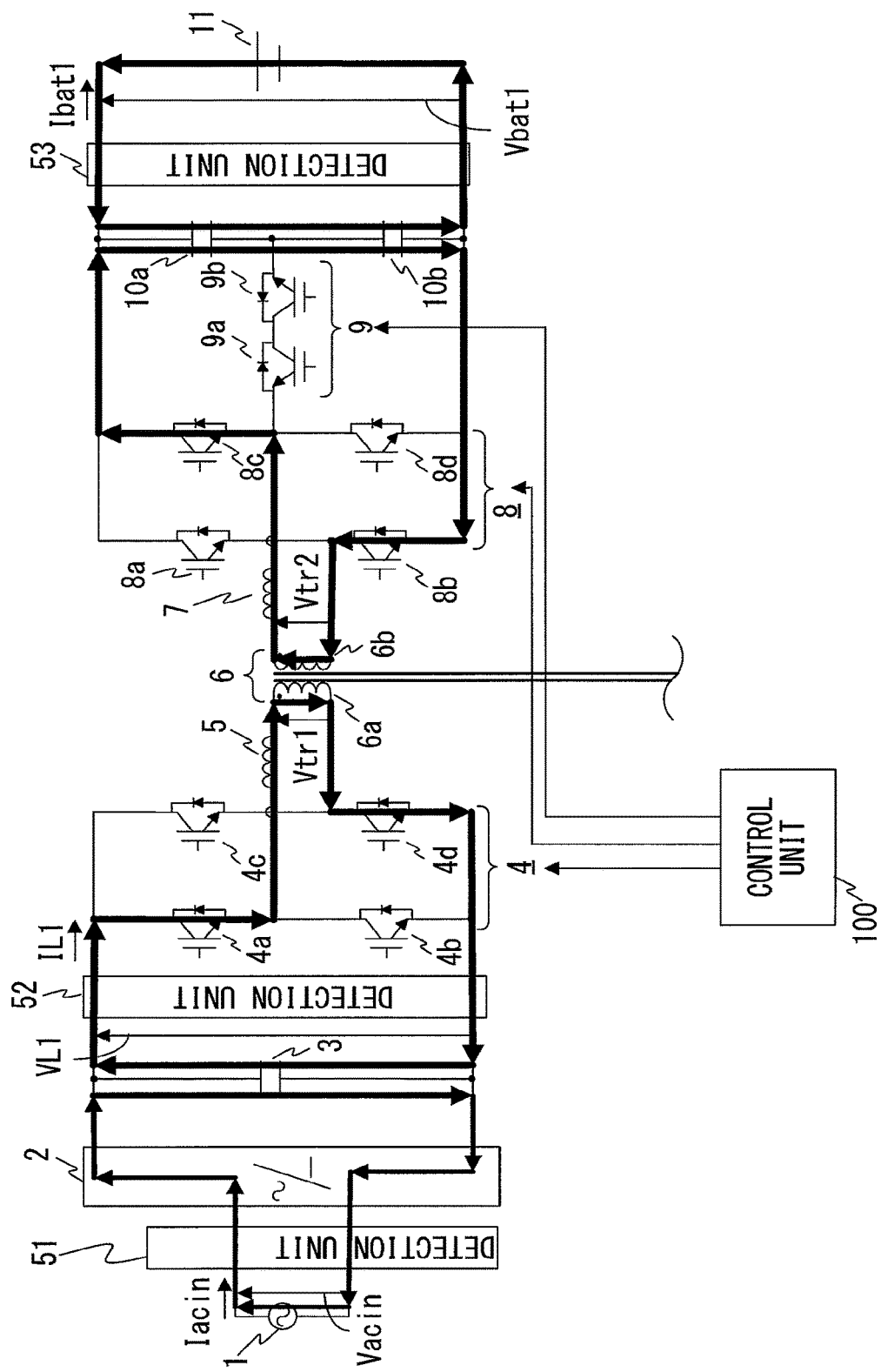
FIG. 8 is a diagram illustrating a current flow according to the switching pattern shown in FIG. 7.
Figure 9:
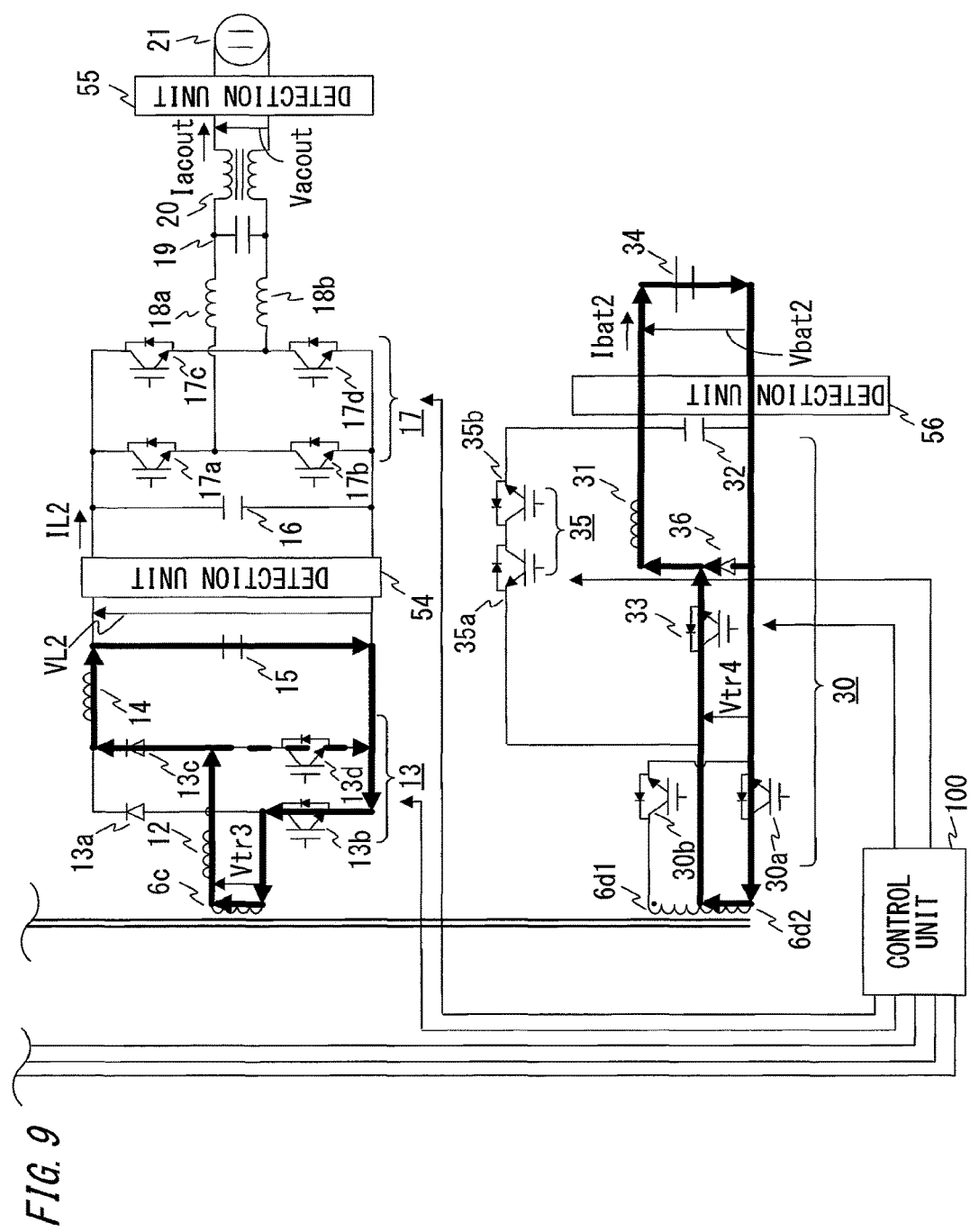
FIG. 9 is a diagram illustrating the current flow according to the switching pattern shown in FIG. 7.

In FIG. 7, during the period from time t0 to time t1, power is supplied from the AC power supply 1. That is, at time to, the switching elements 4a and 4d of the first switching circuit 4 are turned on at the same time, and are kept in an ON state until time t1. FIG. 8 and FIG. 9 show the current flows during this period.

On the third winding 6c of the transformer 6, the output voltage Vtr3 determined by the voltage VL1 of the capacitor 3 and the turns ratio between the first winding 6a and the third winding 6c is applied upward as indicated by an arrow in FIG. 9, and then, via the smoothing capacitor 15 and the inverter 17, power is supplied to the load device connected to the load device connection end 21.

In addition, on the fourth windings 6d1 and 6d2 of the transformer 6, the output voltage determined by the voltage VL1 of the capacitor 3 and the turns ratio between the first winding 6a and the fourth windings 6d1 and 6d2 is applied, the output voltage is rectified to be the voltage Vtr4, and then, via the switching element 33, the flyback diode 36, and the reactor 31, power is supplied to the second DC power supply 34.

Further, on the second winding 6b of the transformer 6, the output voltage Vtr2 determined by the voltage VL1 of the capacitor 3 and the turns ratio between the first winding 6a and the second winding 6b is applied upward as indicated by an arrow in FIG. 8. At this time, if the total voltage of the capacitors 10a and 10b is lower than the output voltage Vtr2, the second switching circuit 8 operates as a rectifier as shown in FIG. 8. On the other hand, if the total voltage of the capacitors 10a and 10b is higher than the output voltage Vtr2, the current flow in the second switching circuit 8 as shown in FIG. 8 does not occur.

Figure 10:
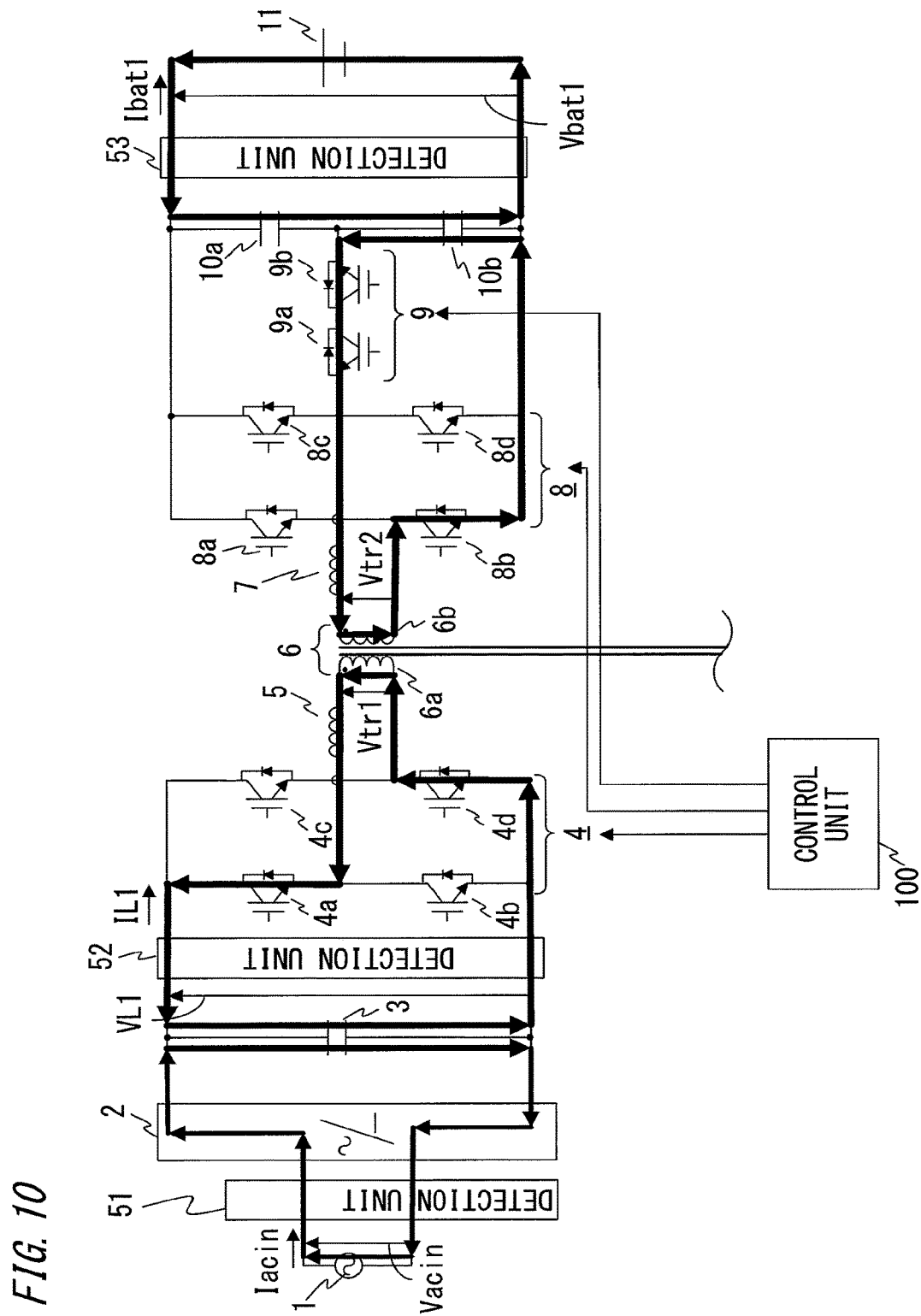
FIG. 10 is a diagram illustrating a current flow according to the switching pattern shown in FIG. 7.
Figure 11:
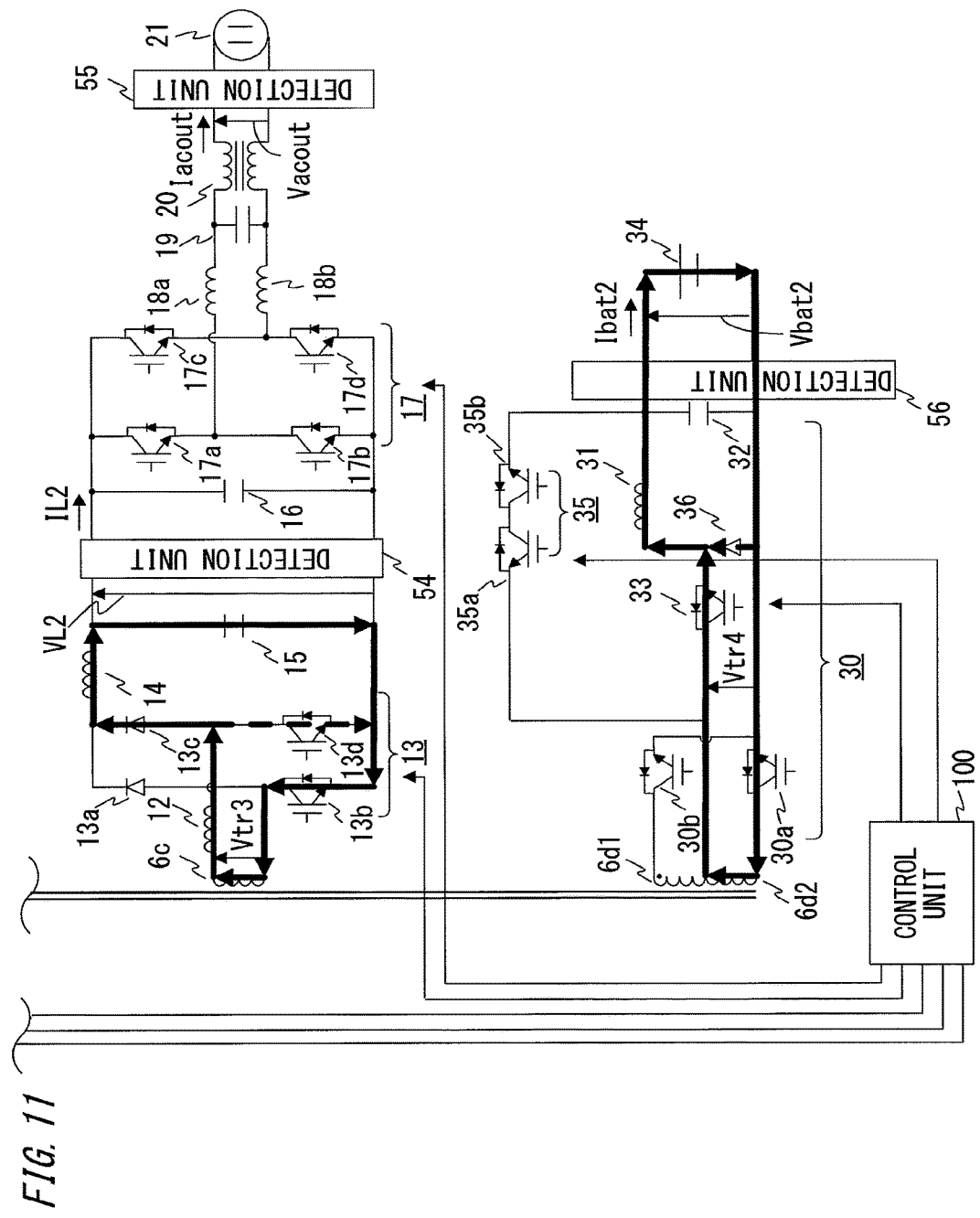
FIG. 11 is a diagram illustrating the current flow according to the switching pattern shown in FIG. 7.

Next, in FIG. 7, during the period from time t2 to time t3, power is supplied from the first DC power supply 11. That is, at time t2, the switching element 8b of the second switching circuit 8 and the switching element 9a of the switch 9 are turned on at the same time, and are kept in an ON state until time t3. FIG. 10 and FIG. 11 show the current flows during this period.

On the third winding 6c of the transformer 6, the output voltage Vtr3 determined by voltage of the capacitor 10b and the turns ratio between the second winding 6b and the third winding 6c is applied upward as indicated by an arrow in FIG. 11, and then, via the smoothing capacitor 15 and the inverter 17, power is supplied to the load device connected to the load device connection end 21.

In addition, on the fourth windings 6d1 and 6d2 of the transformer 6, the output voltage determined by voltage of the capacitor 10b and the turns ratio between the second winding 6b and the fourth windings 6d1 and 6d2 is applied, the output voltage is rectified to be the voltage Vtr4, and then, via the switching element 33, the flyback diode 36, and the reactor 31, power is supplied to the second DC power supply 34.

Further, on the first winding 6a of the transformer 6, the output voltage Vtr1 determined by voltage of the capacitor 10b and the turns ratio between the second winding 6b and the first winding 6a is applied upward as indicated by an arrow in FIG. 10. At this time, if the voltage VL1 of the capacitor 3 is lower than the output voltage Vtr1, the first switching circuit 4 operates as a rectifier as shown in FIG. 10. On the other hand, if the voltage VL1 of the capacitor 3 is higher than the output voltage Vtr1, the current flow in the first switching circuit 4 as shown in FIG. 10 does not occur.

Figure 12:
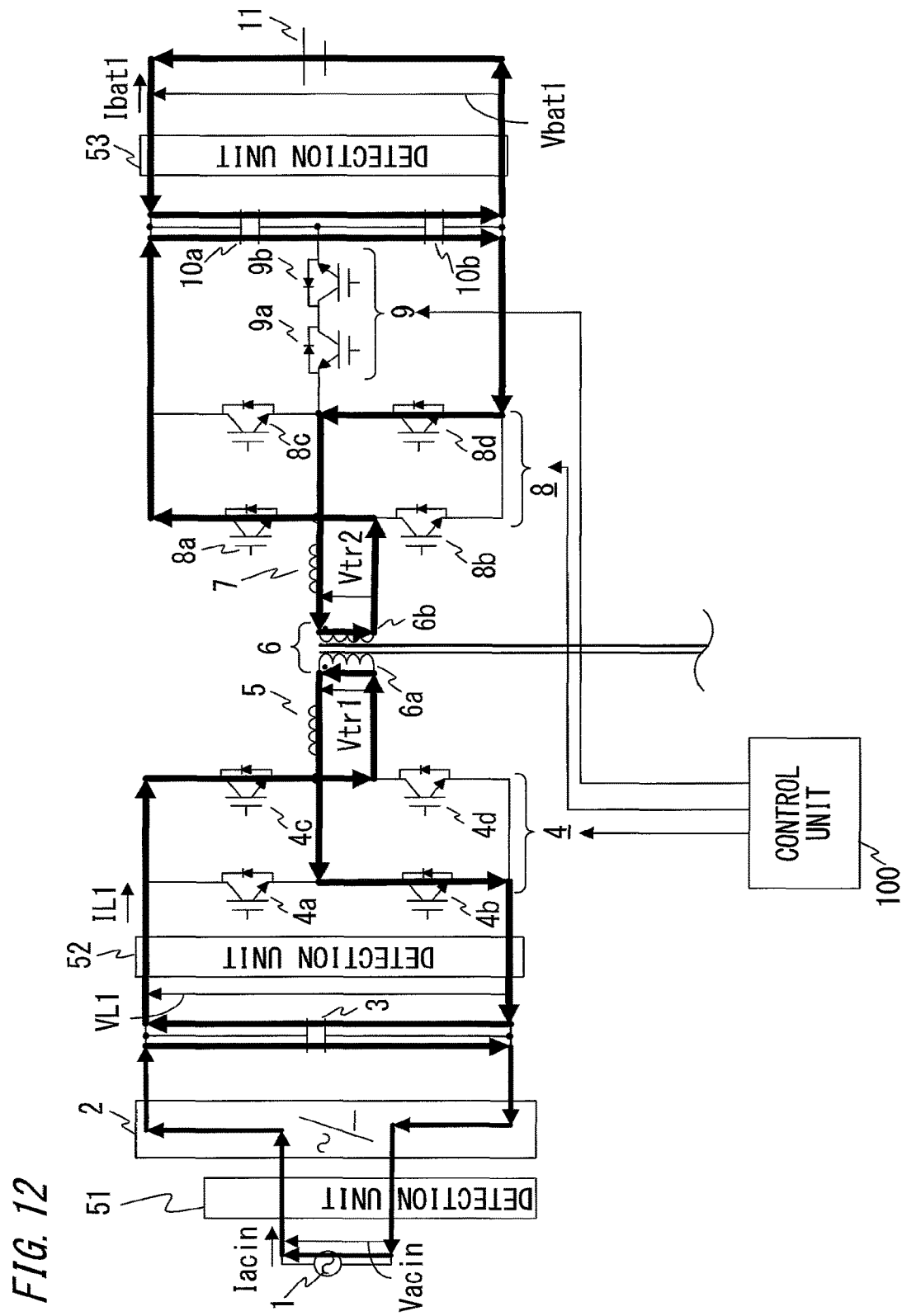
FIG. 12 is a diagram illustrating a current flow according to the switching pattern shown in FIG. 7.
Figure 13:
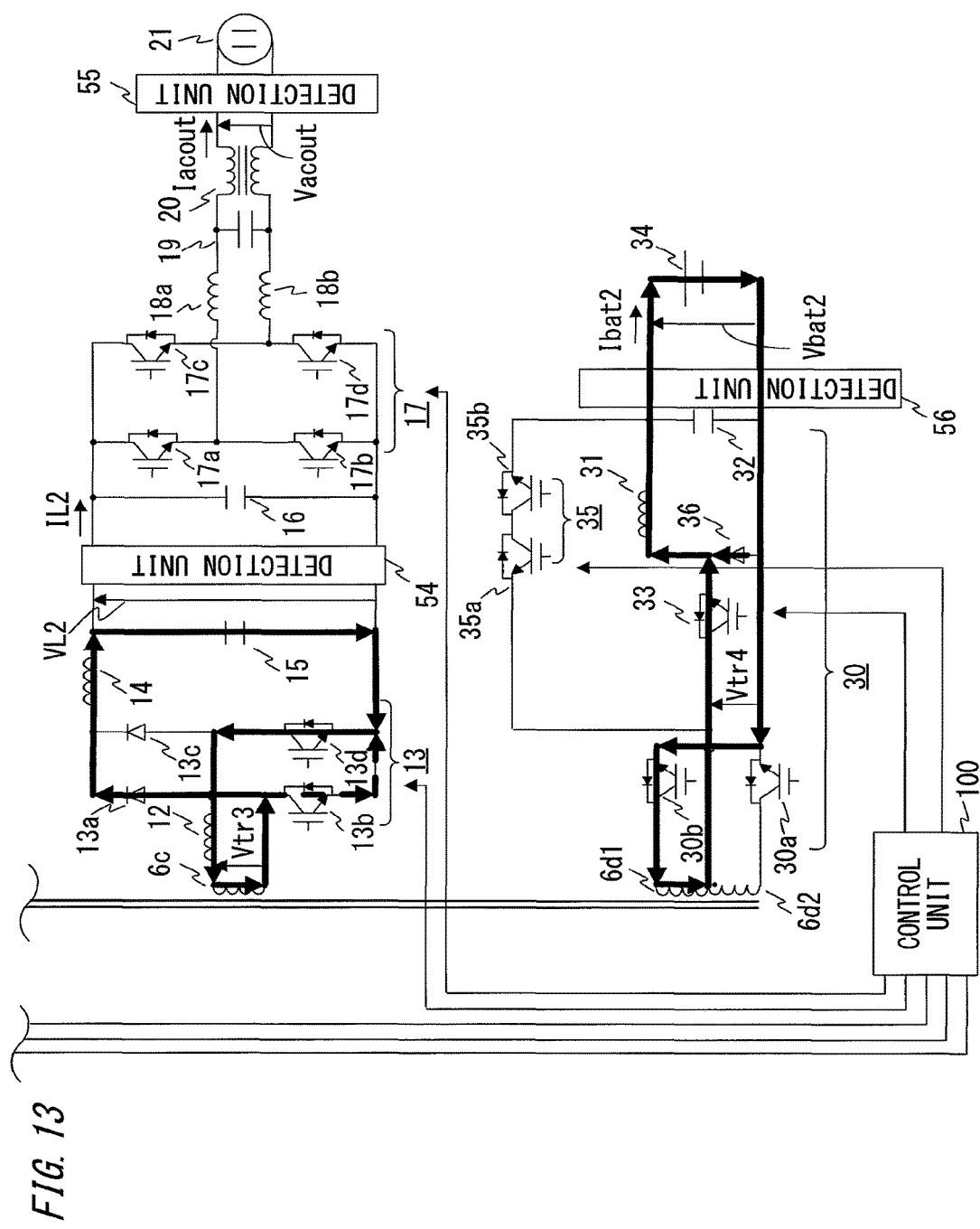
FIG. 13 is a diagram illustrating the current flow according to the switching pattern shown in FIG. 7.

Next, in FIG. 7, during the period from time t4 to time t5, power is supplied from the AC power supply 1. That is, at time t4, the switching elements 4b and 4c of the first switching circuit 4 are turned on at the same time, and are kept in an ON state until time t5. FIG. 12 and FIG. 13 show the current flows during this period.

On the third winding 6c of the transformer 6, the output voltage Vtr3 determined by the voltage VL1 of the capacitor 3 and the turns ratio between the first winding 6a and the third winding 6c is applied downward as indicated by an arrow in FIG. 13, and then, via the smoothing capacitor 15 and the inverter 17, power is supplied to the load device connected to the load device connection end 21.

In addition, on the fourth windings 6d1 and 6d2 of the transformer 6, the output voltage determined by the voltage VL1 of the capacitor 3 and the turns ratio between the first winding 6a and the fourth windings 6d1 and 6d2 is applied, the output voltage is rectified to be the voltage Vtr4, and then, via the switching element 33, the flyback diode 36, and the reactor 31, power is supplied to the second DC power supply 34.

Further, on the second winding 6b of the transformer 6, the output voltage Vtr2 determined by the voltage VL1 of the capacitor 3 and the turns ratio between the first winding 6a and the second winding 6b is applied downward as indicated by an arrow in FIG. 12. At this time, if the total voltage of the capacitors 10a and 10b is lower than the output voltage Vtr2, the second switching circuit 8 operates as a rectifier as shown in FIG. 12. On the other hand, if the total voltage of the capacitors 10a and 10b is higher than the output voltage Vtr2, the current flow in the second switching circuit 8 as shown in FIG. 12 does not occur.

Figure 14:
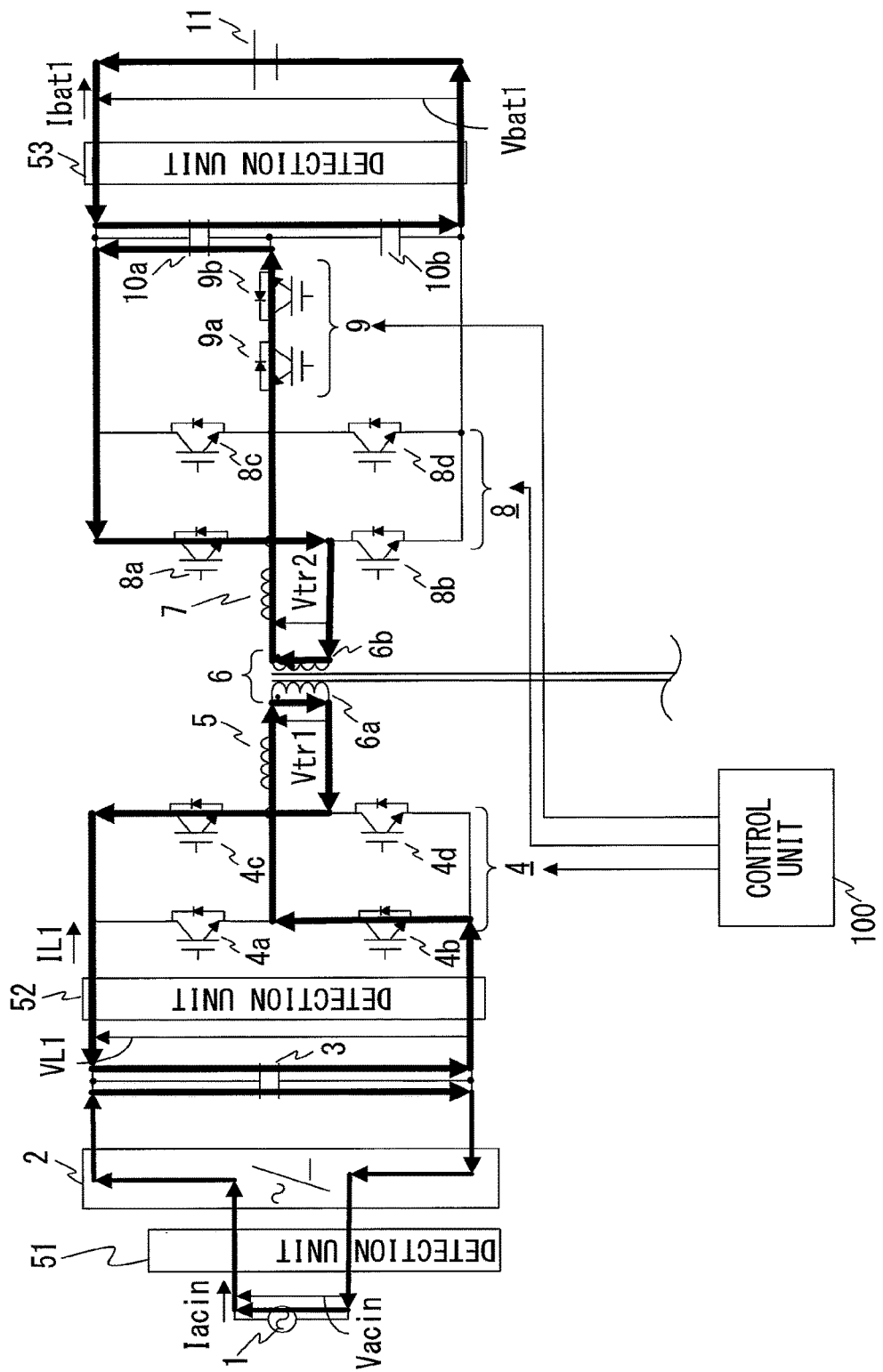
FIG. 14 is a diagram illustrating a current flow according to the switching pattern shown in FIG. 7.
Figure 15:
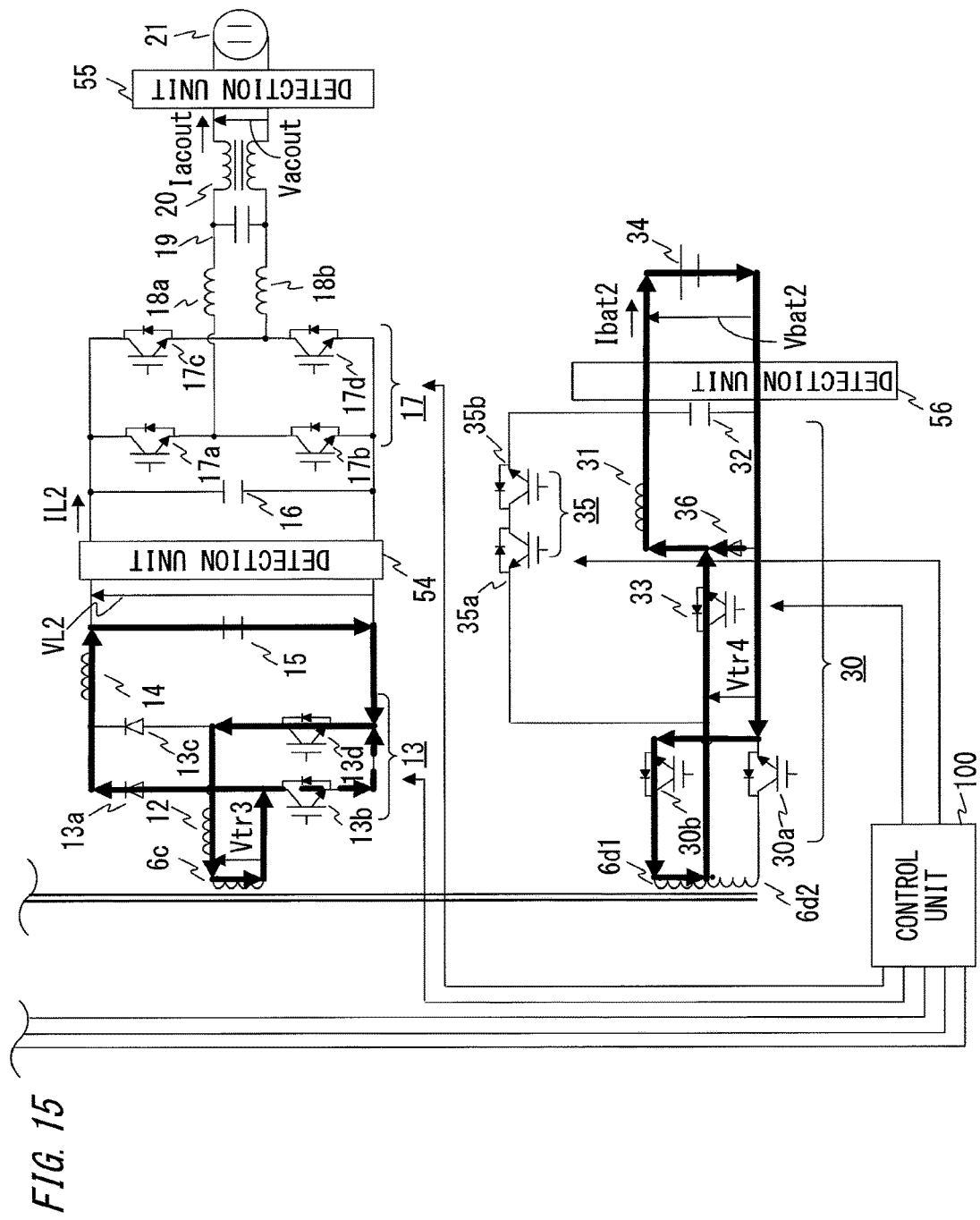
FIG. 15 is a diagram illustrating the current flow according to the switching pattern shown in FIG. 7.

Next, in FIG. 7, during the period from time t6 to time t7, power is supplied from the first DC power supply 11. That is, at time t6, the switching element 8a of the second switching circuit 8 and the switching element 9b of the switch 9 are turned on at the same time, and are kept in an ON state until time t7. FIG. 14 and FIG. 15 show the current flows during this period.

On the third winding 6c of the transformer 6, the output voltage Vtr3 determined by voltage of the capacitor 10a and the turns ratio between the second winding 6b and the third winding 6c is applied downward as indicated by an arrow in FIG. 15, and then, via the smoothing capacitor 15 and the inverter 17, power is supplied to the load device connected to the load device connection end 21.

In addition, on the fourth windings 6d1 and 6d2 of the transformer 6, the output voltage determined by voltage of the capacitor 10a and the turns ratio between the second winding 6b and the fourth windings 6d1 and 6d2 is applied, the output voltage is rectified to be the voltage Vtr4, and then, via the switching element 33, the flyback diode 36, and the reactor 31, power is supplied to the second DC power supply 34.

At the same time, on the first winding 6a of the transformer 6, the output voltage Vtr1 determined by voltage of the capacitor 10a and the turns ratio between the second winding 6b and the first winding 6a is applied downward as indicated by an arrow in FIG. 14. At this time, if the voltage VL1 of the capacitor 3 is lower than the output voltage Vtr1, the first switching circuit 4 operates as a rectifier as shown in FIG. 14. On the other hand, if the voltage VL1 of the capacitor 3 is higher than the output voltage Vtr1, the current flow in the first switching circuit 4 as shown in FIG. 14 does not occur.

At time t8, as in time t0, the switching elements 4a and 4d of the first switching circuit 4 are turned on at the same time.

Here, the minimum repetitive period in which power is supplied in a temporally divided manner alternately from the AC power supply 1 and the first DC power supply 11, is defined as one switching period. That is, in the switching pattern shown in FIG. 7, the period of time t0 to t4 and the period of time t4 to t8 are each defined as one switching period. In this case, in every one switching period, power is supplied at both positive and negative polarities to the transformer 6, and in the one switching period, power is supplied in a temporally divided manner alternately from both the first switching circuit 4 and the second switching circuit 8. Thus, as shown in FIG. 8 to FIG. 15, in any state, power is supplied to the load while the continuity of current from the AC power supply 1 and the first DC power supply 11 is maintained.

Figure 16:
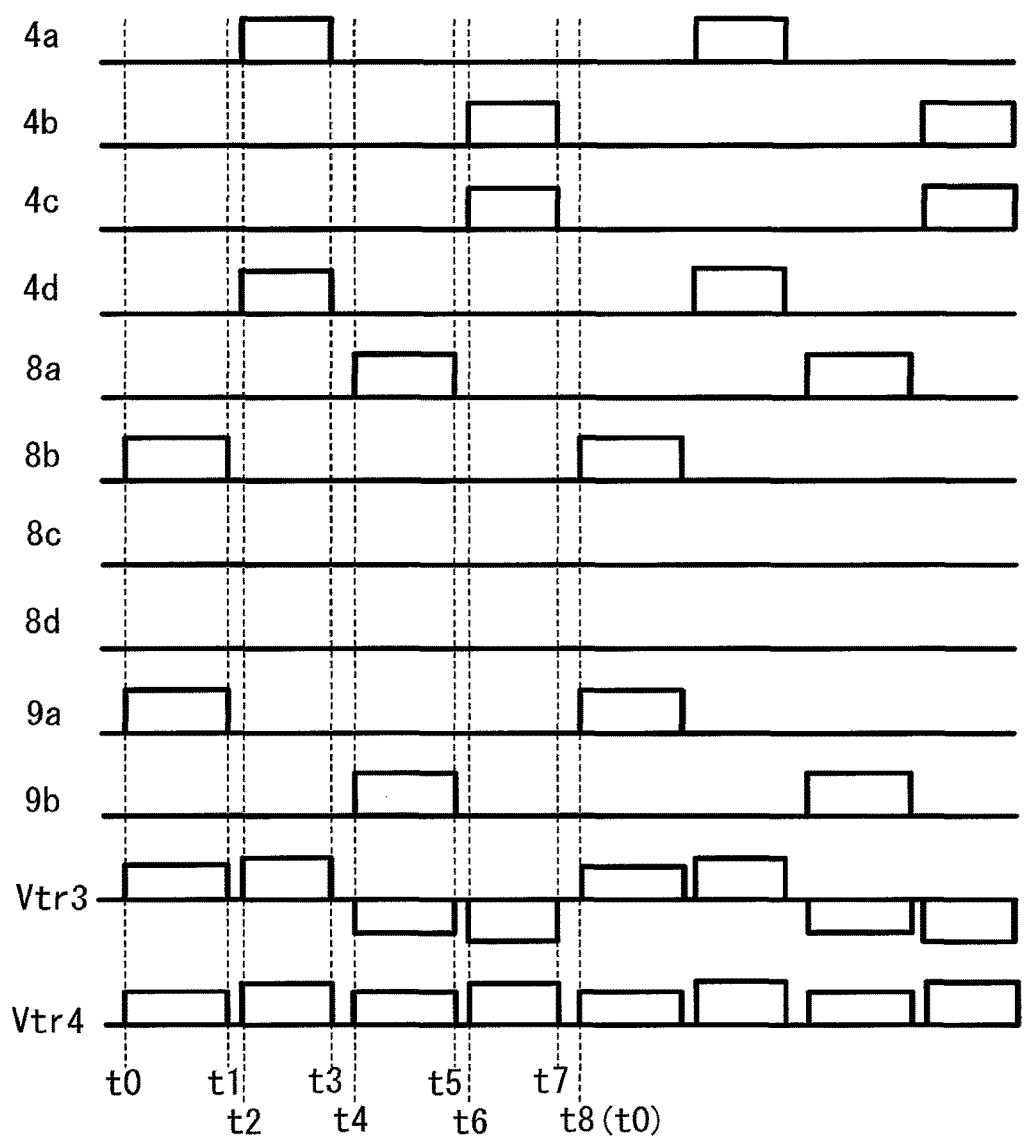
FIG. 16 is a diagram illustrating another switching pattern for achieving the power flow shown in FIG. 3 and FIG. 4.

As shown in FIG. 16, even in the case where the timing of supplying power from the first switching circuit 4 and the timing of supplying power from the second switching circuit 8 are exchanged with each other, the same effect can be achieved. The current flows in this case are the same as those shown in FIG. 8 to FIG. 15, and therefore the description thereof is omitted here.

In the switching patterns shown in FIG. 7 and FIG. 16, both the switching elements 9a and 9b composing the switch 9 may operate in synchronization with switching operations of the switching elements 8a and 8b of the second switching circuit 8.

Figure 17:
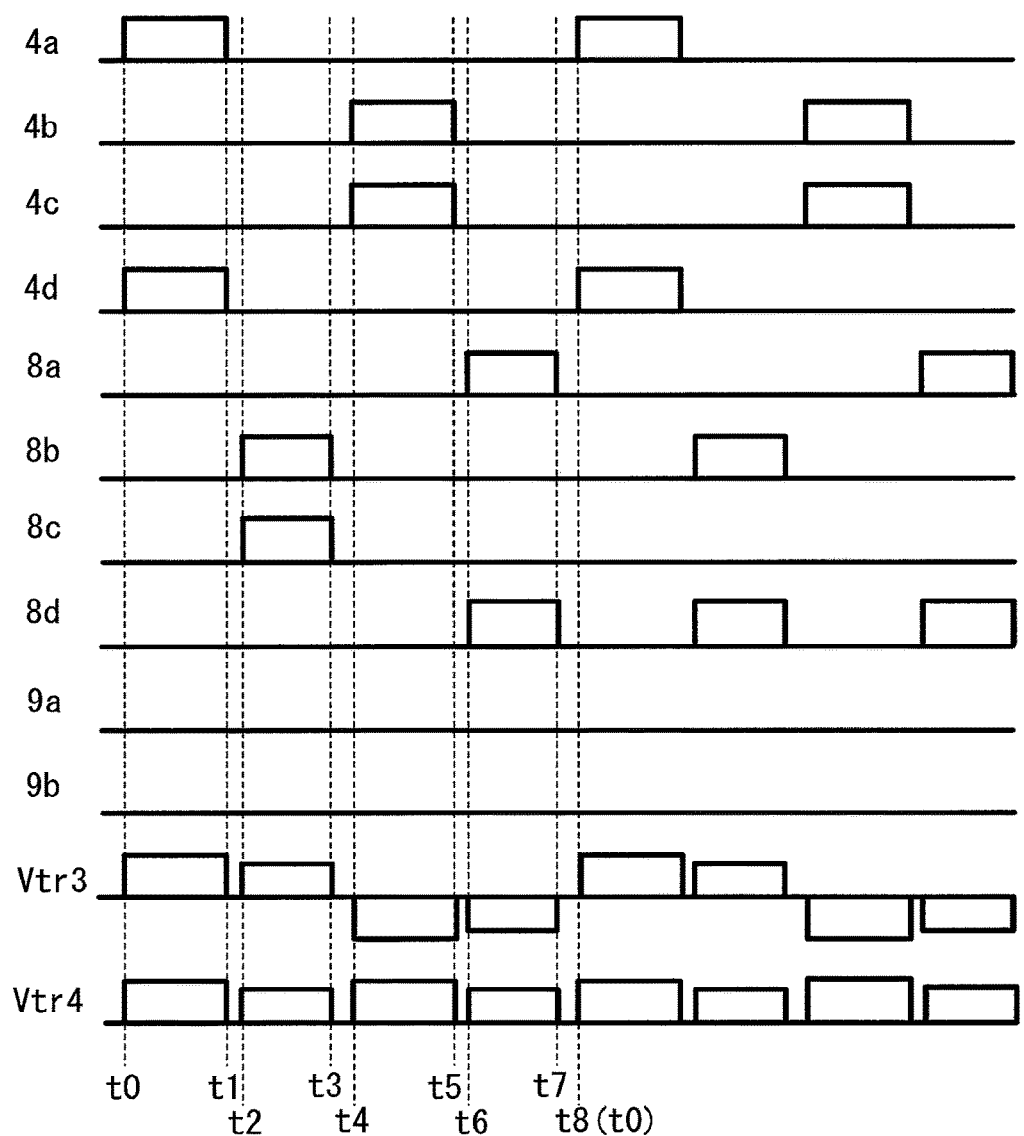
FIG. 17 is a diagram illustrating still another switching pattern for achieving the power flow shown in FIG. 3 and FIG. 4.

The switching pattern for achieving the power flow shown in FIG. 3 and FIG. 4, i.e., for achieving supply of power using both the AC power supply 1 and the first DC power supply 11 as power supply sources, is not limited to the switching patterns shown in FIG. 7 and FIG. 16, but such power flow can be achieved also by a switching pattern shown in FIG. 17, for example. FIG. 17 is a switching pattern for causing the second switching circuit 8 to perform full-bridge operation to discharge the first DC power supply 11.

FIG. 17 shows: gate signals for the switching elements 4a to 4d of the first switching circuit 4; gate signals for the switching elements 8a to 8d of the second switching circuit 8; gate signals for the switching elements 9a and 9b composing the switch 9; the output voltage Vtr3 of the third winding 6c of the transformer 6, on the load side; and the voltage Vtr4 obtained by rectifying the output voltage of the fourth windings 6d1 and 6d2 of the transformer 6, on the load side. FIG. 18 to FIG. 25 show current flows occurring by the switching pattern in FIG. 17. In this pattern, it is assumed that the AC power supply 1 operates in a positive-half-wave manner. However, even in the case of negative half wave, the same operation is performed.

Figure 18:
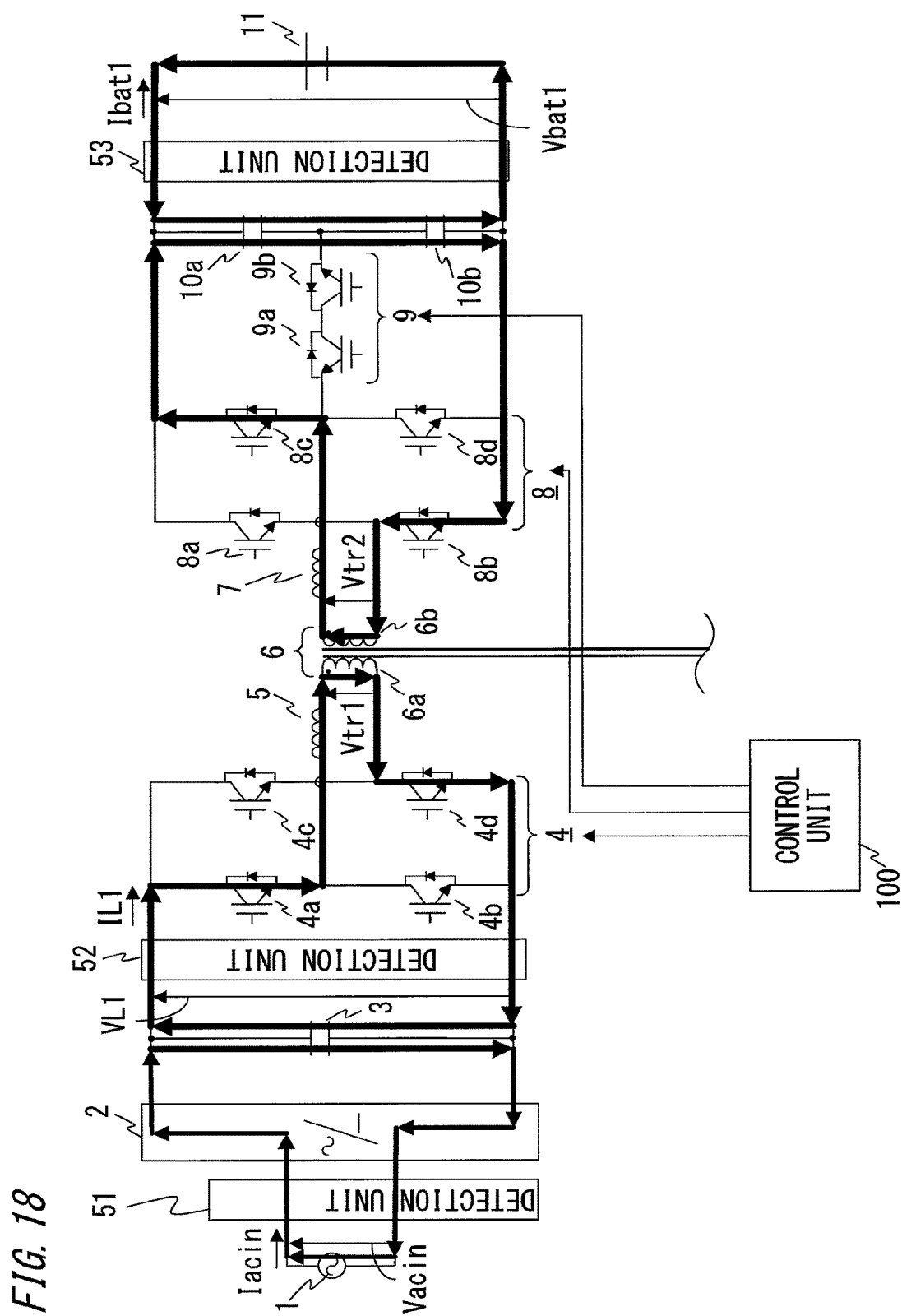
FIG. 18 is a diagram illustrating a current flow according to the switching pattern shown in FIG. 17.
Figure 19:
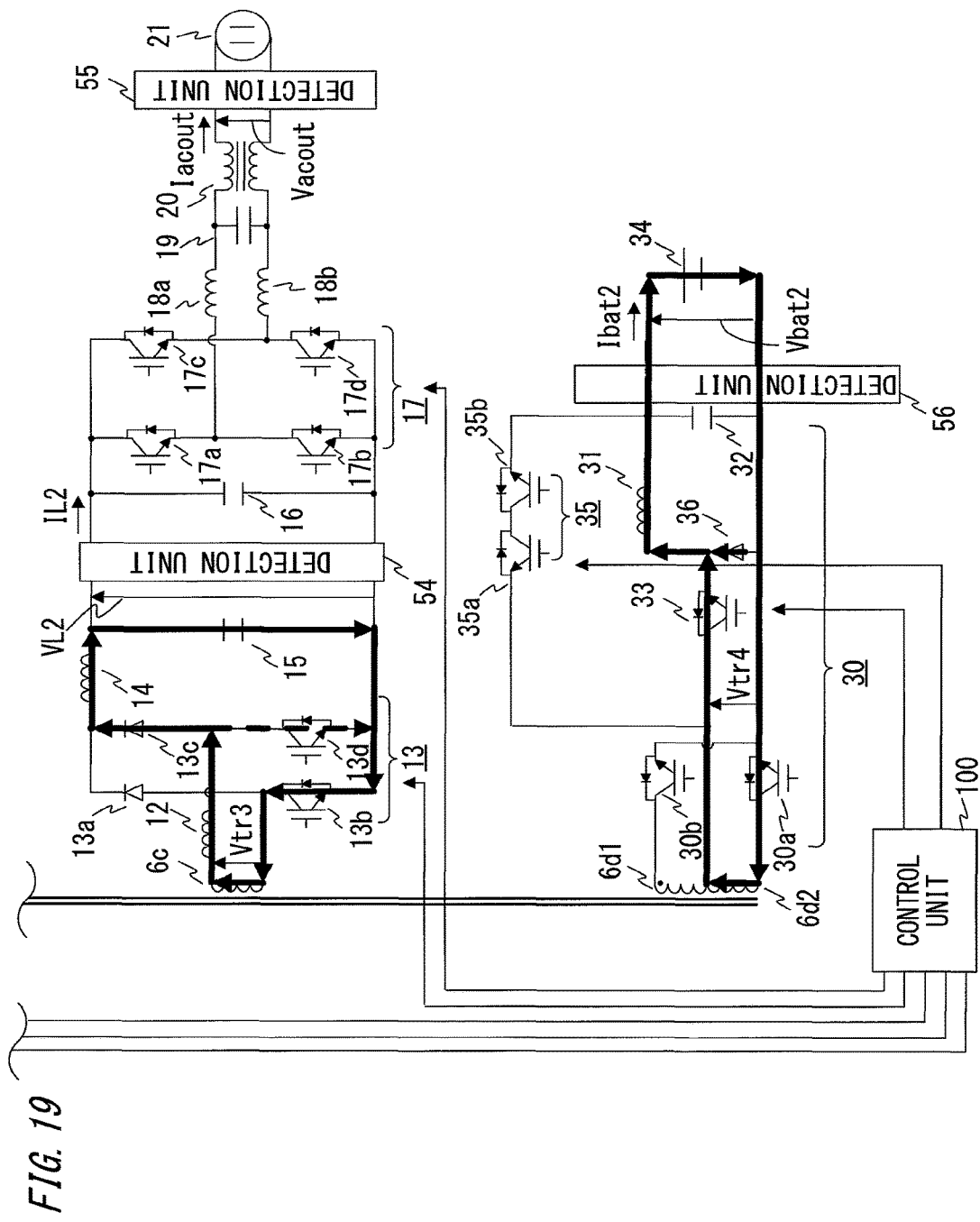
FIG. 19 is a diagram illustrating the current flow according to the switching pattern shown in FIG. 17.

In FIG. 17, during the period from time t0 to time t1, power is supplied from the AC power supply 1. That is, at time to, the switching elements 4a and 4d of the first switching circuit 4 are turned on at the same time, and are kept in an ON state until time t1. FIG. 18 and FIG. 19 show the current flows during this period.

On the third winding 6c of the transformer 6, the output voltage Vtr3 determined by the voltage VL1 of the capacitor 3 and the turns ratio between the first winding 6a and the third winding 6c is applied upward as indicated by an arrow in FIG. 19, and then, via the smoothing capacitor 15 and the inverter 17, power is supplied to the load device connected to the load device connection end 21.

In addition, on the fourth windings 6d1 and 6d2 of the transformer 6, the output voltage determined by the voltage VL1 of the capacitor 3 and the turns ratio between the first winding 6a and the fourth windings 6d1 and 6d2 is applied, the output voltage is rectified to be the voltage Vtr4, and then, via the switching element 33, the flyback diode 36, and the reactor 31, power is supplied to the second DC power supply 34.

Further, on the second winding 6b of the transformer 6, the output voltage Vtr2 determined by the voltage VL1 of the capacitor 3 and the turns ratio between the first winding 6a and the second winding 6b is applied upward as indicated by an arrow in FIG. 18. At this time, if the total voltage of the capacitors 10a and 10b is lower than the output voltage Vtr2, the second switching circuit 8 operates as a rectifier as shown in FIG. 18. On the other hand, if the total voltage of the capacitors 10a and 10b is higher than the output voltage Vtr2, the current flow in the second switching circuit 8 shown in FIG. 18 does not occur.

Figure 20:
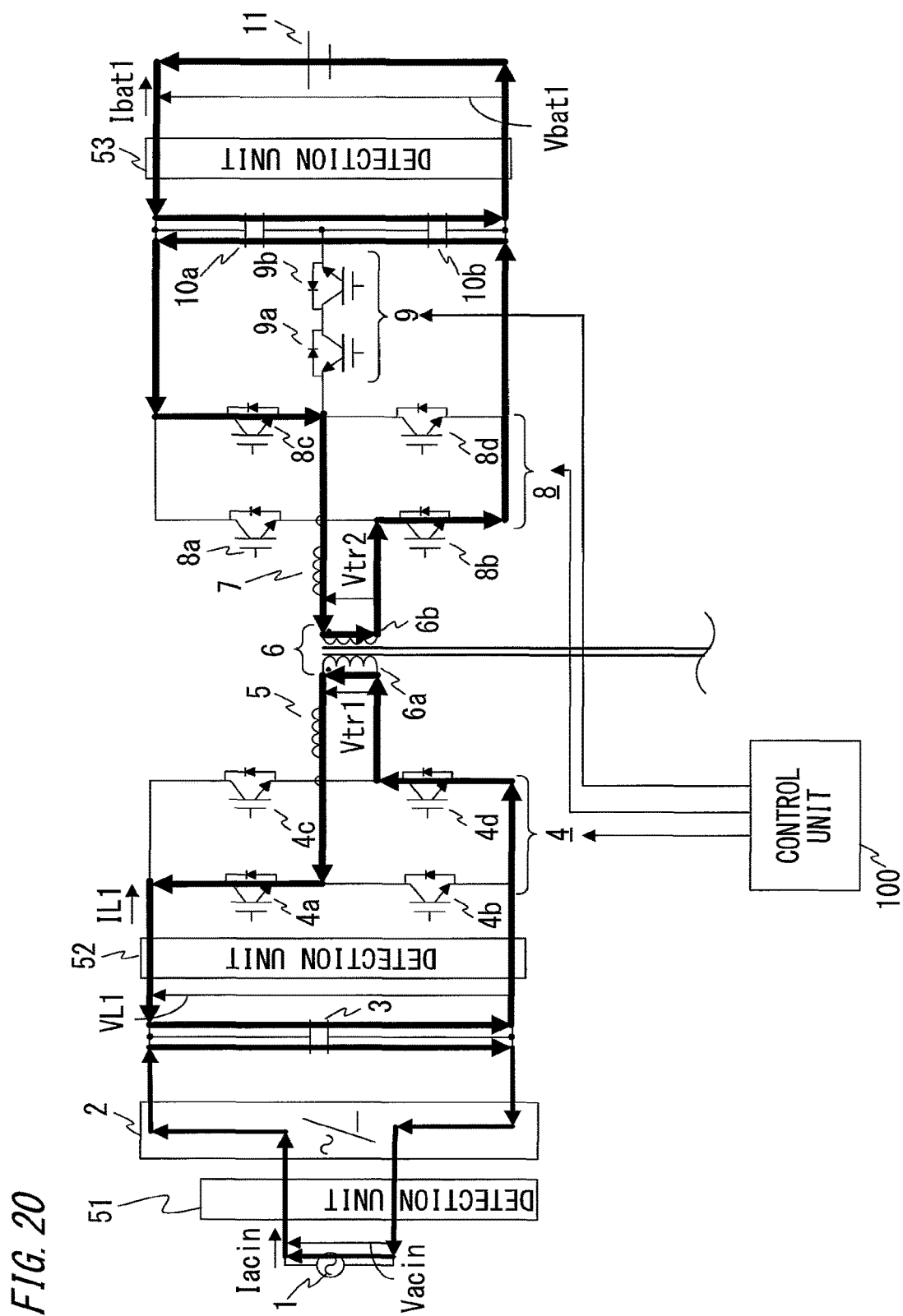
FIG. 20 is a diagram illustrating a current flow according to the switching pattern shown in FIG. 17.
Figure 21:
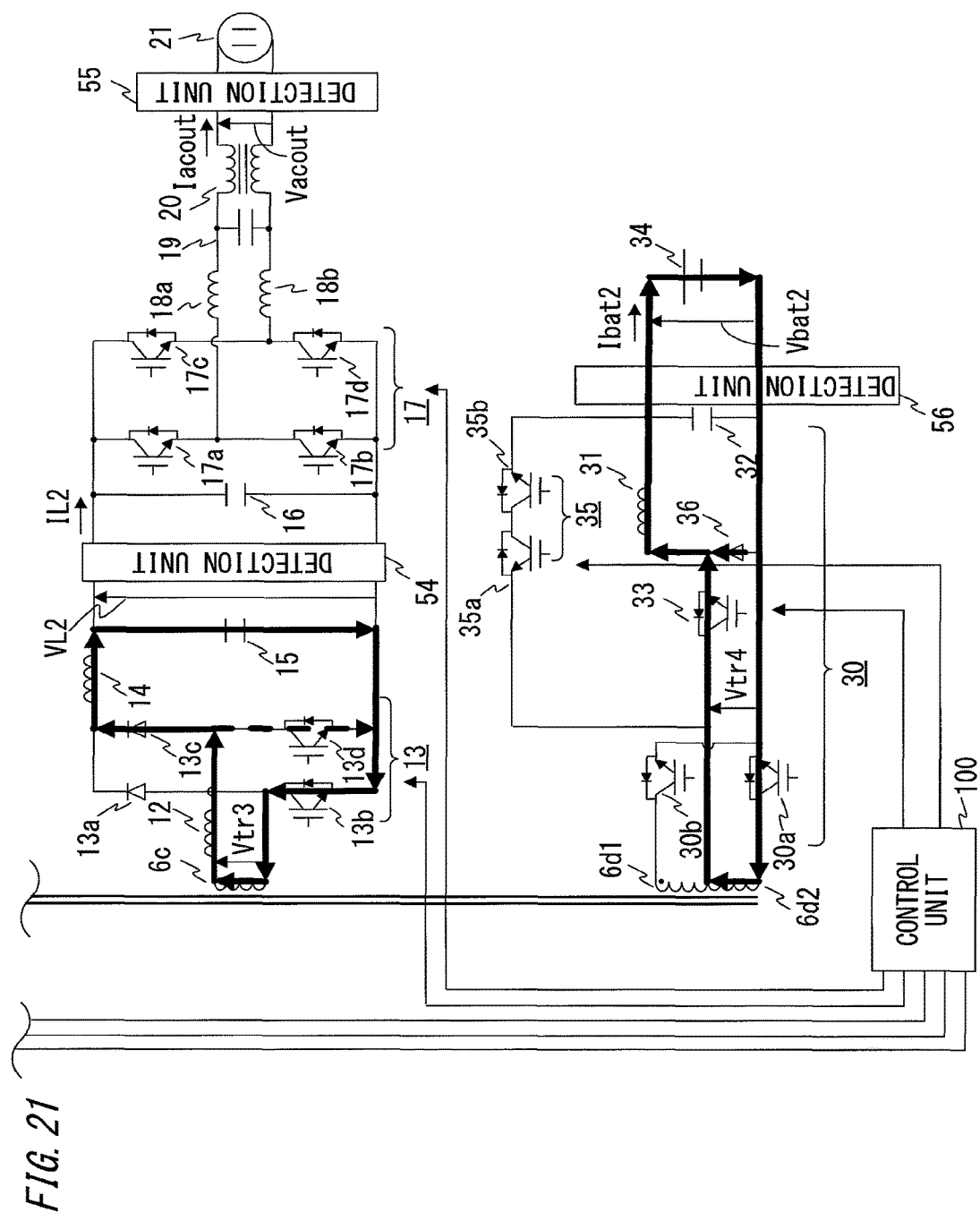
FIG. 21 is a diagram illustrating the current flow according to the switching pattern shown in FIG. 17.

Next, in FIG. 17, during the period from time t2 to time t3, power is supplied from the first DC power supply 11. That is, at time t2, the switching elements 8b and 8c of the second switching circuit 8 are turned on at the same time, and are kept in an ON state until time t3. FIG. 20 and FIG. 21 show the current flows during this period.

On the third winding 6c of the transformer 6, the output voltage Vtr3 determined by the total voltage of the capacitors 10a and 10b and the turns ratio between the second winding 6b and the third winding 6c is applied upward as indicated by an arrow in FIG. 21, and then, via the smoothing capacitor 15 and the inverter 17, power is supplied to the load device connected to the load device connection end 21.

In addition, on the fourth windings 6d1 and 6d2 of the transformer 6, the voltage determined by the total voltage of the capacitors 10a and 10b and the turns ratio between the second winding 6b and the fourth windings 6d1 and 6d2 is applied, the applied voltage is rectified to be the voltage Vtr4, and then, via the switching element 33, the flyback diode 36, and the reactor 31, power is supplied to the second DC power supply 34.

Further, on the first winding 6a of the transformer 6, the output voltage Vtr1 determined by the total voltage of the capacitors 10a and 10b and the turns ratio between the second winding 6b and the first winding 6a is applied upward as indicated by an arrow in FIG. 20. At this time, if the voltage VL1 of the capacitor 3 is lower than the output voltage Vtr1, the first switching circuit 4 operates as a rectifier as shown in FIG. 20. On the other hand, if the voltage VL1 of the capacitor 3 is higher than the output voltage Vtr1, the current flow in the first switching circuit 4 as shown in FIG. 20 does not occur.

Figure 22:
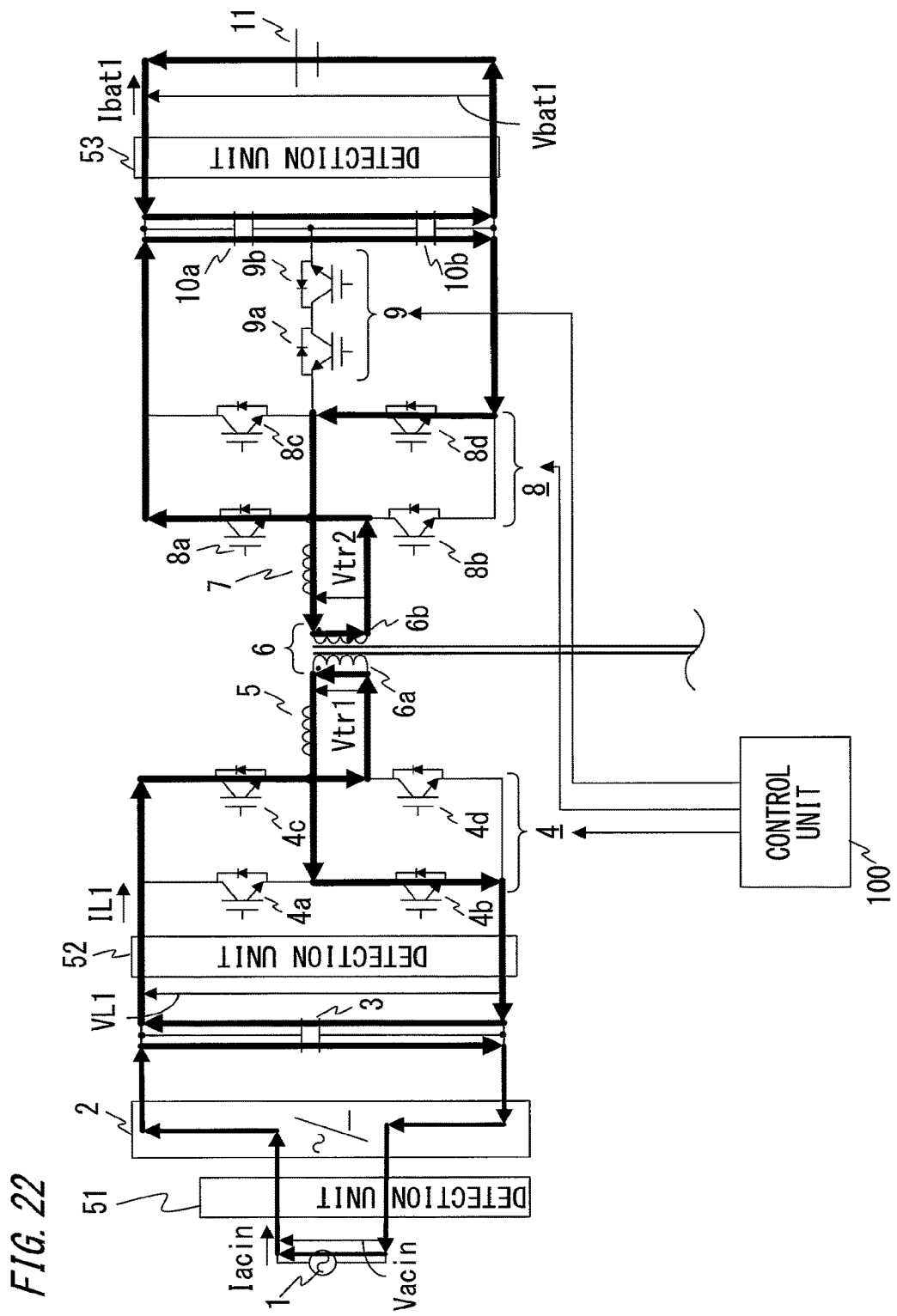
FIG. 22 is a diagram illustrating a current flow according to the switching pattern shown in FIG. 17.
Figure 23:
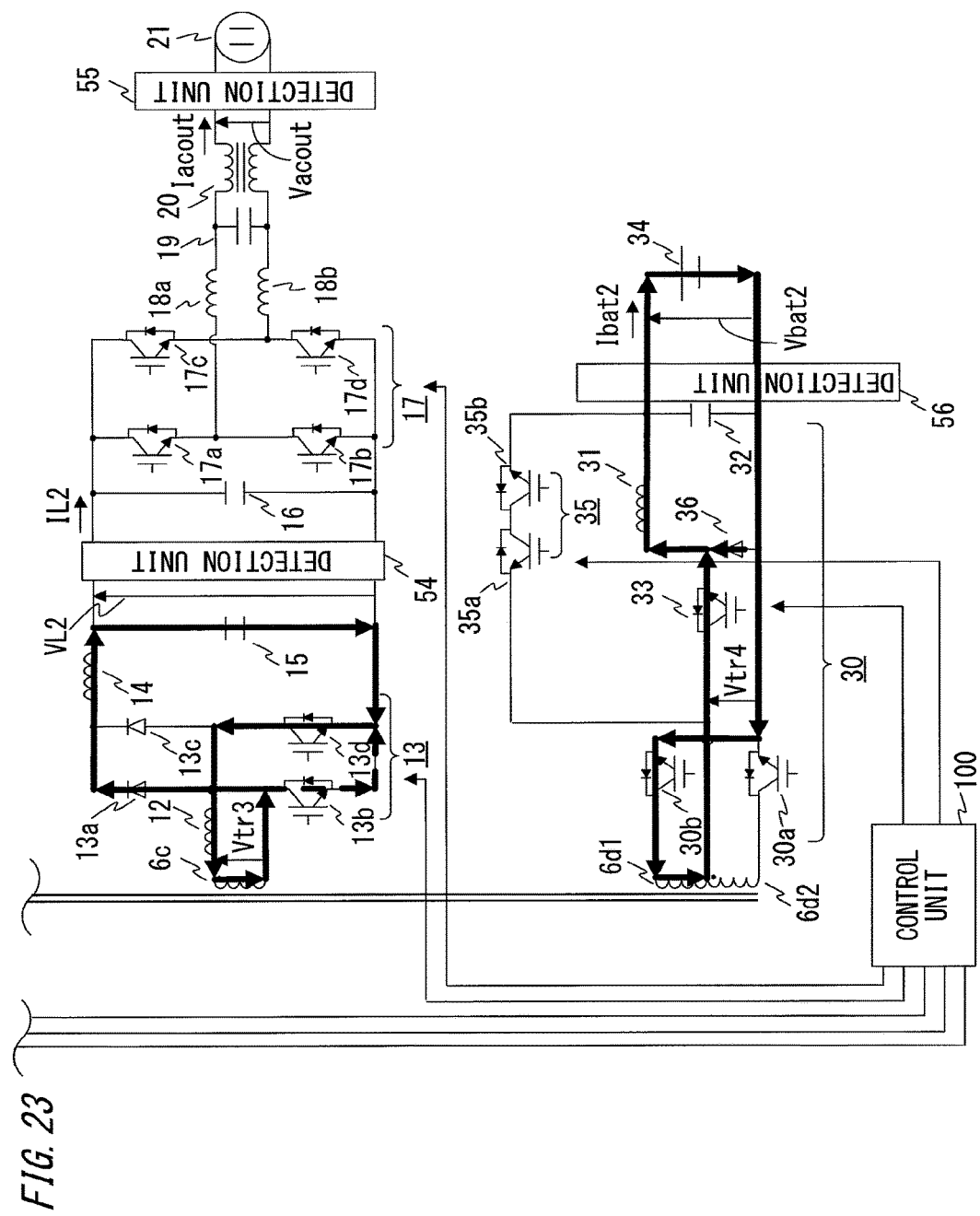
FIG. 23 is a diagram illustrating the current flow according to the switching pattern shown in FIG. 17.

Next, in FIG. 17, during the period from time t4 to time t5, power is supplied from the AC power supply 1. That is, at time t4, the switching elements 4b and 4c of the first switching circuit 4 are turned on at the same time, and are kept in an ON state until time t5. FIG. 22 and FIG. 23 show the current flows during this period.

On the third winding 6c of the transformer 6, the output voltage Vtr3 determined by the voltage VL1 of the capacitor 3 and the turns ratio between the first winding 6a and the third winding 6c is applied downward as indicated by an arrow in FIG. 23, and then, via the smoothing capacitor 15 and the inverter 17, power is supplied to the load device connected to the load device connection end 21.

In addition, on the fourth windings 6d1 and 6d2 of the transformer 6, the output voltage determined by the voltage VL1 of the capacitor 3 and the turns ratio between the first winding 6a and the fourth windings 6d1 and 6d2 is applied, the output voltage is rectified to be the voltage Vtr4, and then, via the switching element 33, the flyback diode 36, and the reactor 31, power is supplied to the second DC power supply 34.

Further, on the second winding 6b of the transformer 6, the output voltage Vtr2 determined by the voltage VL1 of the capacitor 3 and the turns ratio between the first winding 6a and the second winding 6b is applied downward as indicated by an arrow in FIG. 22. At this time, if the total voltage of the capacitors 10a and 10b is lower than the output voltage Vtr2, the second switching circuit 8 operates as a rectifier as shown in FIG. 22. On the other hand, if the total voltage of the capacitors 10a and 10b is higher than the output voltage Vtr2, the current flow in the second switching circuit 8 as shown in FIG. 22 does not occur.

Figure 24:
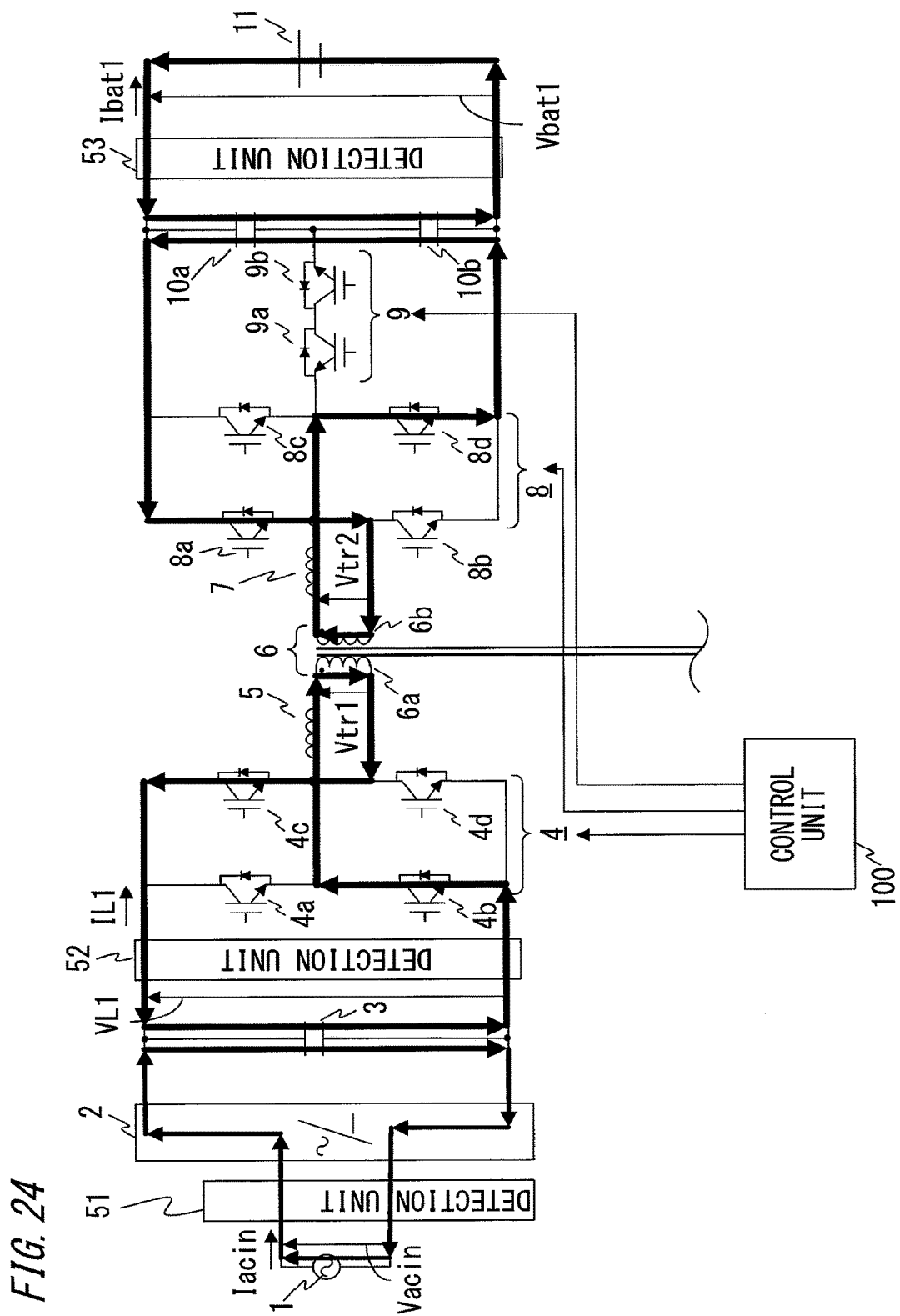
FIG. 24 is a diagram illustrating a current flow according to the switching pattern shown in FIG. 17.
Figure 25:
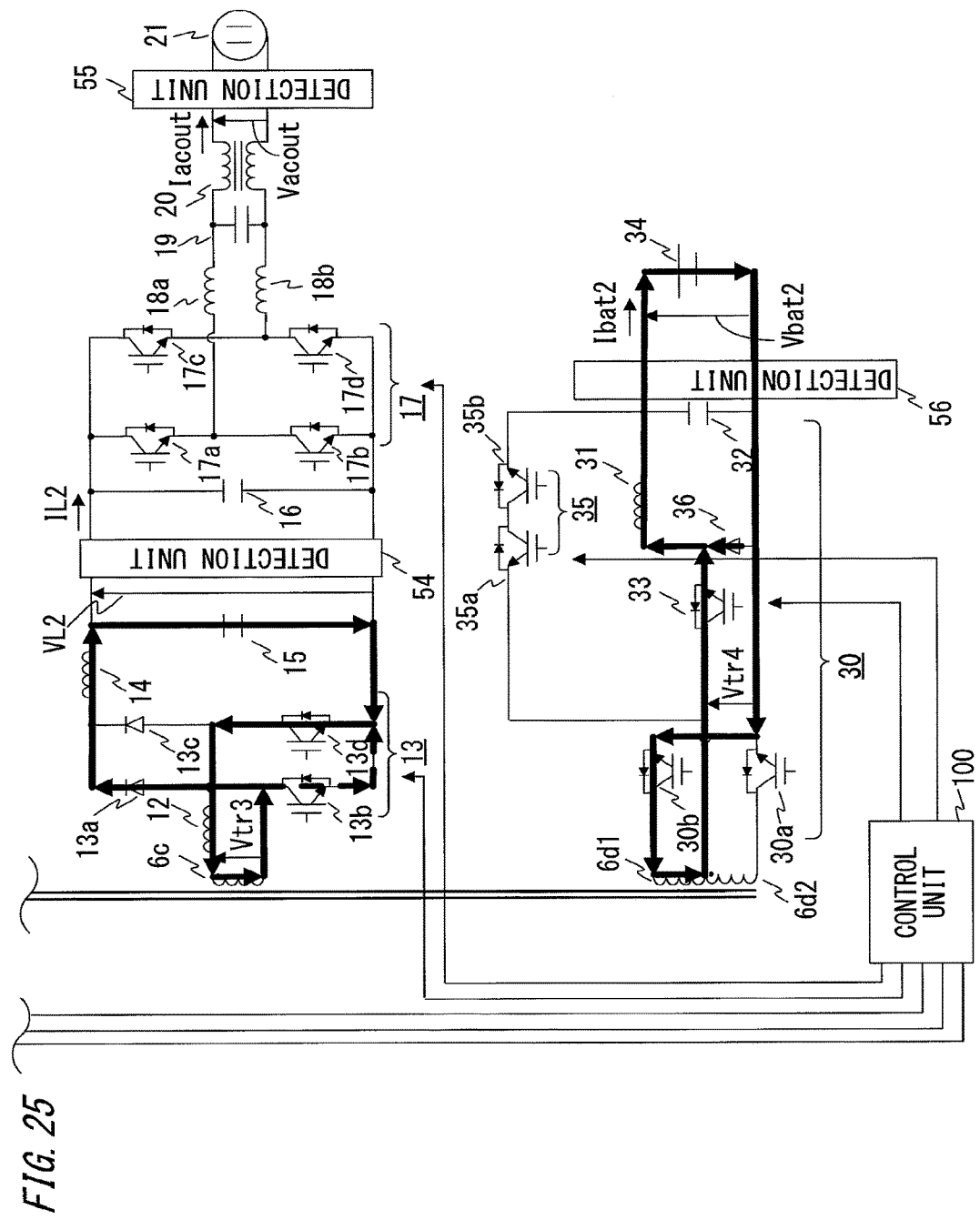
FIG. 25 is a diagram illustrating the current flow according to the switching pattern shown in FIG. 17.

Next, in FIG. 17, during the period from time t6 to time t7, power is supplied from the first DC power supply 11. That is, at time t6, the switching elements 8a and 8d of the second switching circuit 8 are turned on at the same time, and are kept in an ON state until time t7. FIG. 24 and FIG. 25 show the current flows during this period.

On the third winding 6c of the transformer 6, the output voltage Vtr3 determined by the total voltage of the capacitors 10a and 10b and the turns ratio between the second winding 6b and the third winding 6c is applied downward as indicated by an arrow in FIG. 25, and then, via the smoothing capacitor 15 and the inverter 17, power is supplied to the load device connected to the load device connection end 21.

In addition, on the fourth windings 6d1 and 6d2 of the transformer 6, the output voltage determined by the total voltage of the capacitors 10a and 10b and the turns ratio between the second winding 6b and the fourth windings 6d1 and 6d2 is applied, the output voltage is rectified to be the voltage Vtr4, and then, via the switching element 33, the flyback diode 36, and the reactor 31, power is supplied to the second DC power supply 34.

Further, on the first winding 6a of the transformer 6, the output voltage Vtr1 determined by the total voltage of the capacitors 10a and 10b and the turns ratio between the second winding 6b and the first winding 6a is applied downward as indicated by an arrow in FIG. 24. At this time, if the voltage VL1 of the capacitor 3 is lower than the output voltage Vtr1, the first switching circuit 4 operates as a rectifier as shown in FIG. 24. On the other hand, if the voltage VL1 of the capacitor 3 is higher than the output voltage Vtr1, the current flow in the first switching circuit 4 as shown in FIG. 24 does not occur.

At time t8, as in time to, the switching elements 4a and 4d of the first switching circuit 4 are turned on at the same time.

Also in the switching pattern shown in FIG. 17, as in the switching pattern shown in FIG. 7, the minimum repetitive period in which power is supplied in a temporally divided manner alternately from the AC power supply 1 and the first DC power supply 11, is defined as a switching period. That is, the period of time t0 to t4 and the period of time t4 to t8 in FIG. 17 are each defined as one switching period. In every one switching period, power is supplied at both positive and negative polarities to the transformer 6, and in the one switching period, power is supplied in a temporally divided manner alternately from both the first switching circuit 4 and the second switching circuit 8. Thus, as shown in FIG. 18 to FIG. 25, in any state, it is possible to achieve supply of power to the load while maintaining the continuity of current from the AC power supply 1 and the first DC power supply 11.

Figure 26:
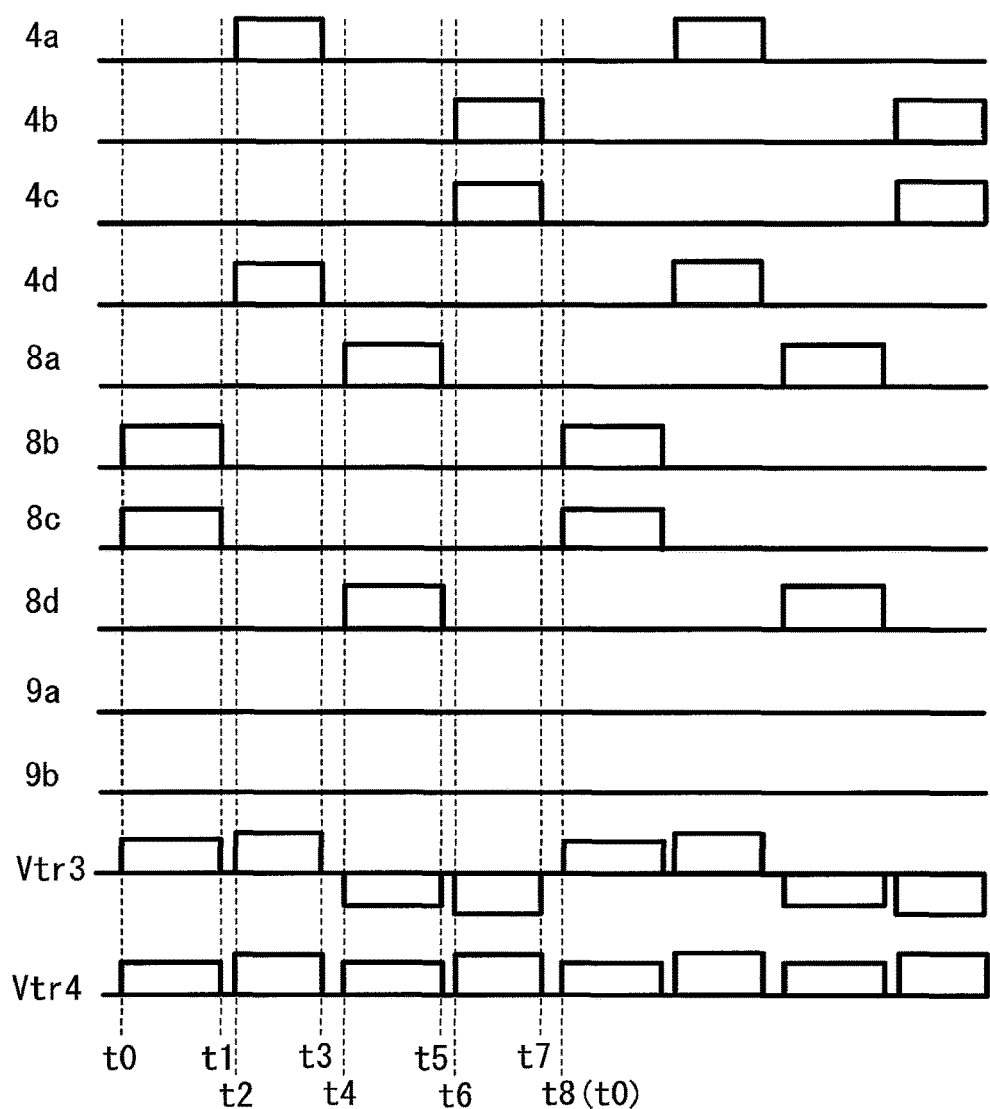
FIG. 26 is a diagram illustrating still another switching pattern for achieving the power flow shown in FIG. 3 and FIG. 4.

As shown in FIG. 26, even in the case where the timing of supplying power from the first switching circuit 4 and the timing of supplying power from the second switching circuit 8 are exchanged with each other, the same effect can be achieved. The current flows in this case are the same as those shown in FIG. 18 to FIG. 25, and therefore the description thereof is omitted here.

In any of the switching patterns shown in FIG. 7, FIG. 16, FIG. 17, and FIG. 26, in one switching period, supply of power from the AC power supply 1 via the AC/DC converter 2 and the first switching circuit 4 and supply of power from the first DC power supply 11 via the second switching circuit 8 are performed to the transformer 6 in a temporally divided manner. Thus, it becomes possible to supply power while maintaining the continuity of current from the AC power supply 1 and the first DC power supply 11 to the second DC power supply 34 and the load device connected to the load device connection end 21.

Block diagrams of power distribution control by the control unit 100 for executing the above switching patterns (FIG. 7, FIG. 16, FIG. 17, FIG. 26) are any of FIG. 27 to FIG. 32. The difference among controls based on FIG. 27 to FIG. 32 is as follows.

In the control shown in FIG. 27 and FIG. 28, the total ON time of the first switching circuit 4 and the second switching circuit 8 is made constant, and the voltage VL1 of the capacitor 3 is controlled by the ratio between the ON time of the first switching circuit 4 and the ON time of the second switching circuit 8.

Figure 29:
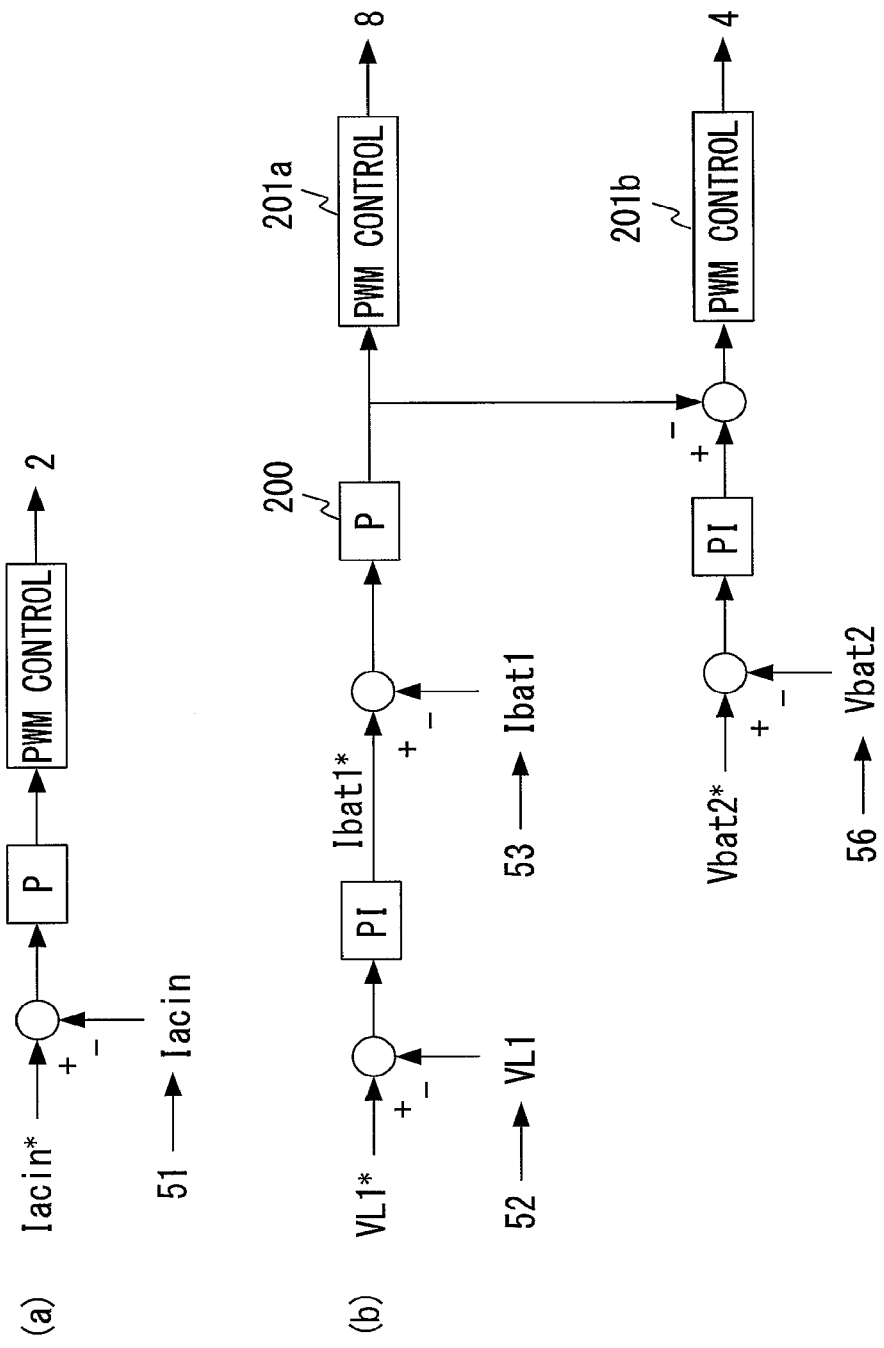
FIG. 29 is a diagram illustrating the control unit for achieving the power flow shown in FIG. 3 and FIG. 4.
Figure 30:
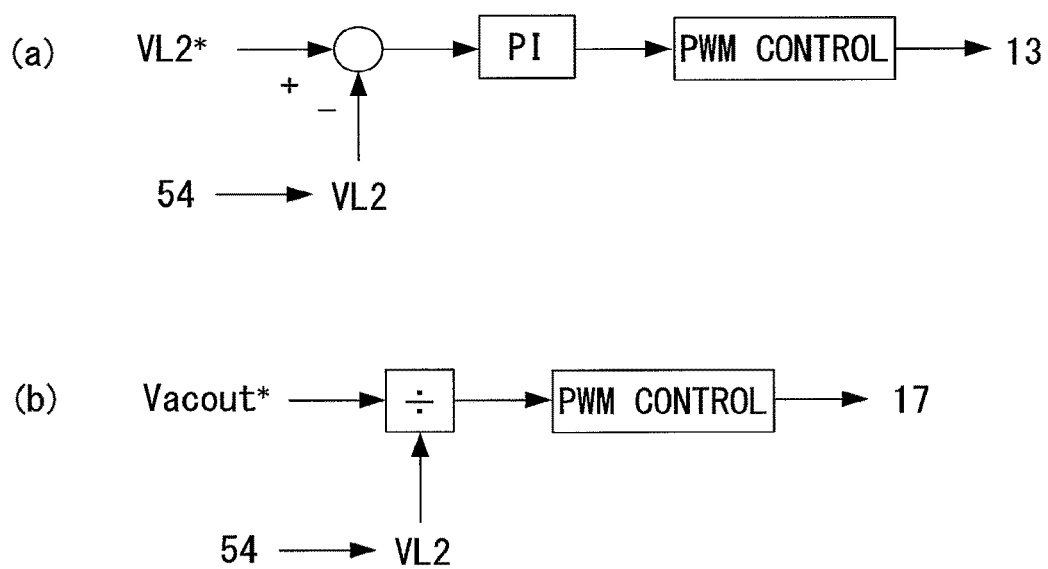
FIG. 30 is a diagram illustrating the control unit for achieving the power flow shown in FIG. 3 and FIG. 4.

In the control shown in FIG. 29 and FIG. 30, the total ON time of the first switching circuit 4 and the second switching circuit 8 is calculated from a constant-voltage control system for the second DC power supply 34, whereby the voltage Vbat2 of the second DC power supply 34 is controlled to be constant by the total ON time, and the voltage VL1 of the capacitor 3 is controlled by the ratio between their respective ON times.

Figure 31:
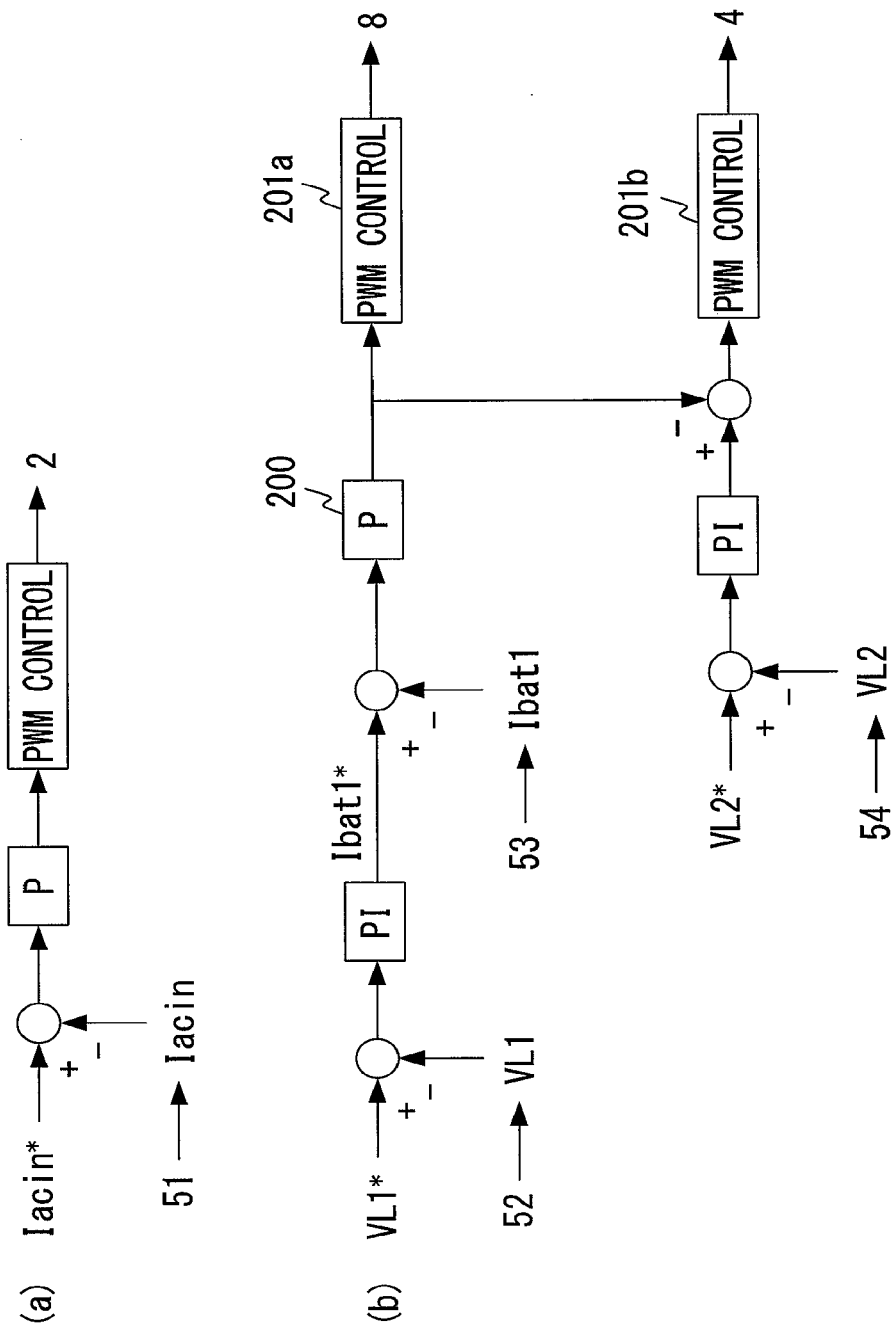
FIG. 31 is a diagram illustrating the control unit for achieving the power flow shown in FIG. 3 and FIG. 4.

In the control shown in FIG. 31 and FIG. 32, the total ON time of the first switching circuit 4 and the second switching circuit 8 is calculated from a constant-voltage control system for the smoothing capacitor 15, whereby the voltage VL2 of the smoothing capacitor 15 is controlled to be constant by the total ON time, and the voltage VL1 of the capacitor 3 is controlled by the ratio between their respective ON times.

Hereinafter, the details of the controls shown in FIG. 27 to FIG. 32 will be described.

In FIG. 27 and FIG. 28, for the AC/DC converter 2, the control unit 100 performs proportional control (P control) on a deviation between a current command value Iacin* for the AC power supply 1 and a current detected value Iacin from the voltage current detection unit 51, and then performs PWM control based on a result thereof, thereby supplying power at constant current to the capacitor 3. At the same time, the control unit 100 controls the AC current at a high power factor. Here, the current command value Iacin* for the AC power supply 1 may be arbitrarily set (FIG. 27(a)).

For the second switching circuit 8, the control unit 100 performs proportional integral control (PI control) on a deviation between a voltage command value VL1* for the capacitor 3 and the voltage detected value VL1 from a voltage current detection unit 52, to calculate a charge current command value Ibat1* for the first DC power supply 11. Next, the control unit 100 performs proportional control (P control) on a deviation between the charge current command value Ibat1* for the first DC power supply 11 and the current detected value Ibat1 from the voltage current detection unit 53, and then performs PWM control based on a result thereof, thereby operating the second switching circuit 8. At the same time, the control unit 100 calculates a difference between the output of the proportional control (P control) and a reference duty Dref, and then performs PWM control based on a result thereof, thereby operating the first switching circuit 4. Thus, the voltage VL1 of the capacitor 3 is controlled at constant voltage (FIG. 27(b)).

For the third switching circuit 13, the control unit 100 performs proportional integral control (PI control) on a deviation between a voltage command value VL2* for the smoothing capacitor 15 and the voltage detected value VL2 from the voltage current detection unit 54, and then performs PWM control based on a result thereof, thereby controlling the voltage VL2 of the smoothing capacitor 15 (FIG. 28(a)).

For the inverter 17, the control unit 100 performs PWM control using, as a modulation factor for a sinewave inverter, a quotient between a command value Vacout* for the output AC voltage and the voltage detected value VL2 from the voltage current detection unit 56, thereby outputting the AC voltage Vacout to the load device connection end 21 (FIG. 28(b)).

The control unit 100 performs the following control for the step-down chopper circuit which is the switching circuit between the second DC power supply 34 and the transformer 6. That is, the control unit 100 performs proportional integral control (PI control) on a deviation between a voltage command value Vbat2* for the second DC power supply 34 and the voltage detected value Vbat2 from the voltage current detection unit 56, and then performs PWM control based on a result thereof, thereby driving the switch 33 to perform charge voltage control for the second DC power supply 34 (FIG. 28(c)).

Here, by arbitrarily changing the current command value Iacin* for the AC power supply 1, the ratio between the supply power P1 from the AC power supply 1 and the supply power P2 from the first DC power supply 11 can be arbitrarily controlled. In this control, the total ON time of the first switching circuit 4 and the second switching circuit 8 is made constant, and the voltage VL1 of the capacitor 3 is controlled by the ratio between their respective ON times. The total ON time of the first switching circuit 4 and the second switching circuit 8 is defined by the reference duty Dref and can be arbitrarily set.

Next, in FIG. 29 and FIG. 30, for the AC/DC converter 2, the control unit 100 performs proportional control (P control) on a deviation between a current command value Iacin* for the AC power supply 1 and the current detected value Iacin from the voltage current detection unit 51, and then performs PWM control based on a result thereof, thereby supplying power at constant current to the capacitor 3. At the same time, the control unit 100 controls the AC current at a high power factor. Here, the current command value Iacin* for the AC power supply 1 may be arbitrarily set (FIG. 29(a)).

For the second switching circuit 8, the control unit 100 performs proportional integral control (PI control) on a deviation between a voltage command value VL1* for the capacitor 3 and the voltage detected value VL1 from the voltage current detection unit 52, to calculate a charge current command value Ibat1* for the first DC power supply 11. Next, the control unit 100 performs proportional control (P control) on a deviation between the charge current command value Ibat1* for the first DC power supply 11 and the current detected value Ibat1 from the voltage current detection unit 53, and then performs PWM control based on a result thereof, thereby operating the second switching circuit 8. At the same time, the control unit 100 performs proportional integral control (PI control) on a deviation between a voltage command value Vbat2* for the second DC power supply 34 and the voltage detected value Vbat2 from the voltage current detection unit 56. Then, the control unit 100 calculates a deviation between the output of this PI control and the output of the P control calculated above, and then performs PWM control based on a result thereof, thereby operating the first switching circuit 4. Thus, while the voltage VL1 of the capacitor 3 is controlled at constant voltage, the voltage Vbat2 of the second DC power supply 34 is controlled at constant voltage (FIG. 29(b)).

For the third switching circuit 13, the control unit 100 performs proportional integral control (PI control) on a deviation between a voltage command value VL2* for the smoothing capacitor 15 and the voltage detected value VL2 from the voltage current detection unit 54, and then performs PWM control based on a result thereof, thereby controlling the voltage VL2 of the smoothing capacitor 19 (FIG. 30(a)).

For the inverter 17, the control unit 100 performs PWM control using, as a modulation factor for a sinewave inverter, a quotient between a command value Vacout* for the output AC voltage and the voltage detected value VL2 from the voltage current detection unit 56, thereby outputting the AC voltage Vacout to the load device connection end 21 (FIG. 30(b)).

Here, by arbitrarily changing the current command value Iacin* for the AC power supply 1, the ratio between the supply power P1 from the AC power supply 1 and the supply power P2 from the first DC power supply 11 can be arbitrarily controlled. In this control, the total ON time of the first switching circuit 4 and the second switching circuit 8 is calculated from a constant-voltage control system for the second DC power supply 34, whereby the voltage Vbat2 of the second DC power supply 34 is controlled to be constant by the total ON time, and the voltage VL1 of the capacitor 3 is controlled by the ratio between the ON time of the first switching circuit 4 and the ON time of the second switching circuit 8.

Next, in FIG. 31 and FIG. 32, for the AC/DC converter 2, the control unit 100 performs proportional control (P control) on a deviation between a current command value Iacin* for the AC power supply 1 and the current detected value Iacin from the voltage current detection unit 51, and then performs PWM control based on a result thereof, thereby supplying power at constant current to the capacitor 3. At the same time, the control unit 100 controls the AC current at a high power factor. Here, the current command value Iacin* for the AC power supply 1 may be arbitrarily set (FIG. 31(a)).

For the second switching circuit 8, the control unit 100 performs proportional integral control (PI control) on a deviation between a voltage command value VL1* for the capacitor 3 and the voltage detected value VL1 from the voltage current detection unit 52, to calculate a charge current command value Ibat1* for the first DC power supply 11. Next, the control unit 100 performs proportional control (P control) on a deviation between the charge current command value Ibat1* for the first DC power supply 11 and the current detected value Ibat1 from the voltage current detection unit 53, and then performs PWM control based on a result thereof, thereby operating the second switching circuit 8. At the same time, the control unit 100 performs proportional integral control (PI control) on a deviation between a voltage command value VL2* for the smoothing capacitor 15 and the voltage detected value VL2 from the voltage current detection unit 54. Then, the control unit 100 calculates a deviation between the output of this PI control and the output of the P control calculated above, and then performs PWM control based on a result thereof, thereby operating the first switching circuit 4. Thus, while the voltage VL1 of the capacitor 3 is controlled at constant voltage, the voltage VL2 of the smoothing capacitor 15 is controlled to be constant (FIG. 31(b)).

For the inverter 17, the control unit 100 performs PWM control using, as a modulation factor for a sinewave inverter, a quotient between a command value Vacout* for the output AC voltage and the voltage detected value VL2 from the voltage current detection unit 56, thereby outputting the AC voltage Vacout to the load device connection end 21 (FIG. 32(a)).

The control unit 100 performs the following control for the step-down chopper circuit which is the switching circuit between the second DC power supply 34 and the transformer 6. That is, the control unit 100 performs proportional integral control (PI control) on a deviation between a voltage command value Vbat2* for the second DC power supply 34 and the voltage detected value Vbat2 from the voltage current detection unit 56, and then performs PWM control based on a result thereof, thereby driving the switch 33 to perform charge voltage control for the second DC power supply 34 (FIG. 32(b)).

Here, by arbitrarily changing the current command value Iacin* for the AC power supply 1, the ratio between the supply power P1 from the AC power supply 1 and the supply power P2 from the first DC power supply 11 can be arbitrarily controlled. In this control, the total ON time of the first switching circuit 4 and the second switching circuit 8 is calculated from a constant-voltage control system for the smoothing capacitor 15, whereby the voltage VL2 of the smoothing capacitor 15 is controlled to be constant by the total ON time, and the voltage VL1 of the capacitor 3 is controlled by the ratio between the ON time of the first switching circuit 4 and the ON time of the second switching circuit 8.

The power flows that can be achieved by the controls shown in FIG. 27 to FIG. 32 are the same. However, in the control shown in FIG. 29 and FIG. 30, since the switching element 33 is merely kept in an ON state, the switching element 33 and the flyback diode 36 are not necessary. In the controls shown in FIG. 31 and FIG. 32, since the third switching circuit 13 merely performs rectification operation, the switching elements 13b and 13d can be configured as diodes. Therefore, simplification of the control unit such as a microcomputer can be achieved.

In the controls shown in FIG. 27 to FIG. 32, constant current charge control is performed for the first DC power supply 11, and constant voltage charge control is performed for the second DC power supply 34. However, any charging method may be used for each of the first DC power supply 11 and the second DC power supply 34, and therefore it is possible to employ an appropriate charging method in accordance with each DC power supply. For example, the first DC power supply 11 may be charged at constant voltage, and the second DC power supply 34 may be charged at constant current.

By performing operation under the controls shown in FIG. 27 to FIG. 32, voltage of the capacitor 3 is always controlled in the power flow in which the first DC power supply 11 is discharged, when the AC power supply 1 is not connected. Thus, the capacitor 3 can be protected from voltage increase.

As described above, in the present embodiment 1, since the above power distribution can be performed, the usage rate of the AC power supply 1 is dramatically improved. That is, in the case of performing the above power distribution, if power consumption in one of the loads increases and power consumed in the load cannot be covered by only the input power from the AC power supply 1, the first DC power supply 11 supplies only power corresponding to a difference between the power consumed in the load and the input power from the AC power supply 1, while the power input from the AC power supply 1 is maintained. Thus, it is possible to utilize the input power from the AC power supply 1 to the maximum extent while minimizing discharge of power charged in the first DC power supply 11. Therefore, power saving can be achieved as compared to the case of using only power from the first DC power supply 11 charged from the AC power supply 1.

In the above description, in one switching period, supply of power from the AC power supply 1 via the AC/DC converter 2 and the first switching circuit 4, and supply of power from the first DC power supply 11 via the second switching circuit 8, are performed in a temporally divided manner. However, without limitation thereto, it is also possible that, as shown in FIG. 5 and FIG. 6, in one switching period, supply of power from the AC power supply 1 via the AC/DC converter 2 and the first switching circuit 4, and supply of power from the second DC power supply 34 via the fourth switching circuit 30, are performed in a temporally divided manner.

In this case, the switch 33 operates so as to make the voltage VL1 of the capacitor 3 constant, and the second switching circuit 8 is controlled so as to make voltage or current of the first DC power supply 11 constant. By such control, operation is performed so that, while constant input power P1_in is received from the AC power supply 1, if the input power P1_in alone is insufficient for outputting the supply power P3_out having the AC voltage Vacout and the charge power P2_out for the first DC power supply 11, power (supply power P4_in) for the insufficient power is supplied from the second DC power supply 34.

In one switching period, all of the AC power supply 1, the first DC power supply 11, and the second DC power supply 34 may be used as power supplies. The operation in this case can be achieved by increasing the division number of the temporal divisions within one switching period. Further, even if a plurality of power supplies are connected, the same effect can be achieved by dividing one switching period in accordance with the number of power supplies to be transmitted.

The AC power supply 1 and the AC/DC converter 2 in the above description may be replaced with a DC voltage source. In this case, the same effect as in the above control is obtained by providing a reactor between the replacement DC voltage source and the capacitor 3. In the case where the AC power supply 1 and the AC/DC converter 2 are replaced with a DC voltage source, the first switching circuit 4 connected to the DC voltage source is, in the claims, referred to as a second switching circuit connected to a DC power supply.

The second switching circuit 8 is capable of bidirectional power transmission, and has the switching elements 8a to 8d configured in a bridge form and each having a switching element and a diode connected in antiparallel to the switching element. In this case, even if the amount of power received by the first DC power supply 11 is attempted to be controlled by PWM control, rectification is performed by the diodes connected in a bridge form, and therefore the amount of charging for the first DC power supply 11 cannot be controlled. Therefore, in the present embodiment, the step-up coil 7 is provided between the second winding 6b and the second switching circuit 8, and when the first DC power supply 11 is charged, output voltage of the second winding 6b of the transformer 6 is set to be lower than voltage of the first DC power supply 11, and the second switching circuit 8 is caused to function as a step-up chopper.

As described above, in the case where the second switching circuit connected to the DC power supply is capable of bidirectional power transmission and has a bridge configuration using switching elements and diodes connected in antiparallel to the switching elements, the second switching circuit only needs to have a step-up function when power is transmitted from the second switching circuit to the DC power supply.

In the case where the second switching circuit connected to the DC power supply is capable of bidirectional power transmission and has a bridge configuration using switching elements and diodes connected in antiparallel to the switching elements, instead of causing the second switching circuit to have a step-up function, a DC/DC converter may be provided between the second switching circuit and the DC power supply, and when power is transmitted from the second switching circuit to the DC power supply, charging for the DC power supply may be stopped by the DC/DC converter.

A part of the fourth switching circuit 30 forms a rectification circuit by the switching elements 30a and 30b being connected to the respective ends of the fourth windings 6d1 and 6d2 of the transformer 6 which are configured in a center-tap form. In addition, a part of the fourth switching circuit 30 forms a step-down chopper, i.e., a DC/DC converter by being provided with the switching element 33, the flyback diode 36, and the smoothing coil 31. That is, as described in claim 8 of the claims, the fourth switching circuit 30 has a function of rectifying voltage occurring on the winding of the transformer and controlling the voltage or current.

In the fourth switching circuit 30, the switching element 33, the flyback diode 36, and the smoothing coil 31, i.e., the DC/DC converter part may be removed, so that the fourth switching circuit 30 has only a function as a rectification circuit. In this case, as described in claim 7 of the claims, the fourth switching circuit 30 becomes a rectification circuit.

Claim 7 and claim 8 are described from the perspective of regarding the second DC power supply 34 as a load device, but as described above, the second DC power supply 34 has also a function of supplying power to the load side, as a power supply source.

Embodiment 2

Figure 33:
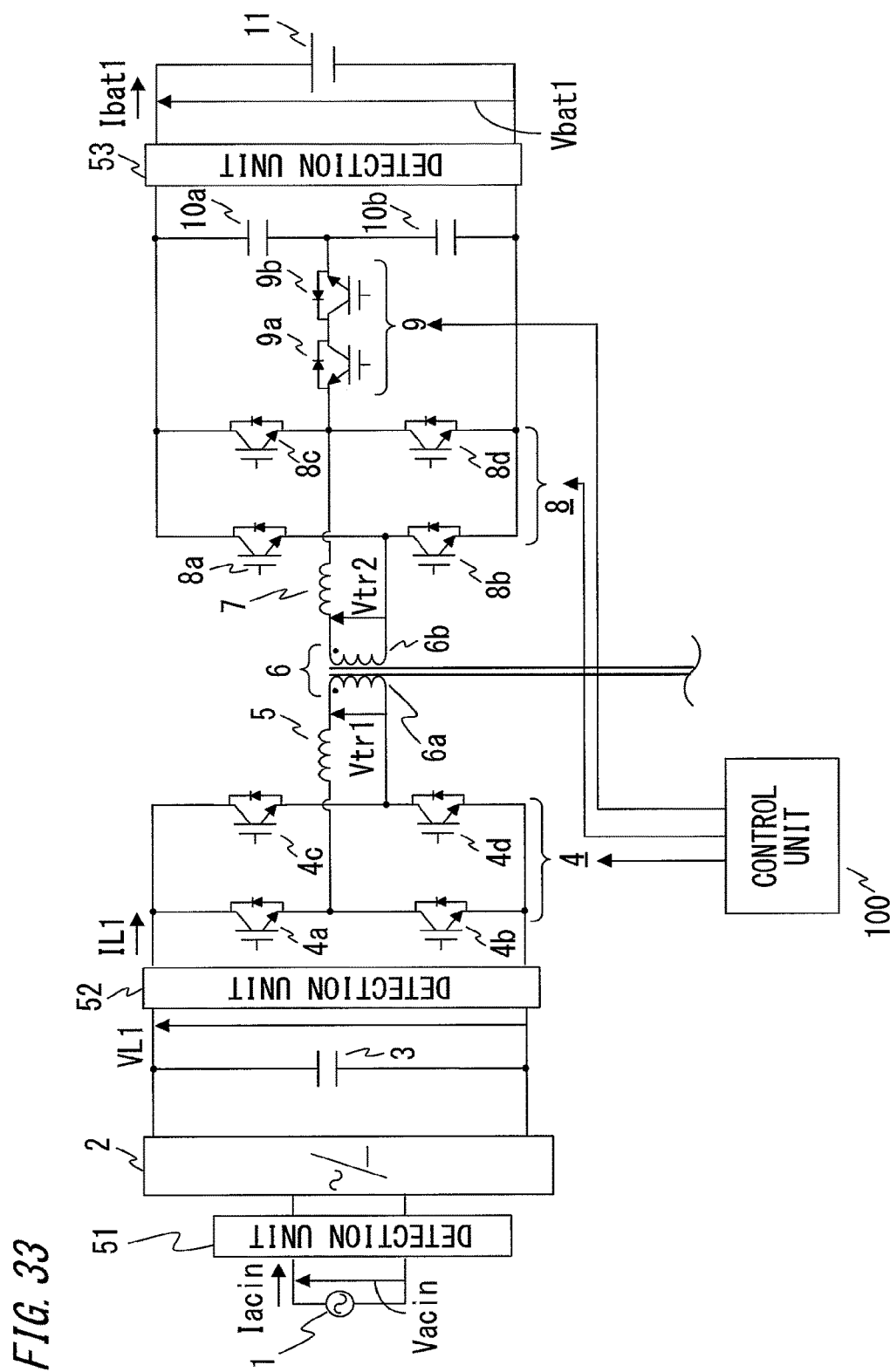
FIG. 33 is a circuit configuration diagram of an electric power conversion device according to embodiment 2 of the present invention.
Figure 34:
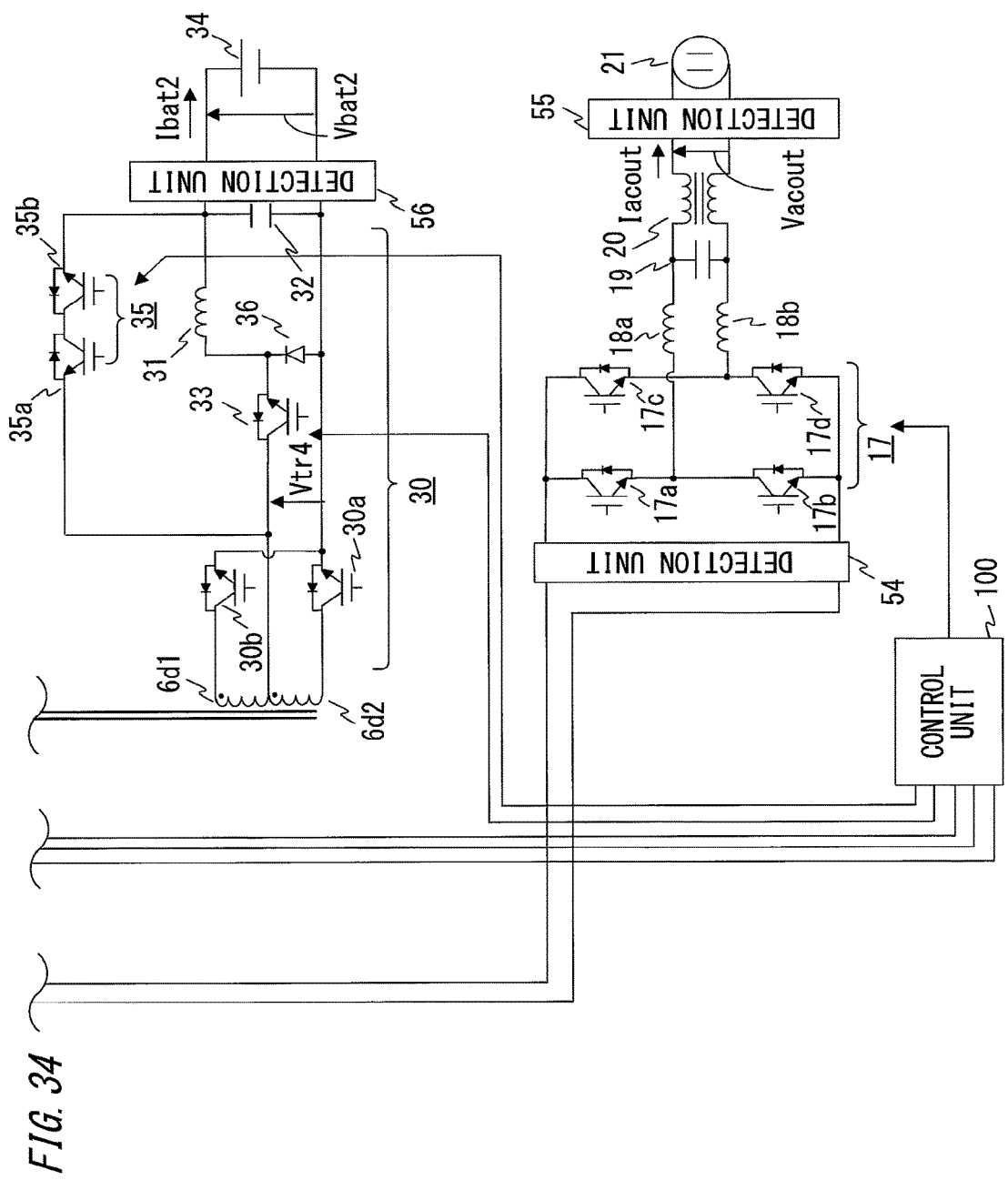
FIG. 34 is a circuit configuration diagram of the electric power conversion device according to embodiment 2 of the present invention.

FIG. 33 and FIG. 34 are circuit configuration diagrams of an electric power conversion device according to embodiment 2 of the present invention. In these figures, the components that correspond to or are the same as those in embodiment 1 shown in FIG. 1 and FIG. 2 are denoted by the same reference characters.

A configuration feature of the present embodiment 2 is that the DC input end of the inverter 17 composed of the four switching elements 17a to 17dc is connected to the output end side of the AC/DC converter 2, in parallel with the first switching circuit 4 via the voltage current detection unit 54. To the AC output end of the inverter 17, the smoothing coils 18a and 18b, the smoothing capacitor 19, the common mode choke coil 20, the voltage current detection unit 55, and the load device connection end 21 are connected in this order. At the load device connection end 21, the AC voltage Vacout for the AC load (not shown) is generated.

The other configuration is basically the same as in embodiment 1. Therefore, the corresponding components are denoted by the same reference characters and the detailed description thereof is omitted. The operations of the first switching circuit 4, the second switching circuit 8, the fourth switching circuit 30, the inverter 17, and the like are also basically the same as in embodiment 1, and therefore the detailed description thereof is omitted here.

Figure 35:
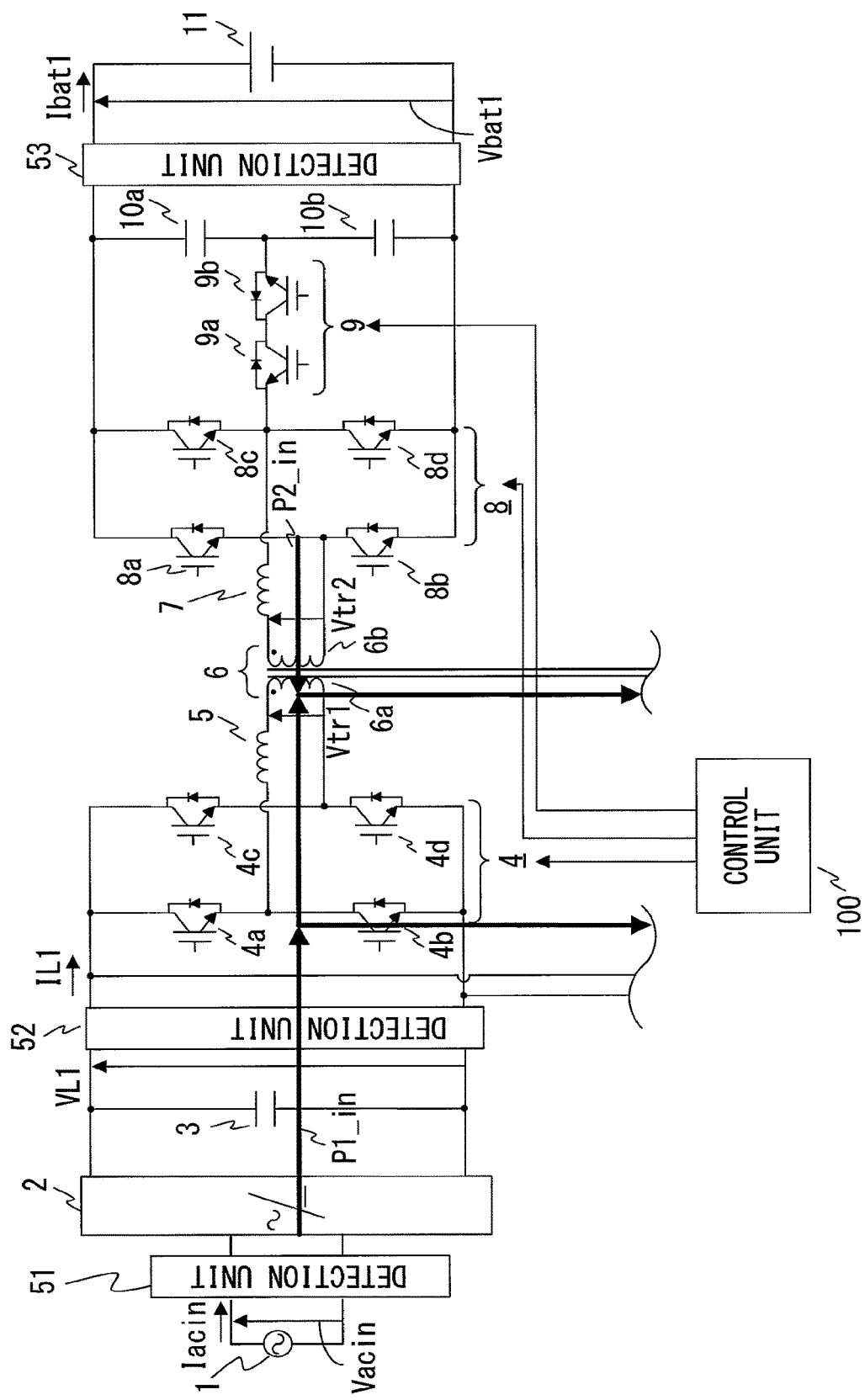
FIG. 35 is a diagram illustrating a power flow in the electric power conversion device according to embodiment 2 of the present invention.
Figure 36:
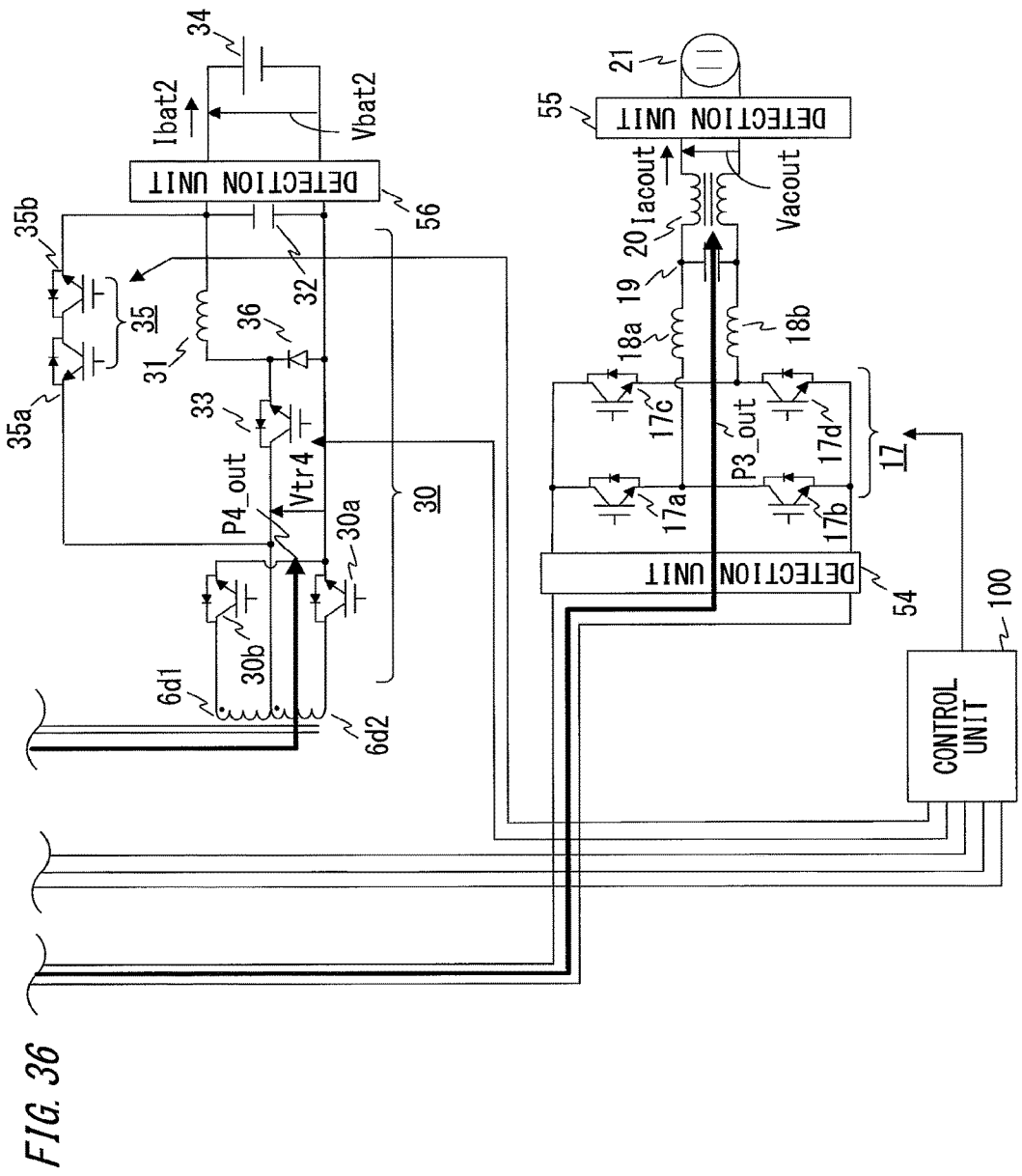
FIG. 36 is a diagram illustrating the power flow in the electric power conversion device according to embodiment 2 of the present invention.

As shown in FIG. 35 and FIG. 36, for example, in such a case where a private power generator is used as the AC power supply 1, if power supplied from the AC power supply 1 is insufficient and therefore the AC power supply 1 and the first DC power supply 11 are both used as power supply sources, supply power P1_in from the AC power supply 1 and supply power P2_in from the first DC power supply 11 are distributed into supply power P3_out for the AC load connected to the load device connection end 21, and charge power P4_out for the second DC power supply 34.

Figure 37:
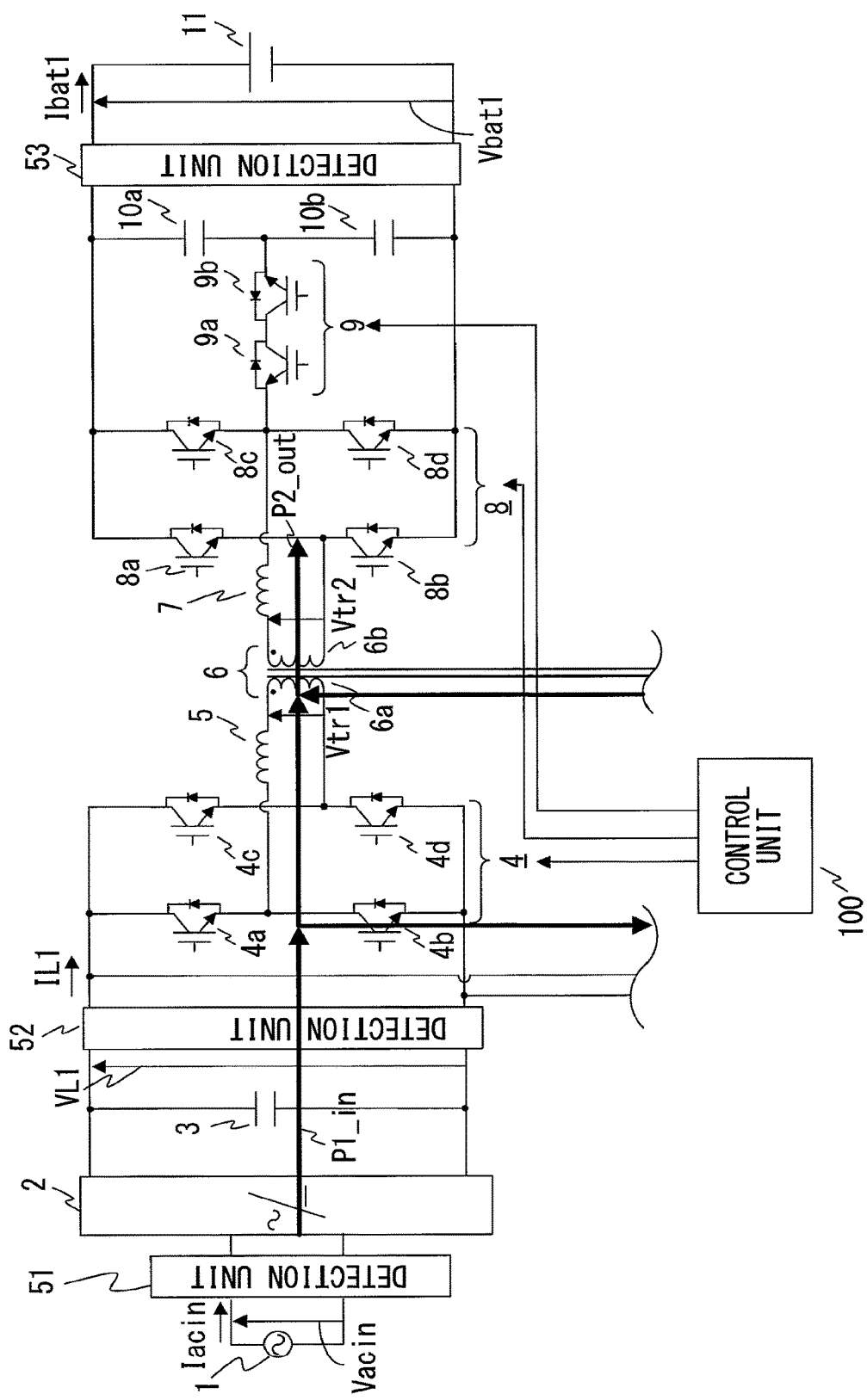
FIG. 37 is a diagram illustrating another power flow in the electric power conversion device according to embodiment 2 of the present invention.
Figure 38:
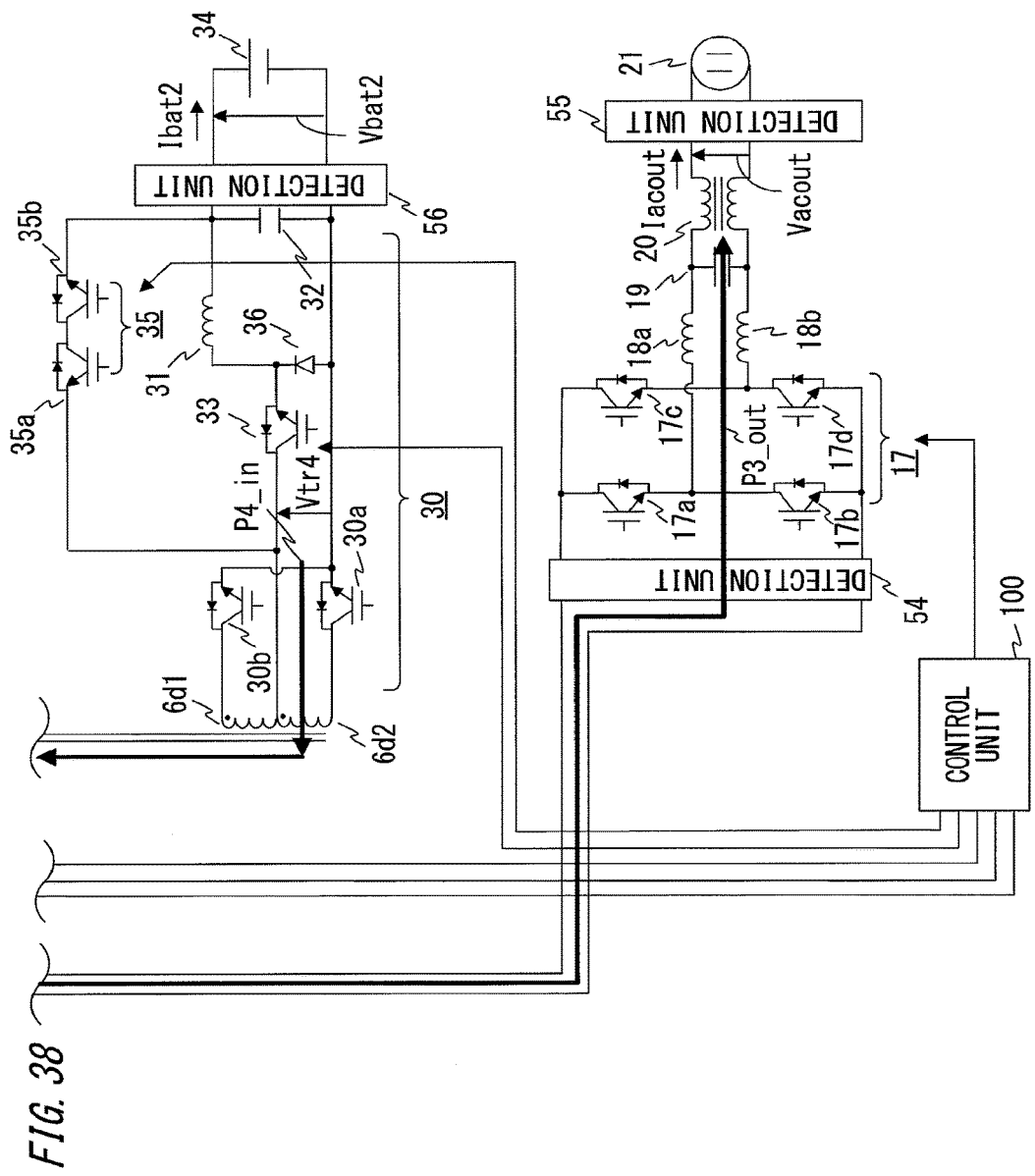
FIG. 38 is a diagram illustrating the other power flow in the electric power conversion device according to embodiment 2 of the present invention.

As shown in FIG. 37 and FIG. 38, for example, in such a case where a private power generator is used as the AC power supply 1, if power supplied from the AC power supply 1 is insufficient and the charge amount of the first DC power supply 11 is insufficient, and therefore the AC power supply 1 and the second DC power supply 34 are both used as power supply sources, supply power P1_in from the AC power supply 1 and supply power P4_in from the second DC power supply 34 are distributed into charge power P2_out for the first DC power supply 11 and supply power P3_out for the AC load connected to the load device connection end 21.

Figure 39:
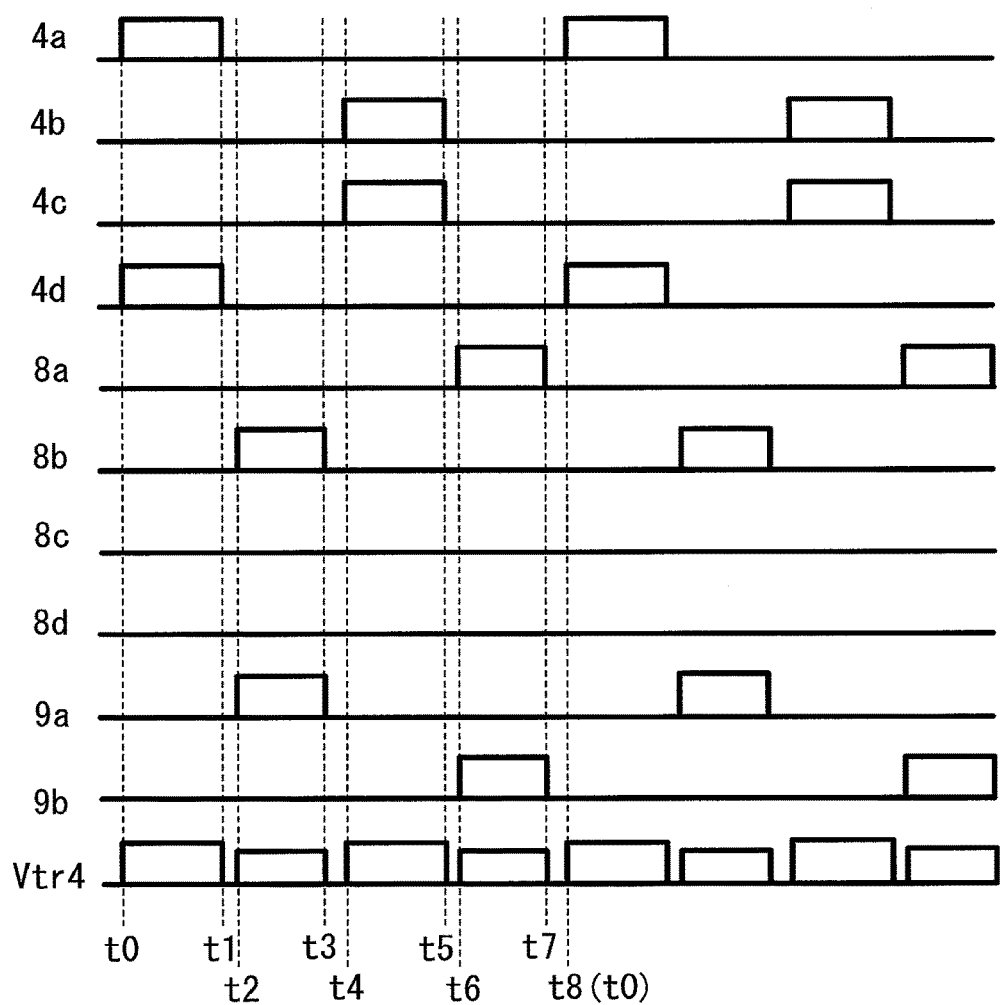
FIG. 39 is a diagram illustrating a switching pattern for achieving the power flow shown in FIG. 35 and FIG. 36.

A switching pattern for achieving the power flow shown in FIG. 35 and FIG. 36, i.e., for achieving supply of power using both the AC power supply 1 and the first DC power supply 11 as power supply sources, will be described below. The power flow in this case can be achieved by the switching pattern in FIG. 39. FIG. 39 is a switching pattern for causing the second switching circuit 8 to perform half-bridge operation to discharge the first DC power supply 11.

FIG. 39 shows: gate signals for the switching elements 4a to 4d of the first switching circuit 4; gate signals for the switching elements 8a to 8d of the second switching circuit 8; gate signals for the switching elements 9a and 9b composing the switch 9; and the voltage Vtr4 obtained by rectifying the output voltage of the fourth windings 6d1 and 6d2, on the load side with respect to the transformer 6. FIG. 40 to FIG. 47 show current flows occurring by the switching pattern in FIG. 39. In these cases, it is assumed that the AC power supply 1 operates in a positive-half-wave manner. However, even in the case of negative half wave, the same operation is performed.

Figure 40:
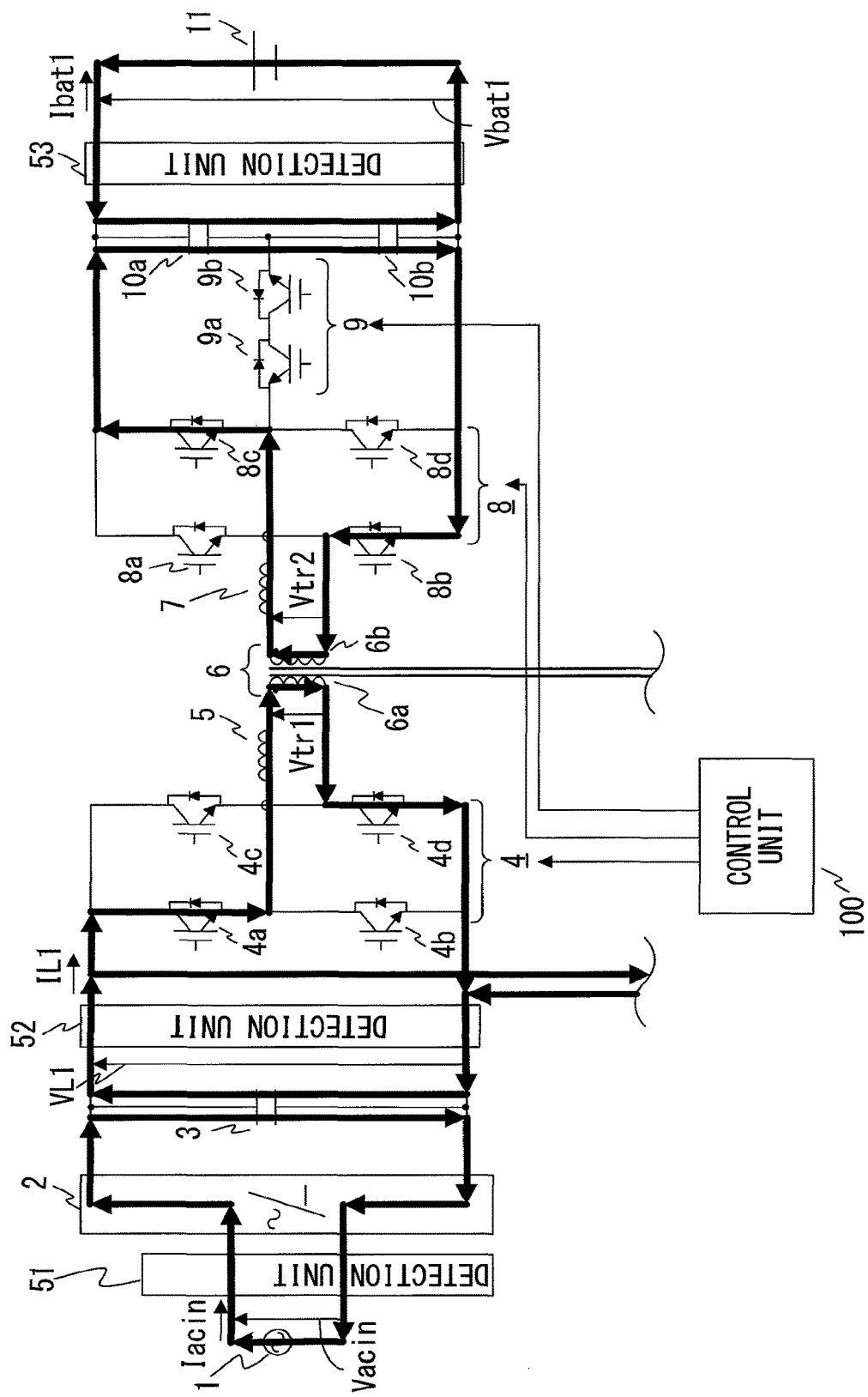
FIG. 40 is a diagram illustrating a current flow according to the switching pattern shown in FIG. 39.
Figure 41:
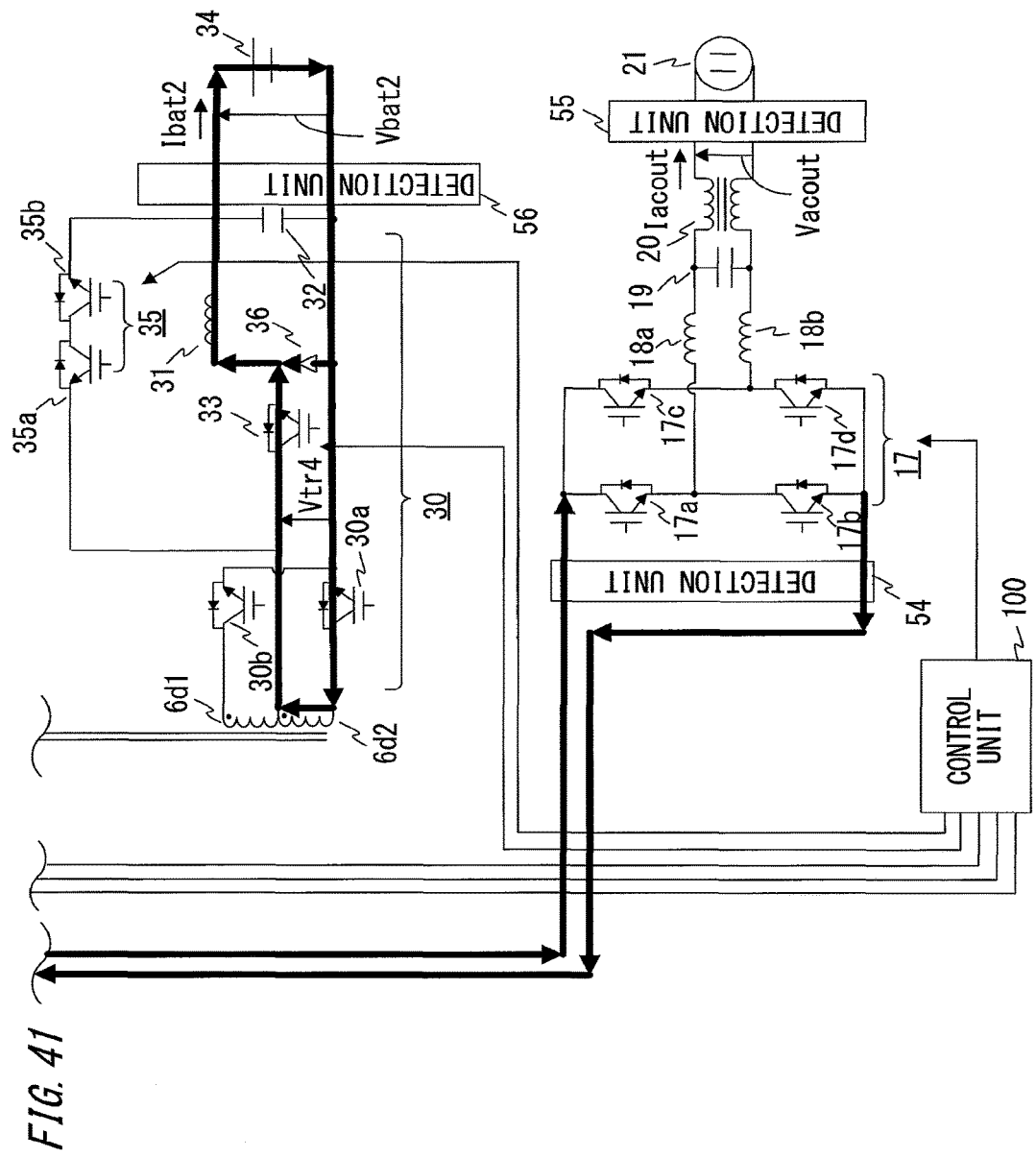
FIG. 41 is a diagram illustrating the current flow according to the switching pattern shown in FIG. 39.

In FIG. 39, during the period from time t0 to time t1, power is supplied from the AC power supply 1. That is, at time t0, the switching elements 4a and 4d of the first switching circuit 4 are turned on at the same time, and are kept in an ON state until time t1. FIG. 40 and FIG. 41 show the current flows during this period.

On the fourth windings 6d1 and 6d2 of the transformer 6, the output voltage determined by the voltage VL1 of the capacitor 3 and the turns ratio between the first winding 6a and the fourth windings 6d1 and 6d2 is applied, the output voltage is rectified to be the voltage Vtr4, and then, via the switching element 33, the flyback diode 36, and the reactor 31, power is supplied to the second DC power supply 34.

In addition, via the inverter 17, power is supplied to the load device connected to the load device connection end 21.

Further, on the second winding 6b of the transformer 6, the output voltage Vtr2 determined by the voltage VL1 of the capacitor 3 and the turns ratio between the first winding 6a and the second winding 6b is applied upward as indicated by an arrow in FIG. 40. At this time, if the total voltage of the capacitors 10a and 10b is lower than the output voltage Vtr2, the second switching circuit 8 operates as a rectifier as shown in FIG. 40. On the other hand, if the total voltage of the capacitors 10a and 10b is higher than the output voltage Vtr2, the current flow in the second switching circuit 8 shown in FIG. 40 does not occur.

Figure 42:
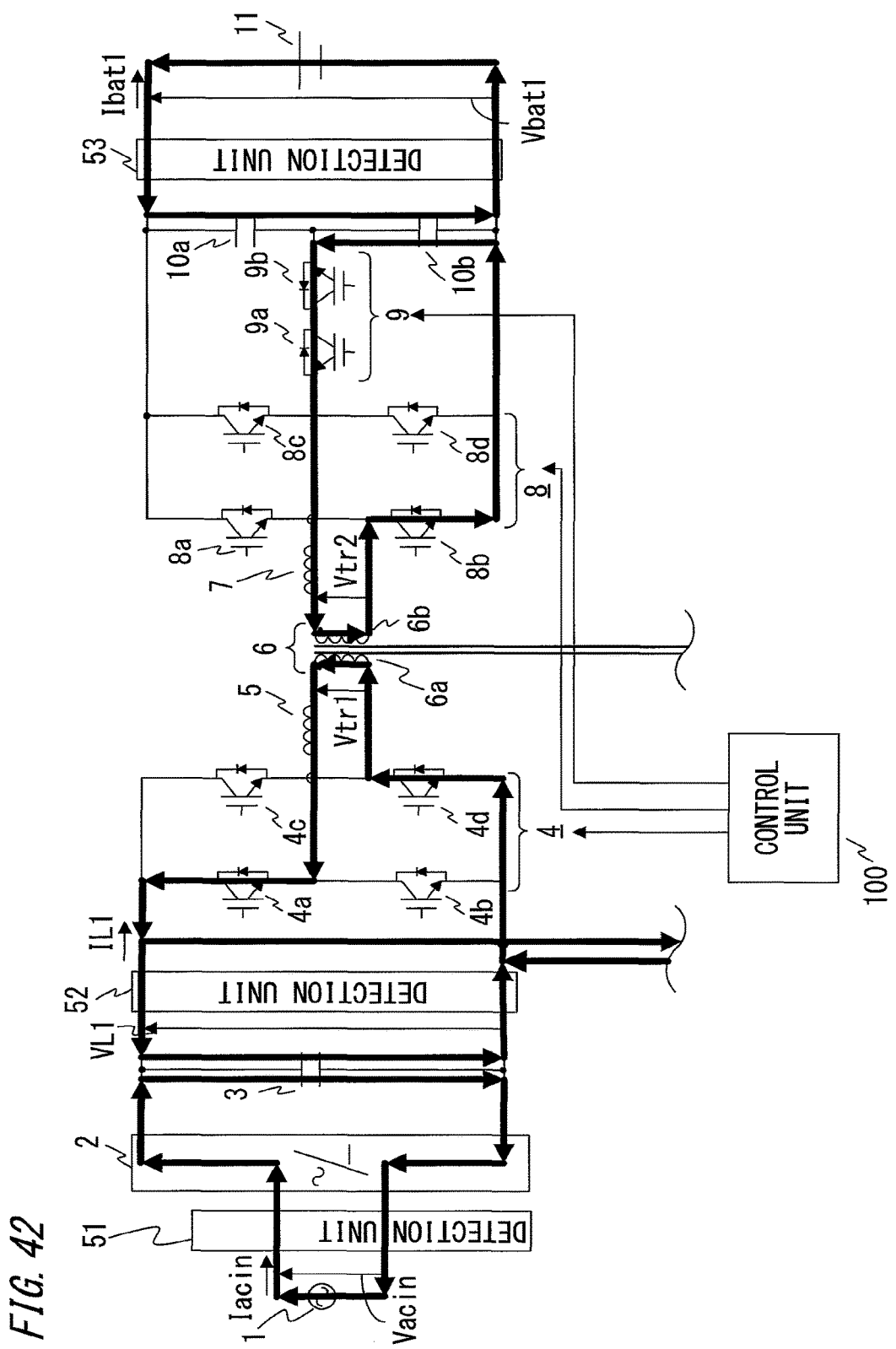
FIG. 42 is a diagram illustrating a current flow according to the switching pattern shown in FIG. 39.
Figure 43:
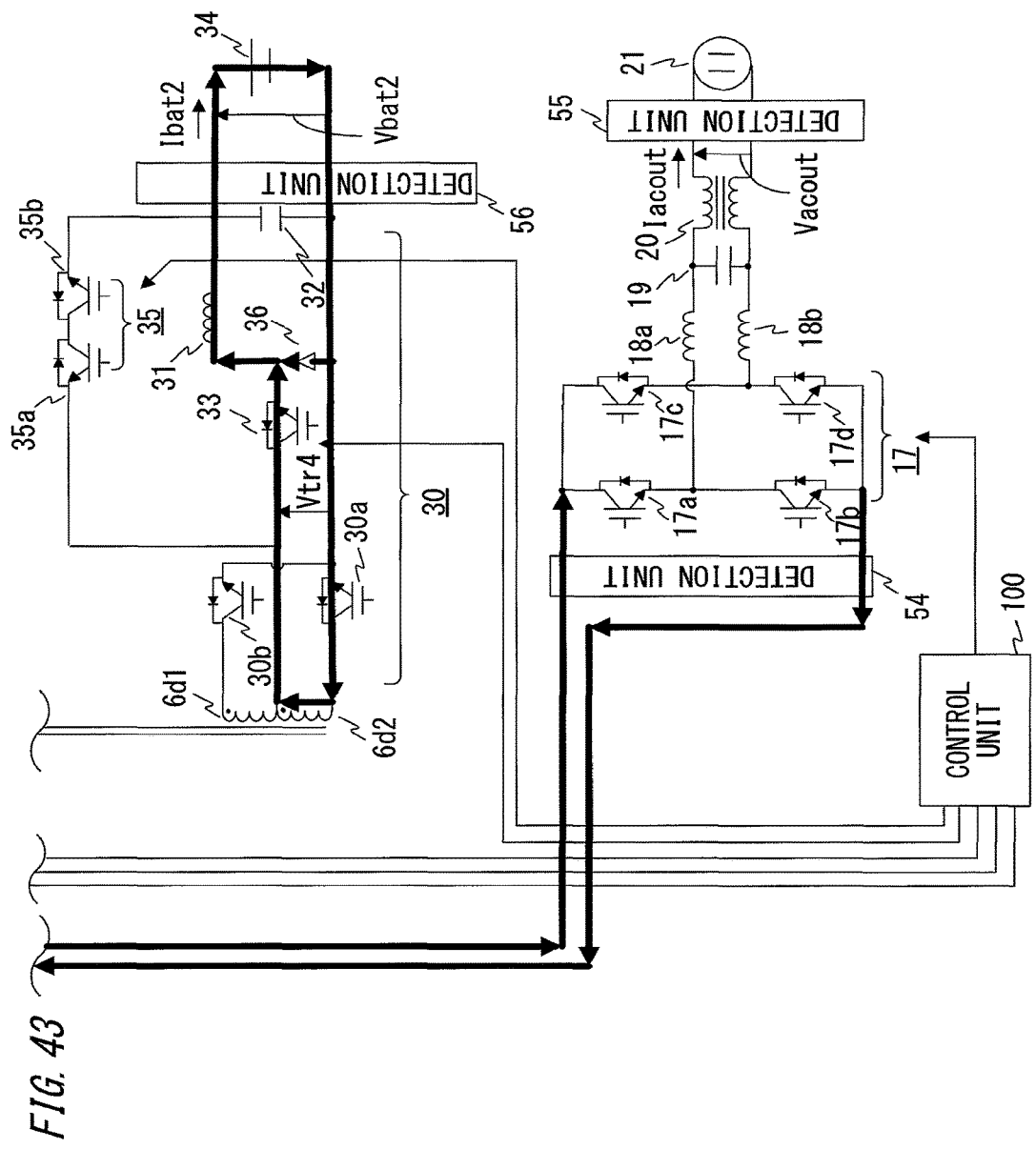
FIG. 43 is a diagram illustrating the current flow according to the switching pattern shown in FIG. 39.

Next, in FIG. 39, during the period from time t2 to time t3, power is supplied from the first DC power supply 11. That is, at time t2, the switching element 8b of the second switching circuit 8 and the switching element 9a of the switch 9 are turned on at the same time, and are kept in an ON state until time t3. FIG. 42 and FIG. 43 show the current flows during this period.

On the fourth windings 6d1 and 6d2 of the transformer 6, the output voltage determined by voltage of the capacitor 10b and the turns ratio between the second winding 6b and the fourth windings 6d1 and 6d2 is applied, the output voltage is rectified to be the voltage Vtr4, and then, via the switching element 33, the flyback diode 36, and the reactor 31, power is supplied to the second DC power supply 34.

In addition, via the inverter 17, power is supplied to the load device connected to the load device connection end 21.

Further, on the first winding 6a of the transformer 6, the output voltage Vtr1 determined by voltage of the capacitor 10b and the turns ratio between the second winding 6b and the first winding 6a is applied upward as indicated by an arrow in FIG. 42. At this time, if the voltage VL1 of the capacitor 3 is lower than the output voltage Vtr1, the first switching circuit 4 operates as a rectifier as shown in FIG. 42. On the other hand, if the voltage VL1 of the capacitor 3 is higher than the output voltage Vtr1, the current flow in the first switching circuit 4 shown in FIG. 42 does not occur.

Figure 44:
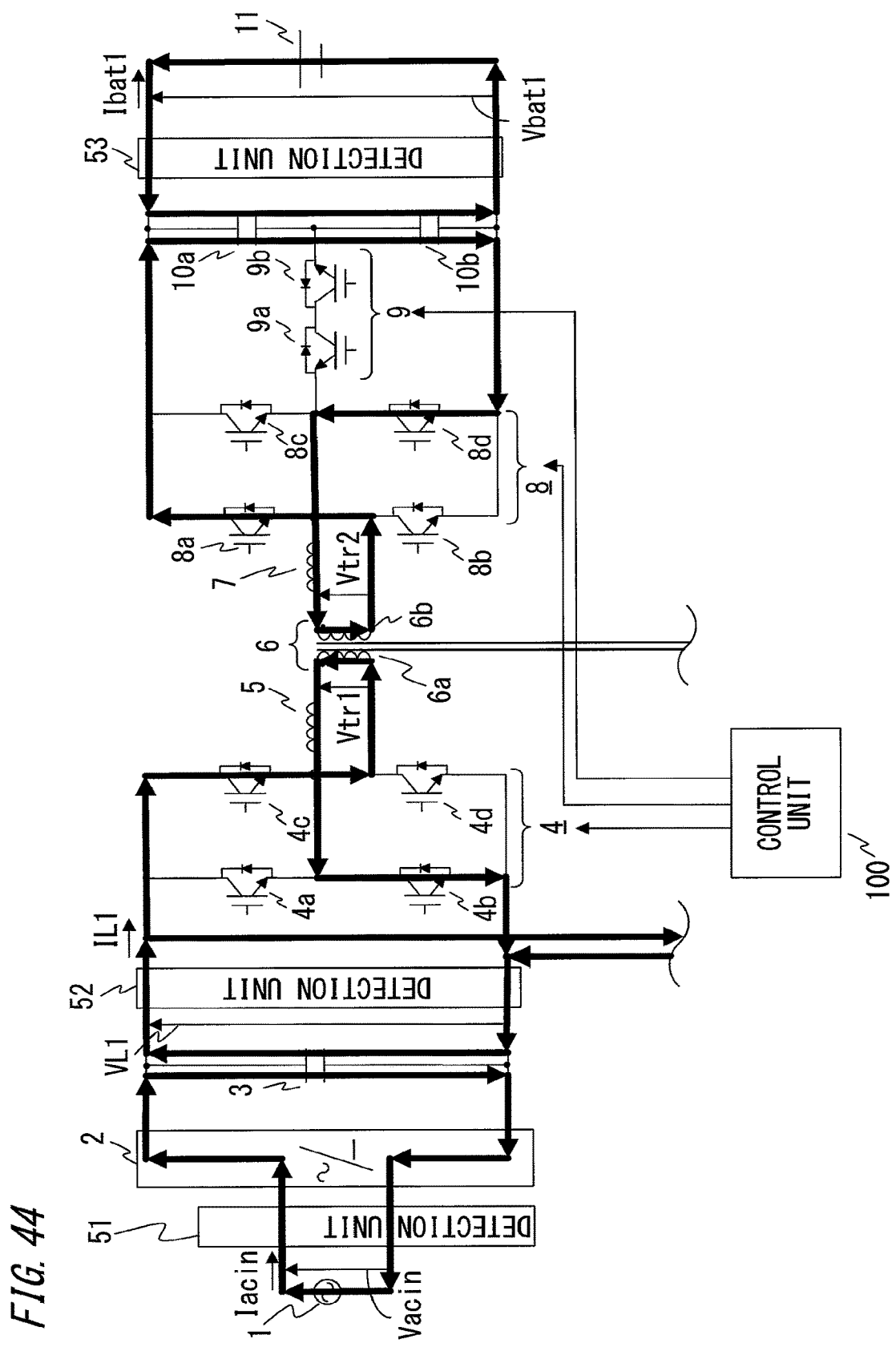
FIG. 44 is a diagram illustrating a current flow according to the switching pattern shown in FIG. 39.
Figure 45:
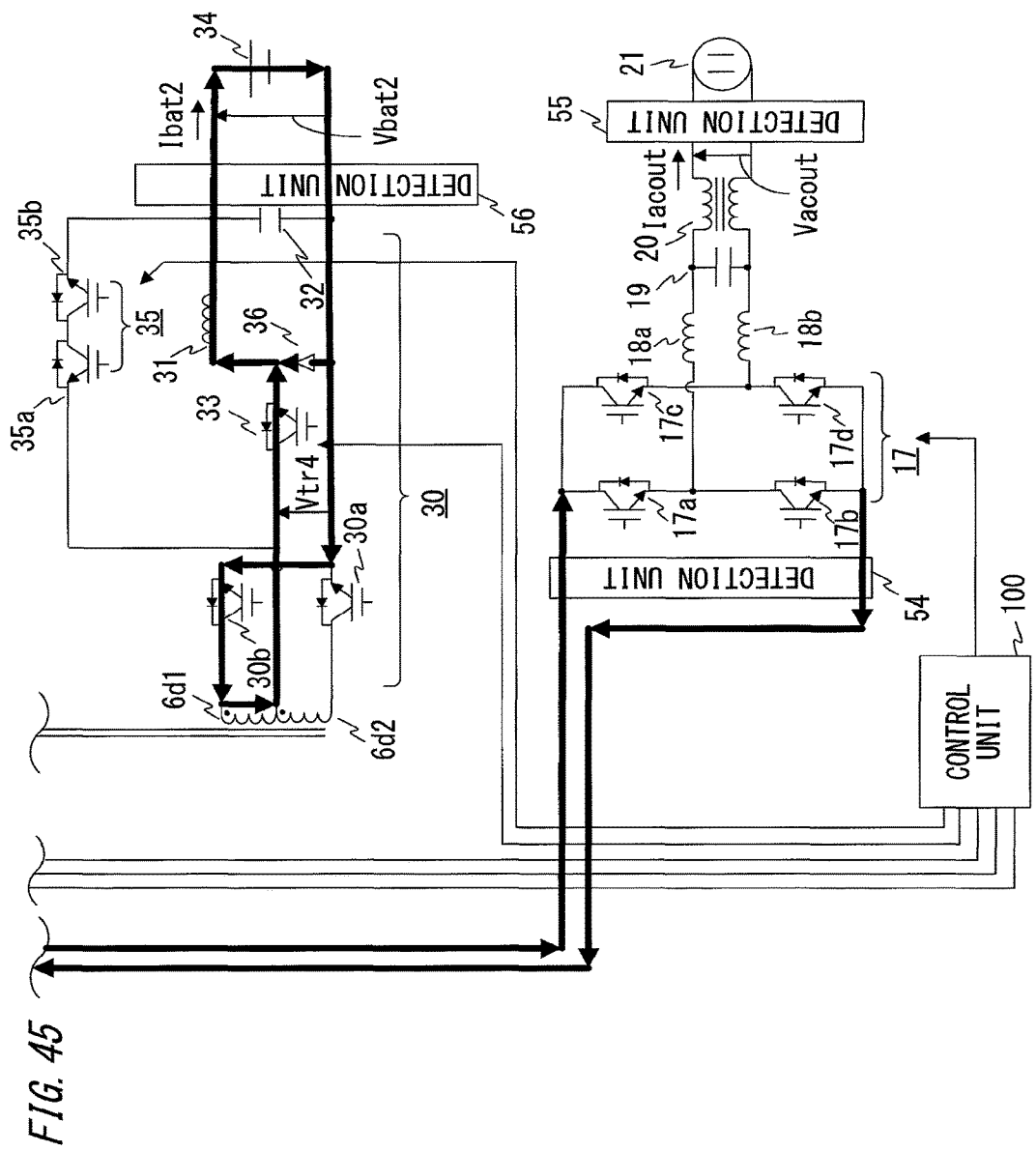
FIG. 45 is a diagram illustrating the current flow according to the switching pattern shown in FIG. 39.

Next, in FIG. 39, during the period from time t4 to time t5, power is supplied from the AC power supply 1. That is, at time t4, the switching elements 4b and 4c of the first switching circuit 4 are turned on at the same time, and are kept in an ON state until time t5. FIG. 44 and FIG. 45 show the current flows during this period.

On the fourth windings 6d1 and 6d2 of the transformer 6, the output voltage determined by the voltage VL1 of the capacitor 3 and the turns ratio between the first winding 6a and the fourth windings 6d1 and 6d2 is applied, the output voltage is rectified to be the voltage Vtr4, and then, via the switching element 33, the flyback diode 36, and the reactor 31, power is supplied to the second DC power supply 34.

In addition, via the inverter 17, power is supplied to the load device connected to the load device connection end 21.

Further, on the second winding 6b of the transformer 6, the output voltage Vtr2 determined by the voltage VL1 of the capacitor 3 and the turns ratio between the first winding 6a and the second winding 6b is applied downward as indicated by an arrow in FIG. 44. At this time, if the total voltage of the capacitors 10a and 10b is lower than the output voltage Vtr2, the second switching circuit 8 operates as a rectifier as shown in FIG. 44. On the other hand, if the total voltage of the capacitors 10a and 10b is higher than the output voltage Vtr2, the current flow in the second switching circuit 8 shown in FIG. 44 does not occur.

Figure 46:
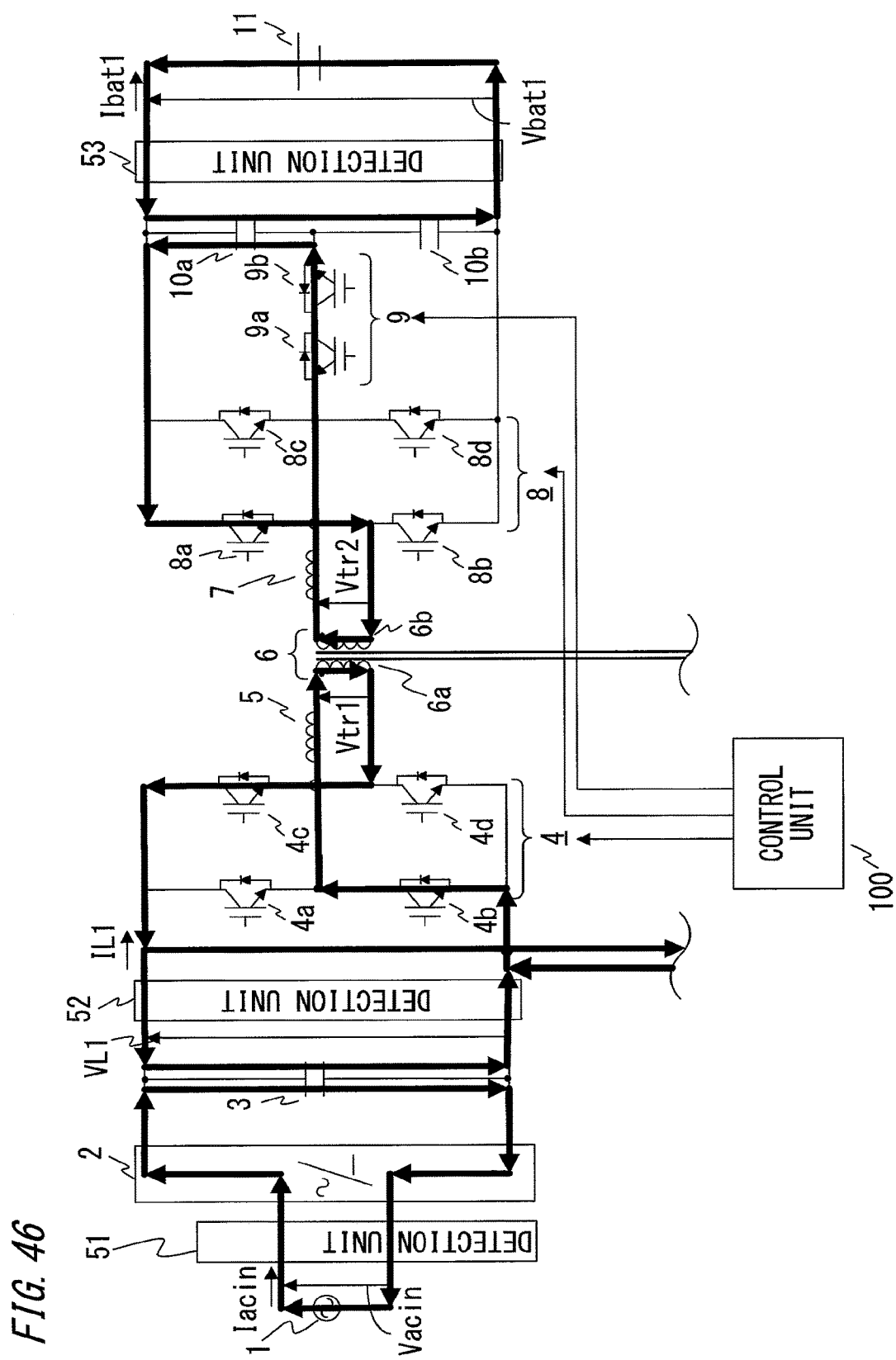
FIG. 46 is a diagram illustrating a current flow according to the switching pattern shown in FIG. 39.
Figure 47:
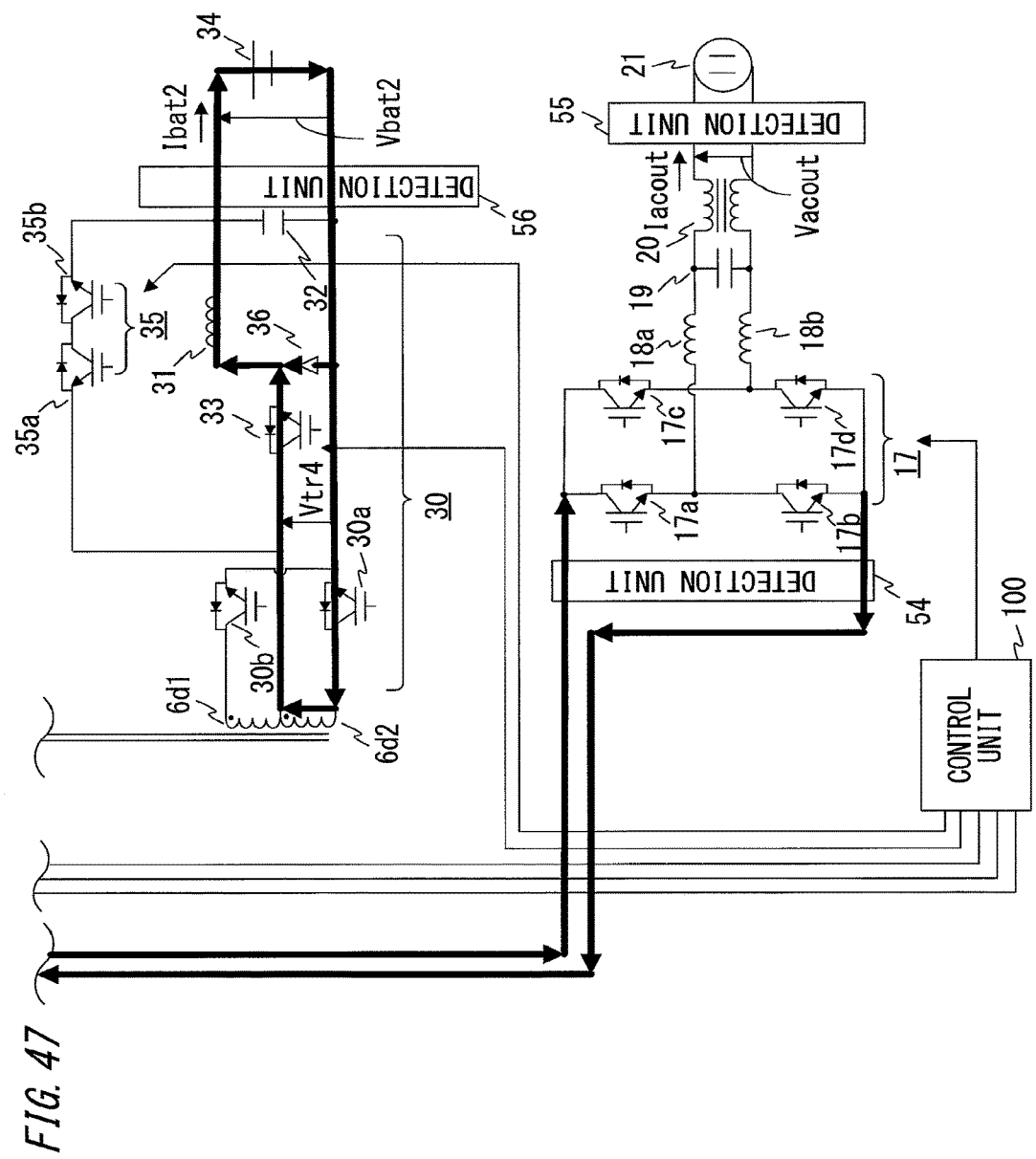
FIG. 47 is a diagram illustrating the current flow according to the switching pattern shown in FIG. 39.

Next, in FIG. 39, during the period from time t6 to time t7, power is supplied from the first DC power supply 11. That is, at time t6, the switching element 8a of the second switching circuit 8 and the switching element 9b of the switch 9 are turned on at the same time, and are kept in an ON state until time t7. FIG. 46 and FIG. 47 show the current flows during this period.

On the fourth windings 6d1 and 6d2 of the transformer 6, the output voltage determined by voltage of the capacitor 10a and the turns ratio between the second winding 6b and the fourth windings 6d1 and 6d2 is applied, the output voltage is rectified to be the voltage Vtr4, and then, via the switching element 33, the flyback diode 36, and the reactor 31, power is supplied to the second DC power supply 34.

In addition, via the inverter 17, power is supplied to the load device connected to the load device connection end 21.

Further, on the first winding 6a of the transformer 6, the output voltage Vtr1 determined by voltage of the capacitor 10a and the turns ratio between the second winding 6b and the first winding 6a is applied downward as indicated by an arrow in FIG. 46. At this time, if the voltage VL1 of the capacitor 3 is lower than the output voltage Vtr1, the first switching circuit 4 operates as a rectifier as shown in FIG. 46. On the other hand, if the voltage VL1 of the capacitor 3 is higher than the output voltage Vtr1, the current flow in the first switching circuit 4 shown in FIG. 46 does not occur.

At time t8, as in time t0, the switching elements 4a and 4d of the first switching circuit 4 are turned on at the same time.

In the switching pattern shown in FIG. 39, the minimum repetitive period in which power is supplied in a temporally divided manner alternately from the AC power supply 1 and the first DC power supply 11, is defined as one switching period. That is, the period of time t0 to t4 and the period of time t4 to t8 in FIG. 39 are each defined as one switching period. In this case, in every one switching period, power is supplied at both positive and negative polarities to the transformer 6, and in the one switching period, power is supplied in a temporally divided manner alternately from both the first switching circuit 4 and the second switching circuit 8. Thus, as shown in FIG. 40 to FIG. 47, in any state, supply of power to the load device can be achieved while the continuity of current from the AC power supply 1 and the first DC power supply 11 is maintained.

Figure 48:
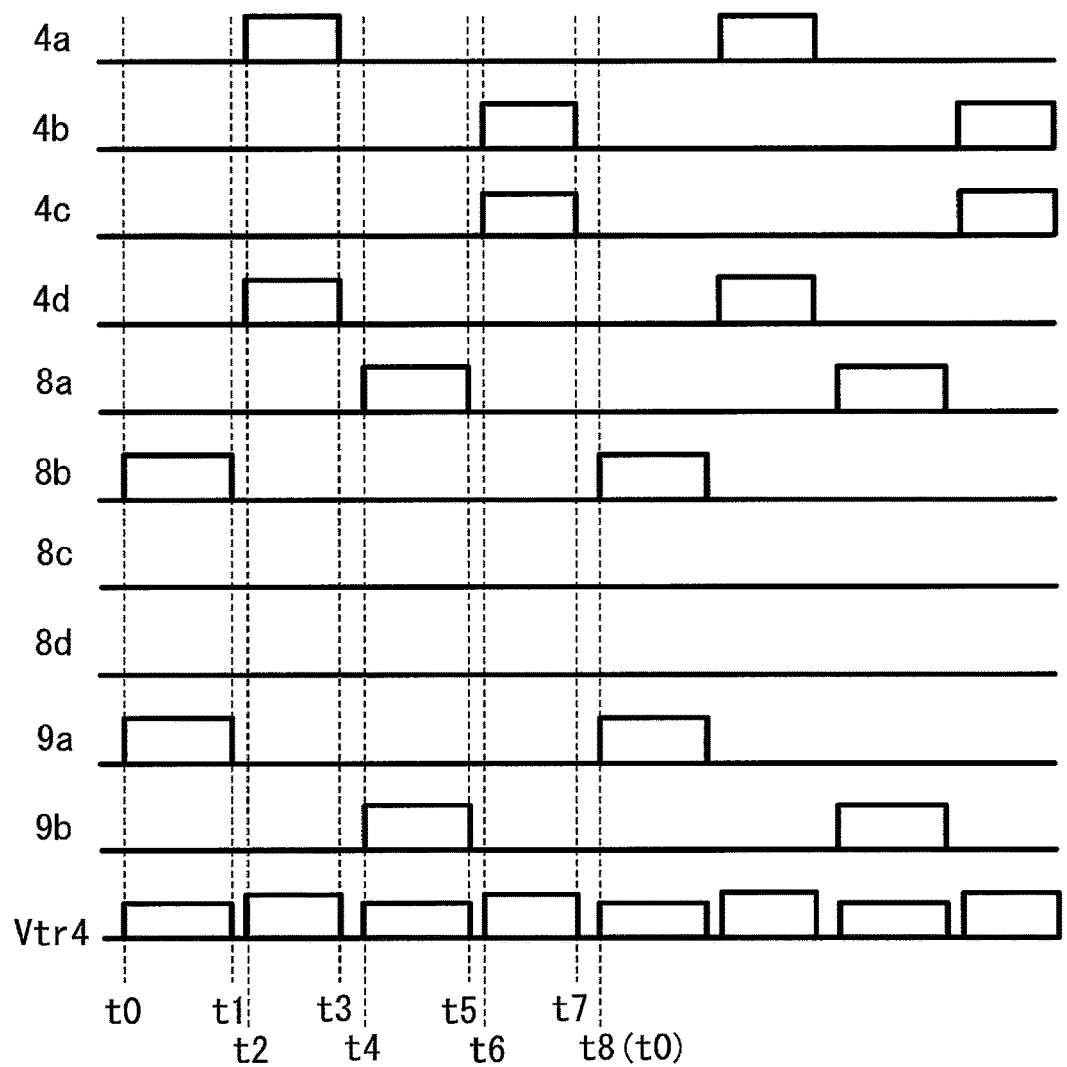
FIG. 48 is a diagram illustrating another switching pattern for achieving the power flow shown in FIG. 35 and FIG. 36.

As shown in FIG. 48, even in the case where the timing of supplying power from the first switching circuit 4 and the timing of supplying power from the second switching circuit 8 are exchanged with each other, the same effect can be achieved. The current flows in this case are the same as those shown in FIG. 40 to FIG. 47, and therefore the description thereof is omitted here.

In the switching patterns shown in FIG. 39 and FIG. 48, both the switching elements 9a and 9b composing the switch 9 may operate in synchronization with switching of the switching elements 8a and 8b of the second switching circuit 8.

Figure 49:
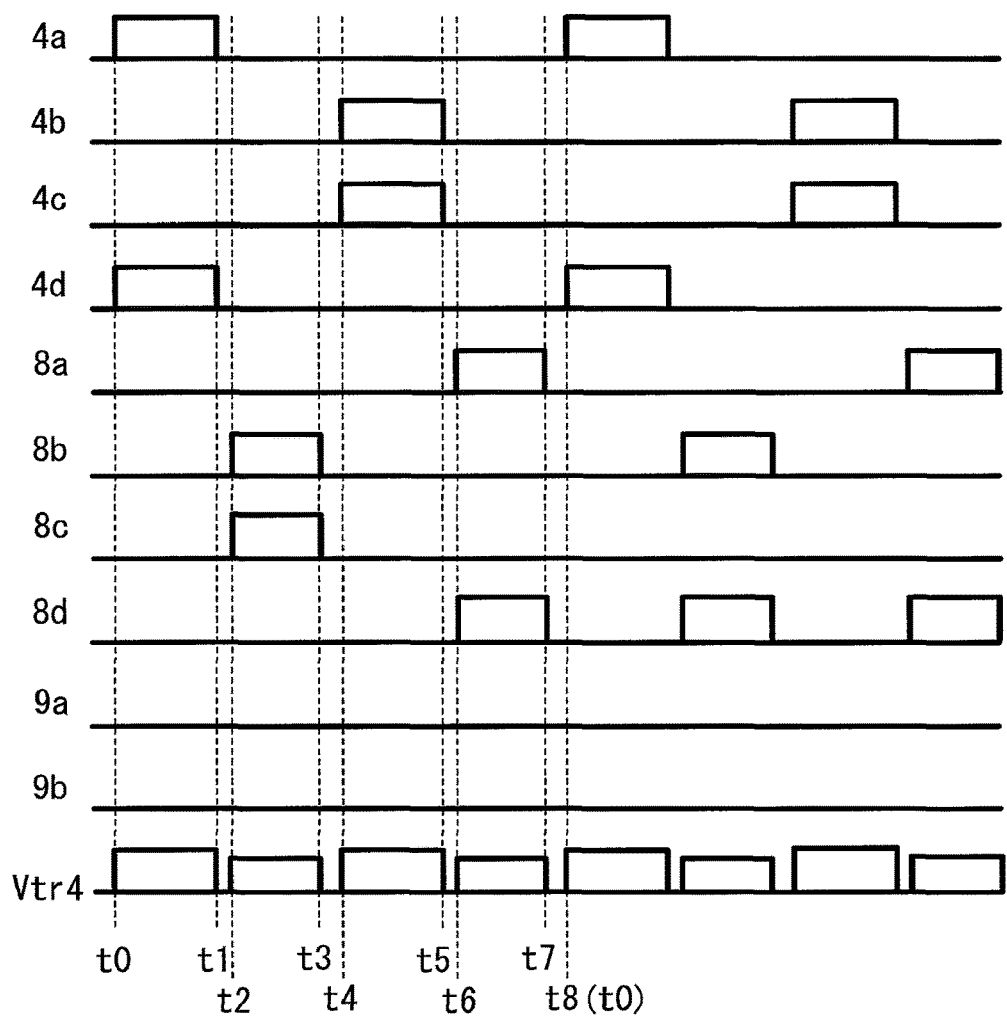
FIG. 49 is a diagram illustrating still another switching pattern for achieving the power flow shown in FIG. 35 and FIG. 36.

The switching pattern for achieving the power flow shown in FIG. 35 and FIG. 36, i.e., for achieving supply of power using both the AC power supply 1 and the first DC power supply 11 as power supply sources, is not limited to the switching pattern shown in FIG. 39, but such power flow can be achieved also by a switching pattern shown in FIG. 49, for example. FIG. 49 is a switching pattern for causing the second switching circuit 8 to perform full-bridge operation to discharge the first DC power supply 11.

FIG. 49 shows: gate signals for the switching elements 4a to 4d of the first switching circuit 4; gate signals for the switching elements 8a to 8d of the second switching circuit 8; gate signals for the switching elements 9a and 9b composing the switch 9; and the voltage Vtr4 obtained by rectifying the output voltage of the fourth windings 6d1 and 6d2 of the transformer 6, on the load side with respect to the transformer 6. FIG. 50 to FIG. 57 show current flows occurring by the switching pattern in FIG. 49. In these cases, it is assumed that the AC power supply 1 operates in a positive-half-wave manner. However, even in the case of negative half wave, the same operation is performed.

Figure 50:
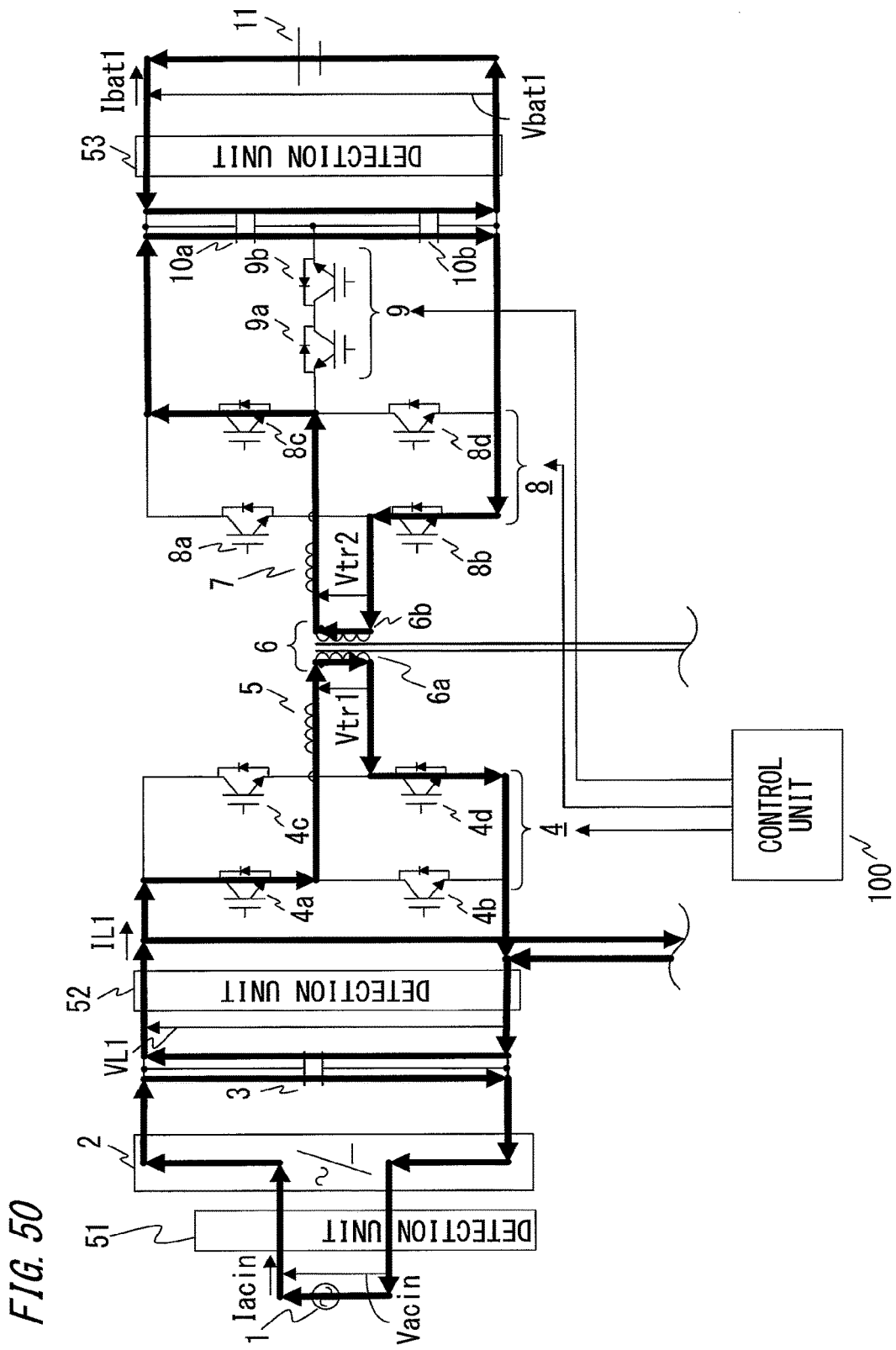
FIG. 50 is a diagram illustrating a current flow according to the switching pattern shown in FIG. 49.
Figure 51:
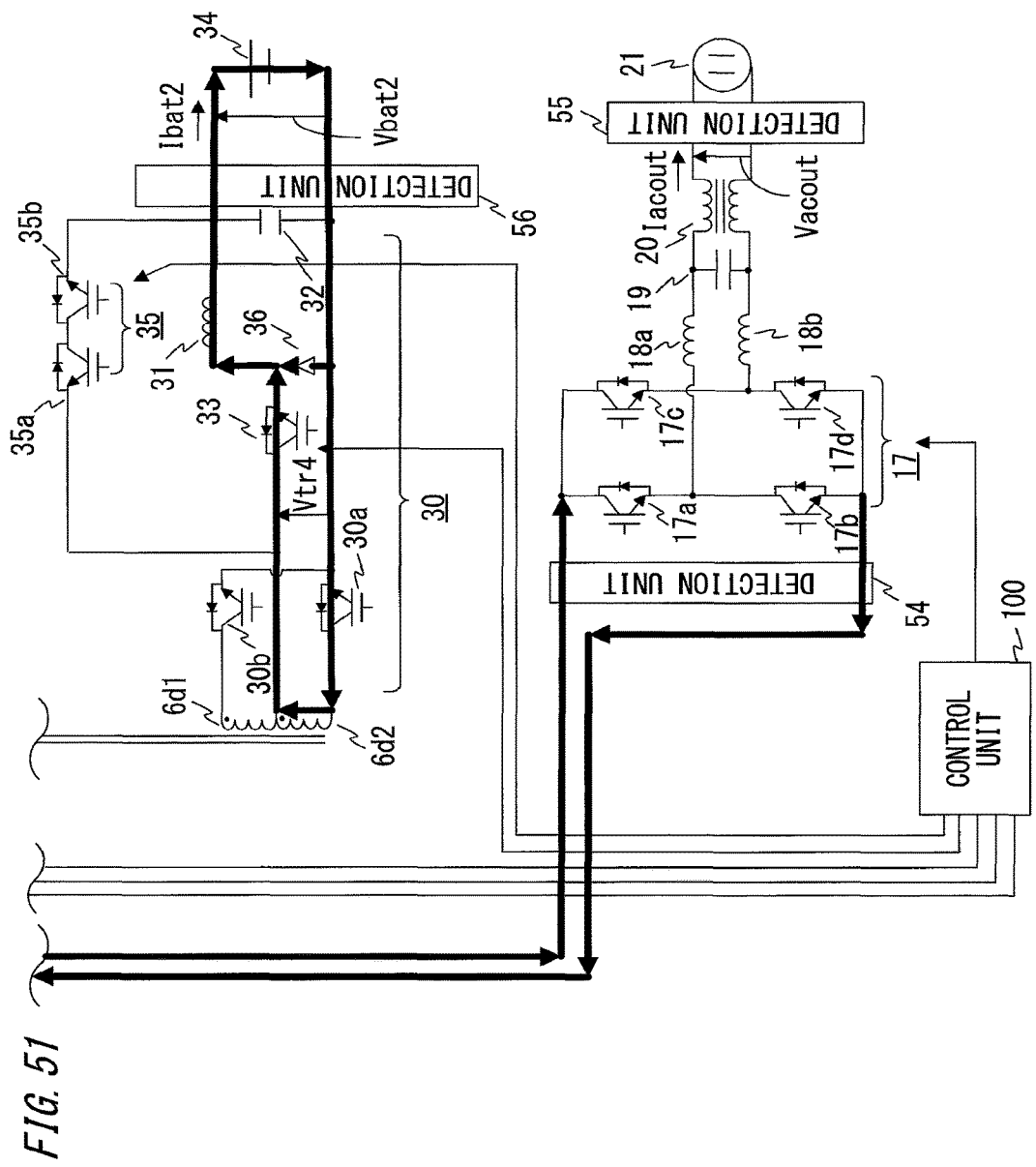
FIG. 51 is a diagram illustrating the current flow according to the switching pattern shown in FIG. 49.

In FIG. 49, during the period from time t0 to time t1, power is supplied from the AC power supply 1. That is, at time t0, the switching elements 4a and 4d of the first switching circuit 4 are turned on at the same time, and are kept in an ON state until time t1. FIG. 50 and FIG. 51 show the current flows during this period.

On the fourth windings 6d1 and 6d2 of the transformer 6, the output voltage determined by the voltage VL1 of the capacitor 3 and the turns ratio between the first winding 6a and the fourth windings 6d1 and 6d2 is applied, the output voltage is rectified to be the voltage Vtr4, and then, via the switching element 33, the flyback diode 36, and the reactor 31, power is supplied to the second DC power supply 34.

In addition, via the inverter 17, power is supplied to the load device connected to the load device connection end 21.

Further, on the second winding 6b of the transformer 6, the output voltage Vtr2 determined by the voltage VL1 of the capacitor 3 and the turns ratio between the first winding 6a and the second winding 6b is applied upward as indicated by an arrow in FIG. 50. At this time, if the total voltage of the capacitors 10a and 10b is lower than the output voltage Vtr2, the second switching circuit 8 operates as a rectifier as shown in FIG. 50. On the other hand, if the total voltage of the capacitors 10a and 10b is higher than the output voltage Vtr2, the current flow in the second switching circuit 8 shown in FIG. 50 does not occur.

Figure 52:
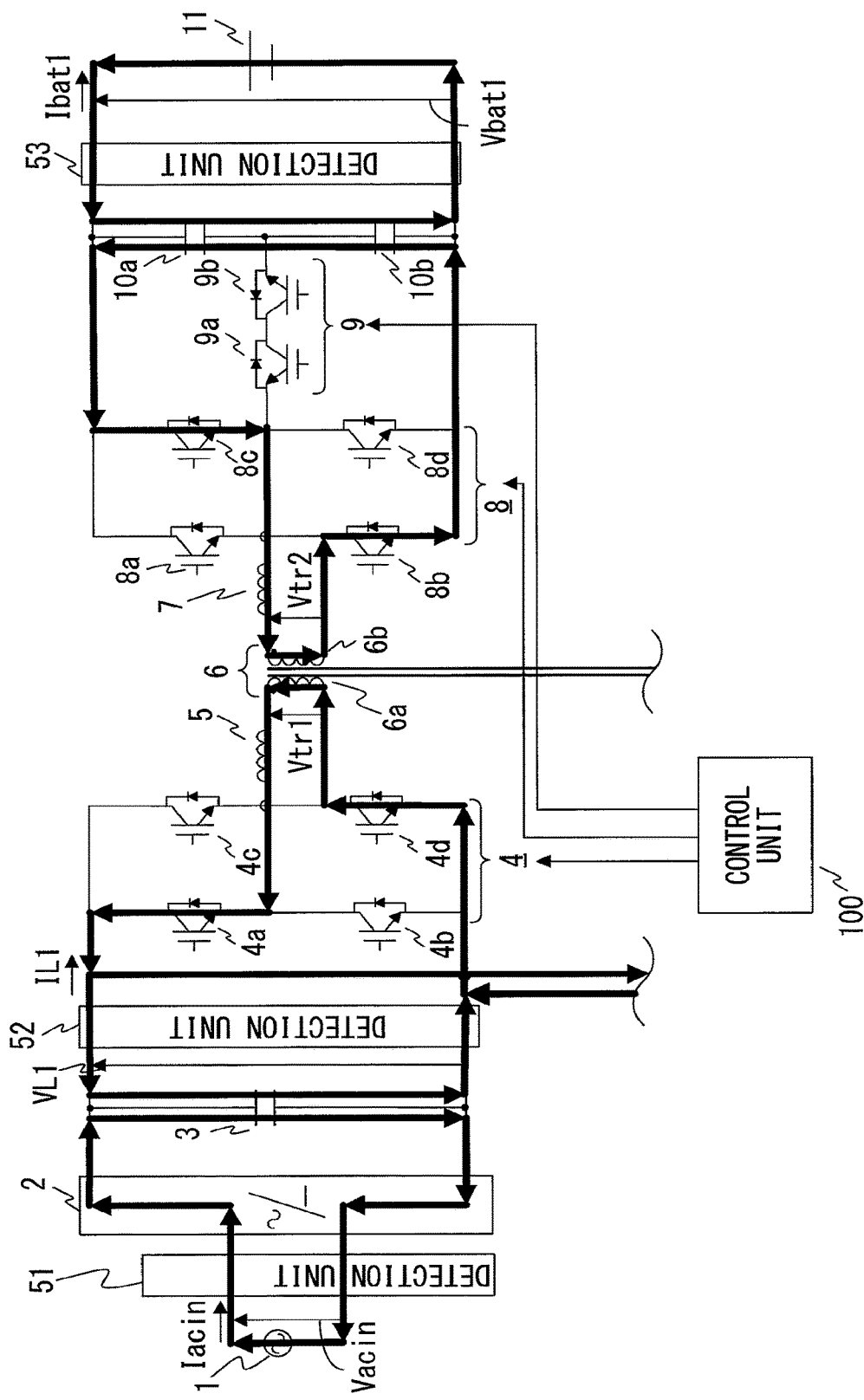
FIG. 52 is a diagram illustrating a current flow according to the switching pattern shown in FIG. 49.
Figure 53:
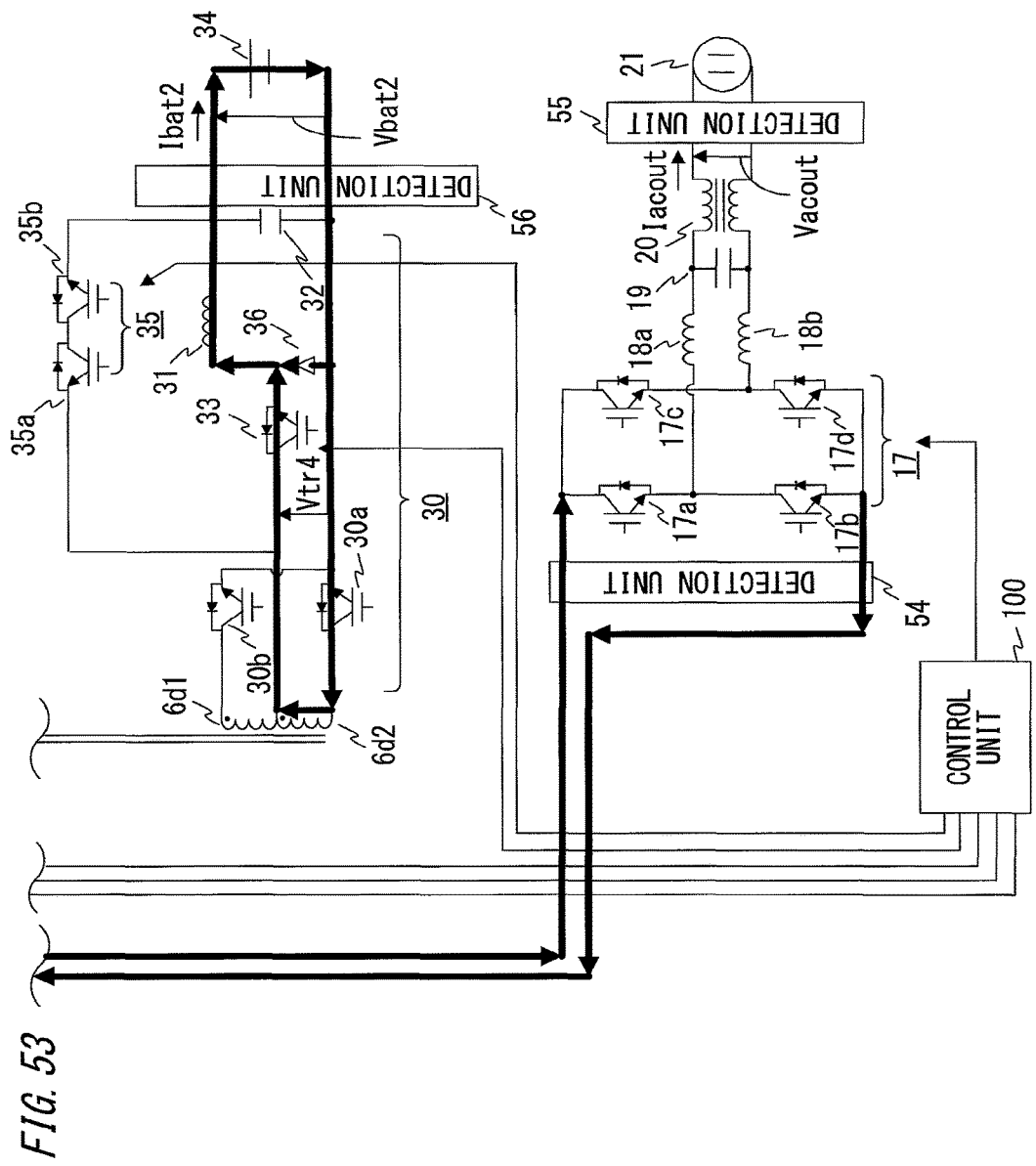
FIG. 53 is a diagram illustrating the current flow according to the switching pattern shown in FIG. 49.

Next, in FIG. 49, during the period from time t2 to time t3, power is supplied from the first DC power supply 11. That is, at time t2, the switching elements 8b and 8c of the second switching circuit 8 are turned on at the same time, and are kept in an ON state until time t3. FIG. 52 and FIG. 53 show the current flows during this period.

On the fourth windings 6d1 and 6d2 of the transformer 6, the voltage determined by the total voltage of the capacitors 10a and 10b and the turns ratio between the second winding 6b and the fourth windings 6d1 and 6d2 is applied, the applied voltage is rectified to be the voltage Vtr4, and then, via the switching element 33, the flyback diode 36, and the reactor 31, power is supplied to the second DC power supply 34.

In addition, via the inverter 17, power is supplied to the load device connected to the load device connection end 21.

Further, on the first winding 6a of the transformer 6, the output voltage Vtr1 determined by the total voltage of the capacitors 10a and 10b and the turns ratio between the second winding 6b and the first winding 6a is applied upward as indicated by an arrow in FIG. 52. At this time, if the voltage VL1 of the capacitor 3 is lower than the output voltage Vtr1, the first switching circuit 4 operates as a rectifier as shown in FIG. 52. On the other hand, if the voltage VL1 of the capacitor 3 is higher than the output voltage Vtr1, the current flow in the first switching circuit 4 shown in FIG. 52 does not occur.

Figure 54:
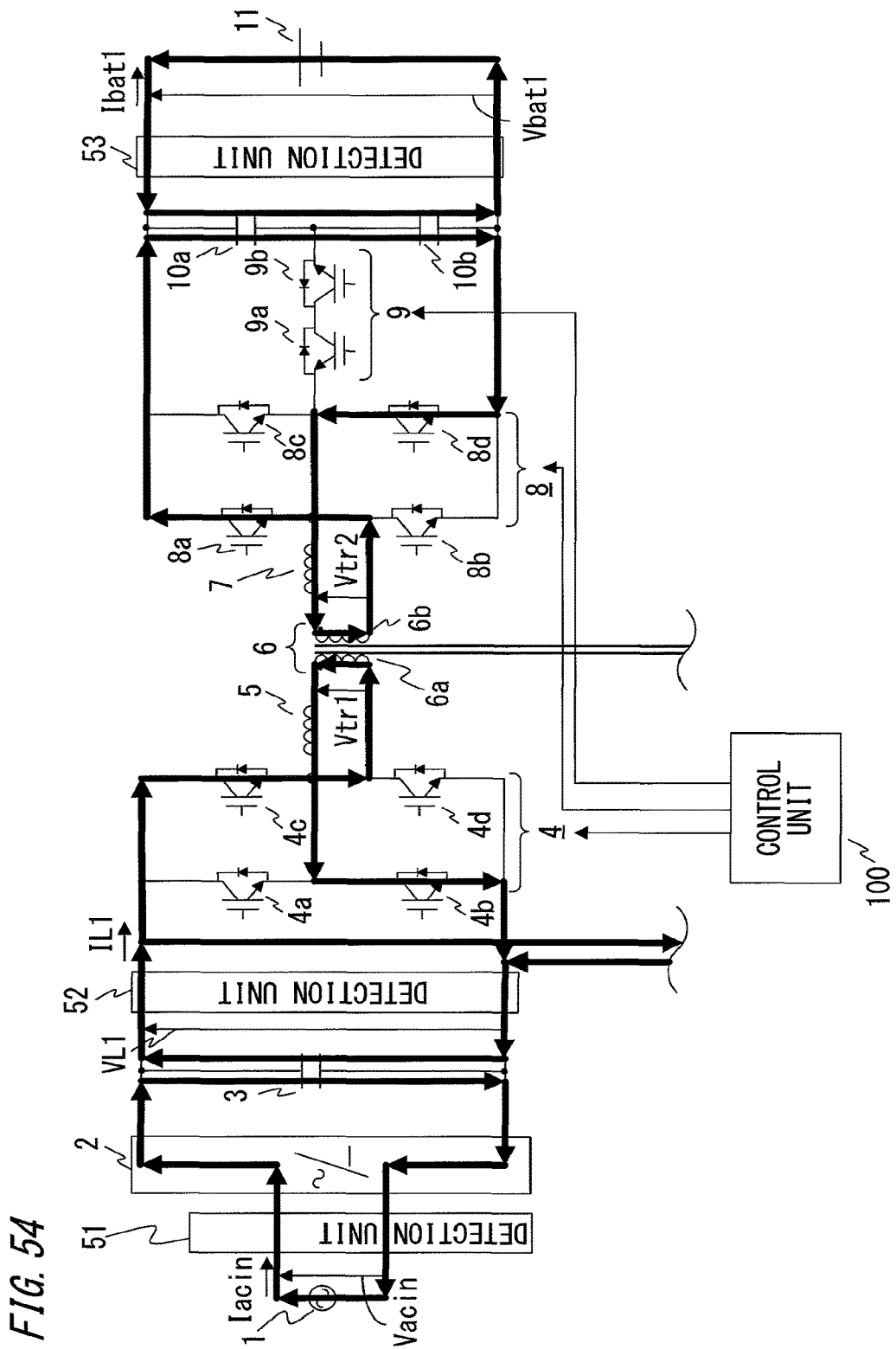
FIG. 54 is a diagram illustrating a current flow according to the switching pattern shown in FIG. 49.
Figure 55:
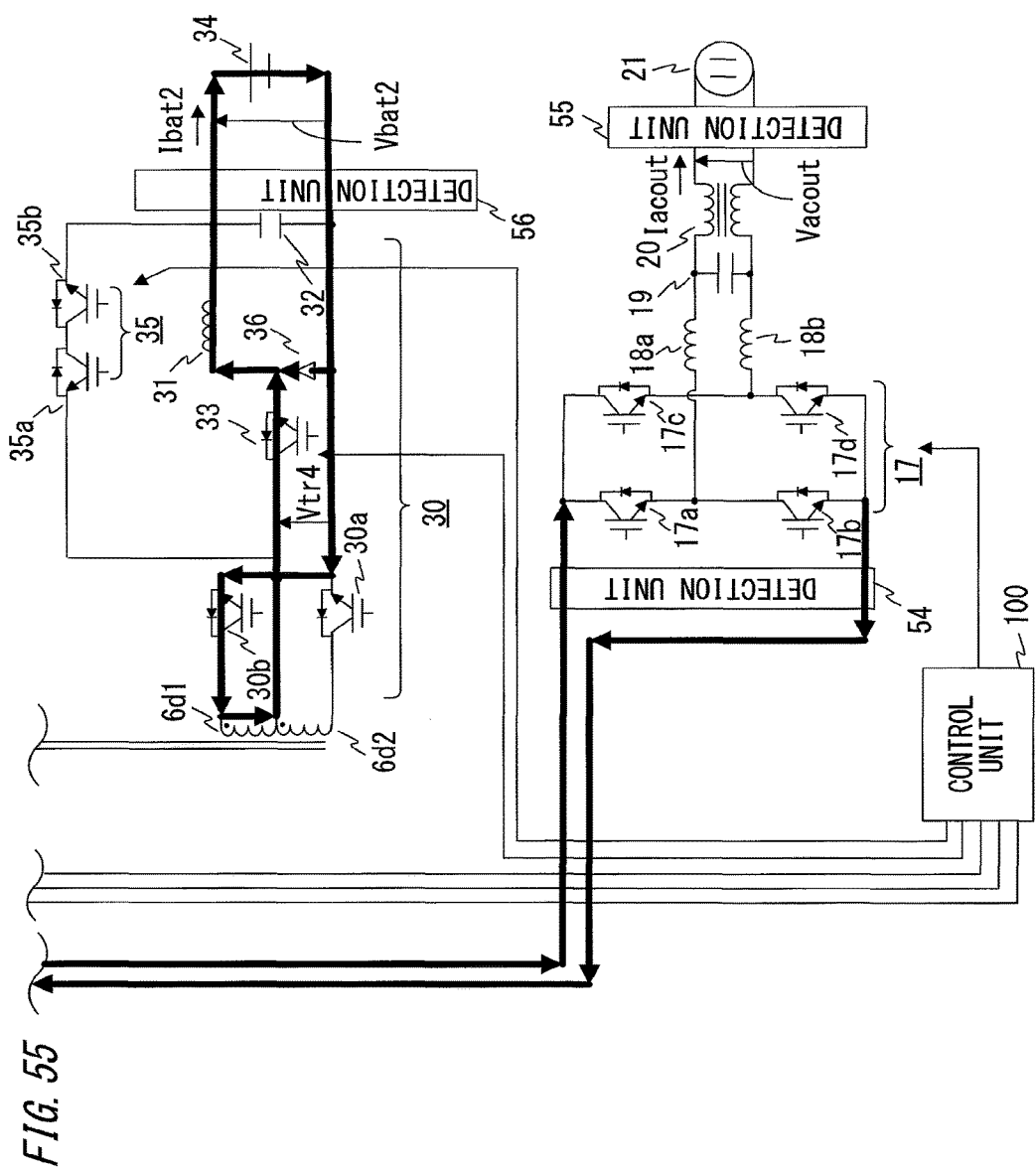
FIG. 55 is a diagram illustrating the current flow according to the switching pattern shown in FIG. 49.

Next, in FIG. 49, during the period from time t4 to time t5, power is supplied from the AC power supply 1. That is, at time t4, the switching elements 4b and 4c of the first switching circuit 4 are turned on at the same time, and are kept in an ON state until time t5. FIG. 54 and FIG. 55 show the current flows during this period.

On the fourth windings 6d1 and 6d2 of the transformer 6, the voltage determined by the voltage VL1 of the capacitor 3 and the turns ratio between the first winding 6a and the fourth windings 6d1 and 6d2 is applied, the applied voltage is rectified to be the voltage Vtr4, and then, via the switching element 33, the flyback diode 36, and the reactor 31, power is supplied to the second DC power supply 34.

In addition, via the inverter 17, power is supplied to the load device connected to the load device connection end 21.

Further, on the second winding 6b of the transformer 6, the output voltage Vtr2 determined by the voltage VL1 of the capacitor 3 and the turns ratio between the first winding 6a and the second winding 6b is applied downward as indicated by an arrow in FIG. 54. At this time, if the total voltage of the capacitors 10a and 10b is lower than the output voltage Vtr2, the second switching circuit 8 operates as a rectifier as shown in FIG. 54. On the other hand, if the total voltage of the capacitors 10a and 10b is higher than the output voltage Vtr2, the current flow in the second switching circuit 8 shown in FIG. 54 does not occur.

Figure 56:
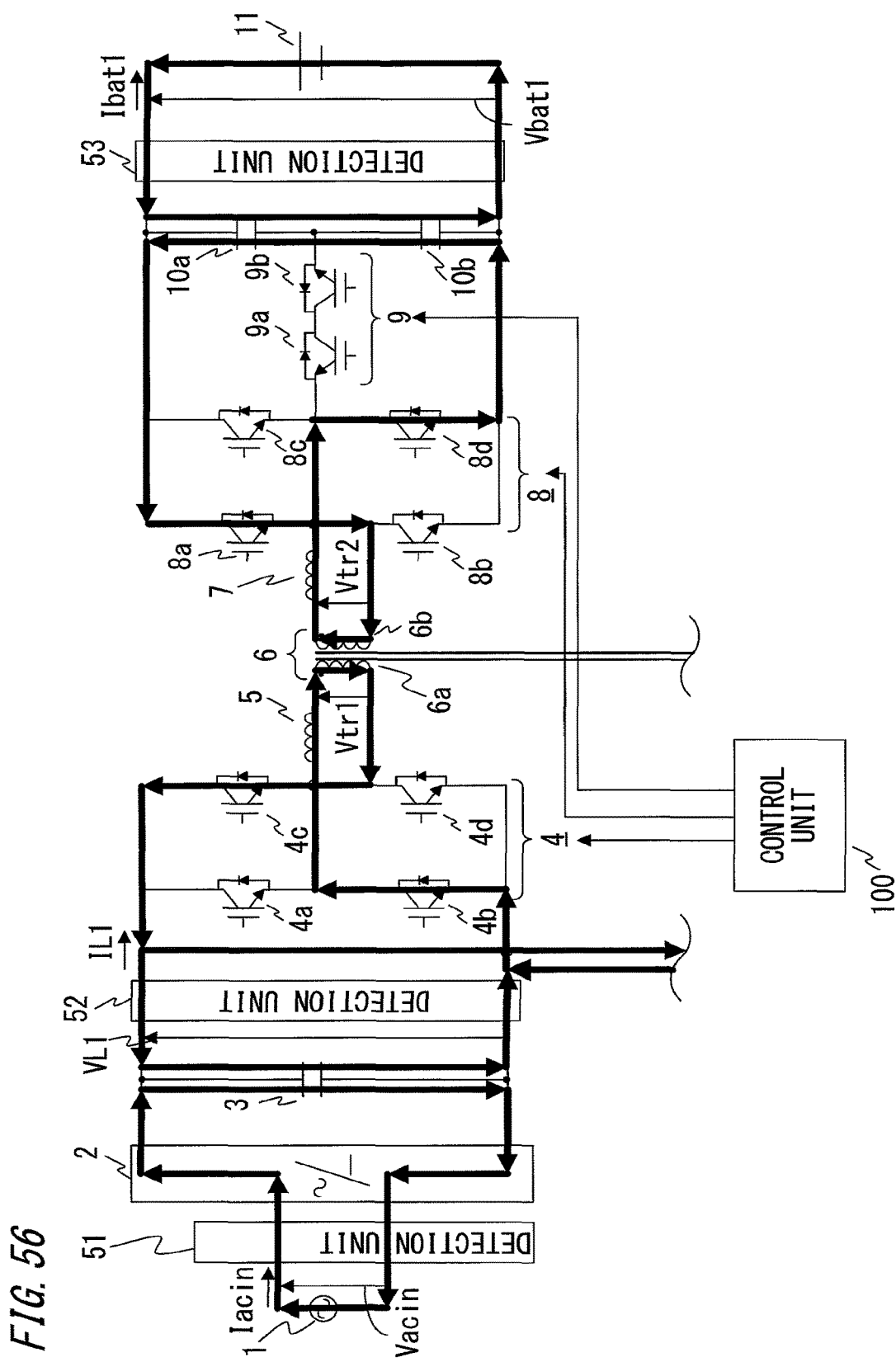
FIG. 56 is a diagram illustrating a current flow according to the switching pattern shown in FIG. 49.
Figure 57:
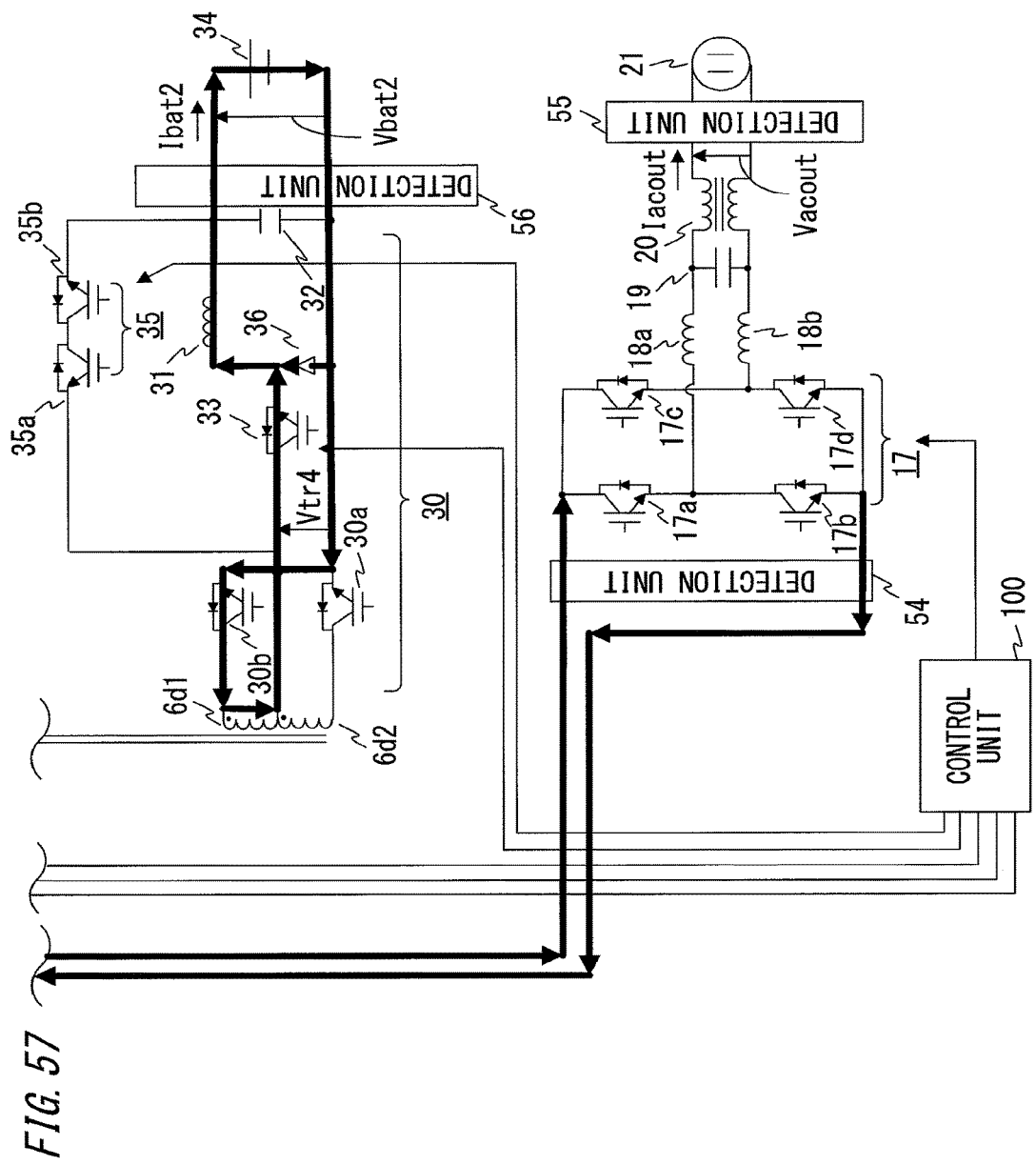
FIG. 57 is a diagram illustrating the current flow according to the switching pattern shown in FIG. 49.

Next, in FIG. 49, during the period from time t6 to time t7, power is supplied from the first DC power supply 11. That is, at time t6, the switching elements 8a and 8d of the second switching circuit 8 are turned on at the same time, and are kept in an ON state until time t7. FIG. 56 and FIG. 57 show the current flows during this period.

On the fourth windings 6d1 and 6d2 of the transformer 6, the output voltage determined by the total voltage of the capacitors 10a and 10b and the turns ratio between the second winding 6b and the fourth windings 6d1 and 6d2 is applied, the output voltage is rectified to be the voltage Vtr4, and then, via the switching element 33, the flyback diode 36, and the reactor 31, power is supplied to the second DC power supply 34.

In addition, via the inverter 17, power is supplied to the load device connected to the load device connection end 21.

Further, on the first winding 6a of the transformer 6, the output voltage Vtr1 determined by the total voltage of the capacitors 10a and 10b and the turns ratio between the second winding 6b and the first winding 6a is applied downward as indicated by an arrow in FIG. 56. At this time, if the voltage VL1 of the capacitor 3 is lower than the output voltage Vtr1, the first switching circuit 4 operates as a rectifier as shown in FIG. 56. On the other hand, if the voltage VL1 of the capacitor 3 is higher than the output voltage Vtr1, the current flow in the first switching circuit 4 shown in FIG. 56 does not occur.

At time t8, as in time to, the switching elements 4a and 4d of the first switching circuit 4 are turned on at the same time.

Here, also in the switching pattern shown in FIG. 49, as in the switching pattern shown in FIG. 39, the minimum repetitive period in which power is supplied in a temporally divided manner alternately from the AC power supply 1 and the first DC power supply 11, is defined as one switching period. That is, the period of time t0 to t4 and the period of time t4 to t8 in FIG. 49 are each defined as one switching period. In this case, in every one switching period, power is supplied at both positive and negative polarities to the transformer 6, and in the one switching period, power is supplied in a temporally divided manner alternately from both the first switching circuit 4 and the second switching circuit 8. Thus, as shown in FIG. 50 to FIG. 57, in any state, supply of power to the load can be achieved while the continuity of current from the AC power supply 1 and the first DC power supply 11 is maintained.

Figure 58:
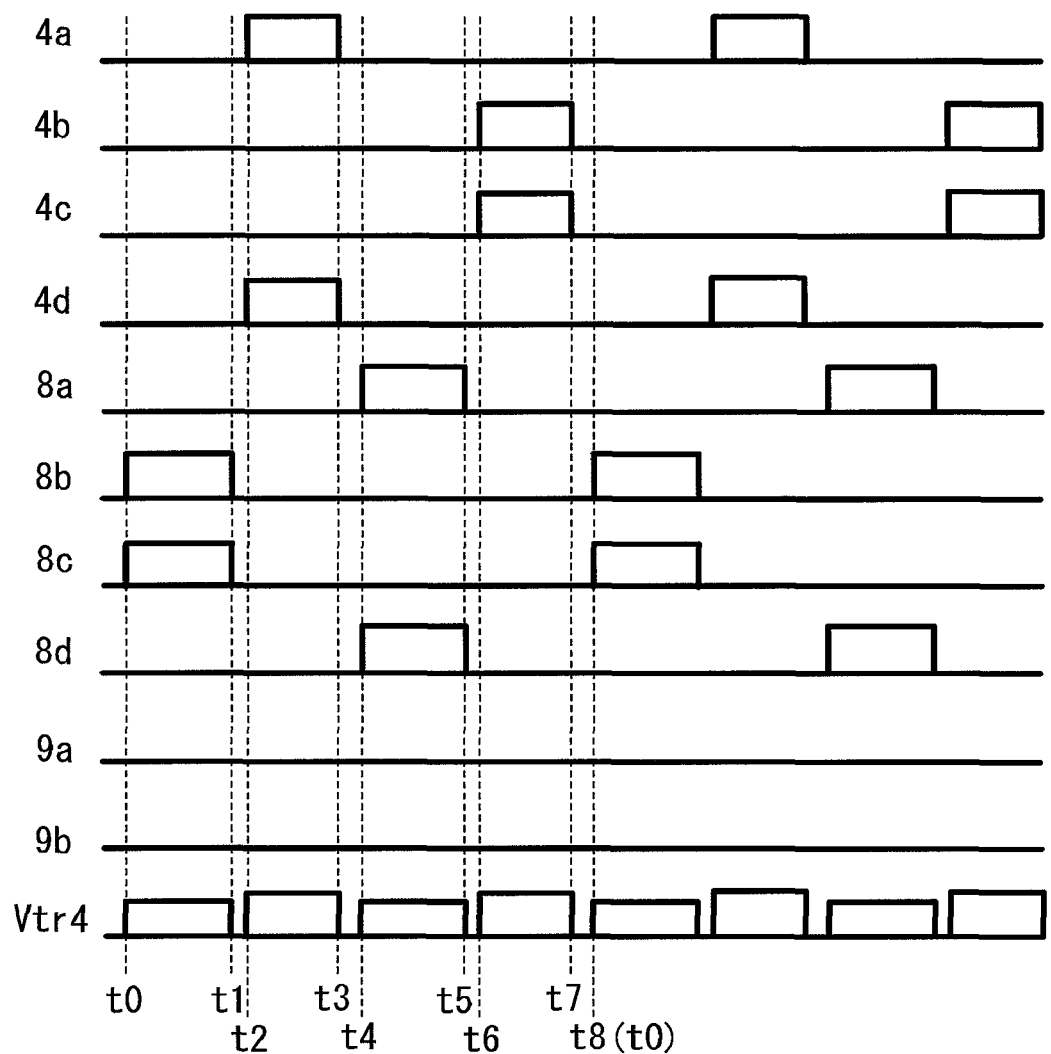
FIG. 58 is a diagram illustrating still another switching pattern for achieving the power flow shown in FIG. 35 and FIG. 36.

As shown in FIG. 58, even in the case where the timing of supplying power from the first switching circuit 4 and the timing of supplying power from the second switching circuit 8 are exchanged with each other, the same effect can be achieved. The current flows in this case are the same as those shown in FIG. 50 to FIG. 57, and therefore the description thereof is omitted here.

In any of the switching patterns shown in FIG. 39, FIG. 48, FIG. 49, and FIG. 58, in one switching period, supply of power from the AC power supply 1 via the AC/DC converter 2 and the first switching circuit 4 and supply of power from the first DC power supply 11 via the second switching circuit 8 are performed to the transformer 6 in a temporally divided manner. Thus, it becomes possible to supply power while maintaining the continuity of current from the AC power supply 1 and the first DC power supply 11 to the second DC power supply 34 and the load device connected to the load device connection end 21.

Figure 59:
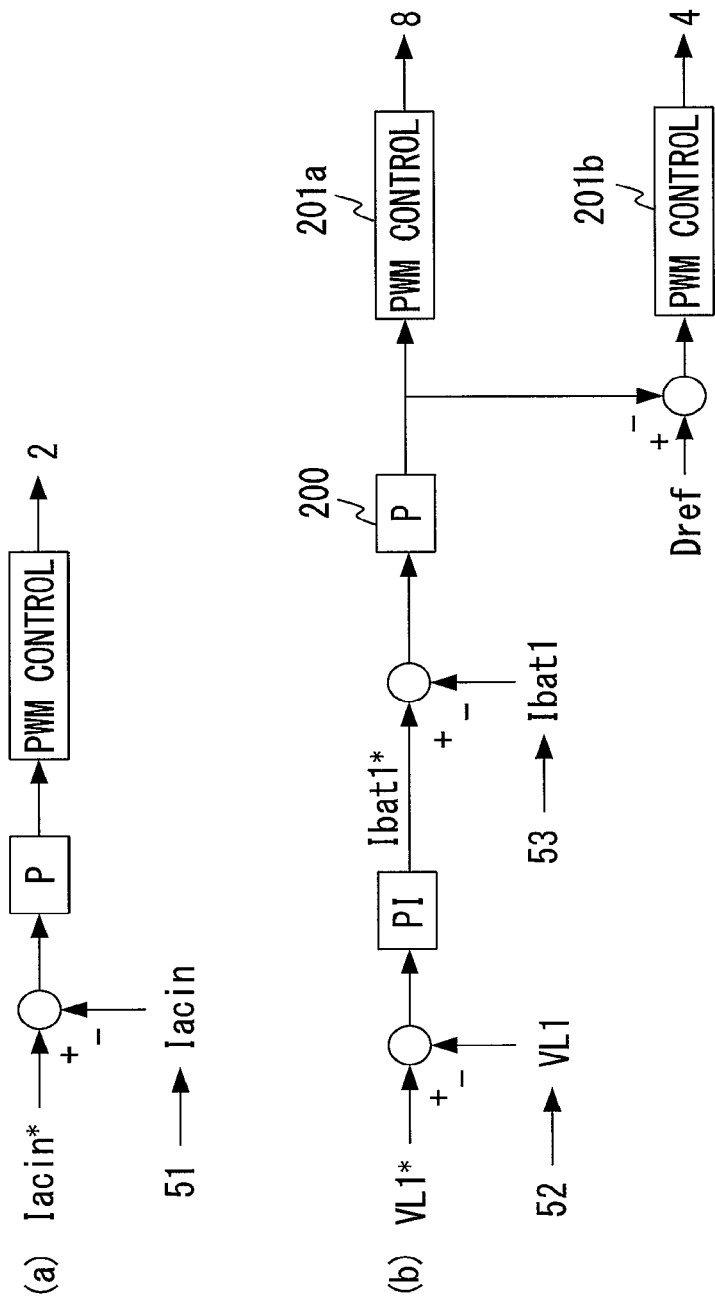
FIG. 59 is a diagram illustrating a control unit for achieving the power flow shown in FIG. 35 and FIG. 36.
Figure 61:
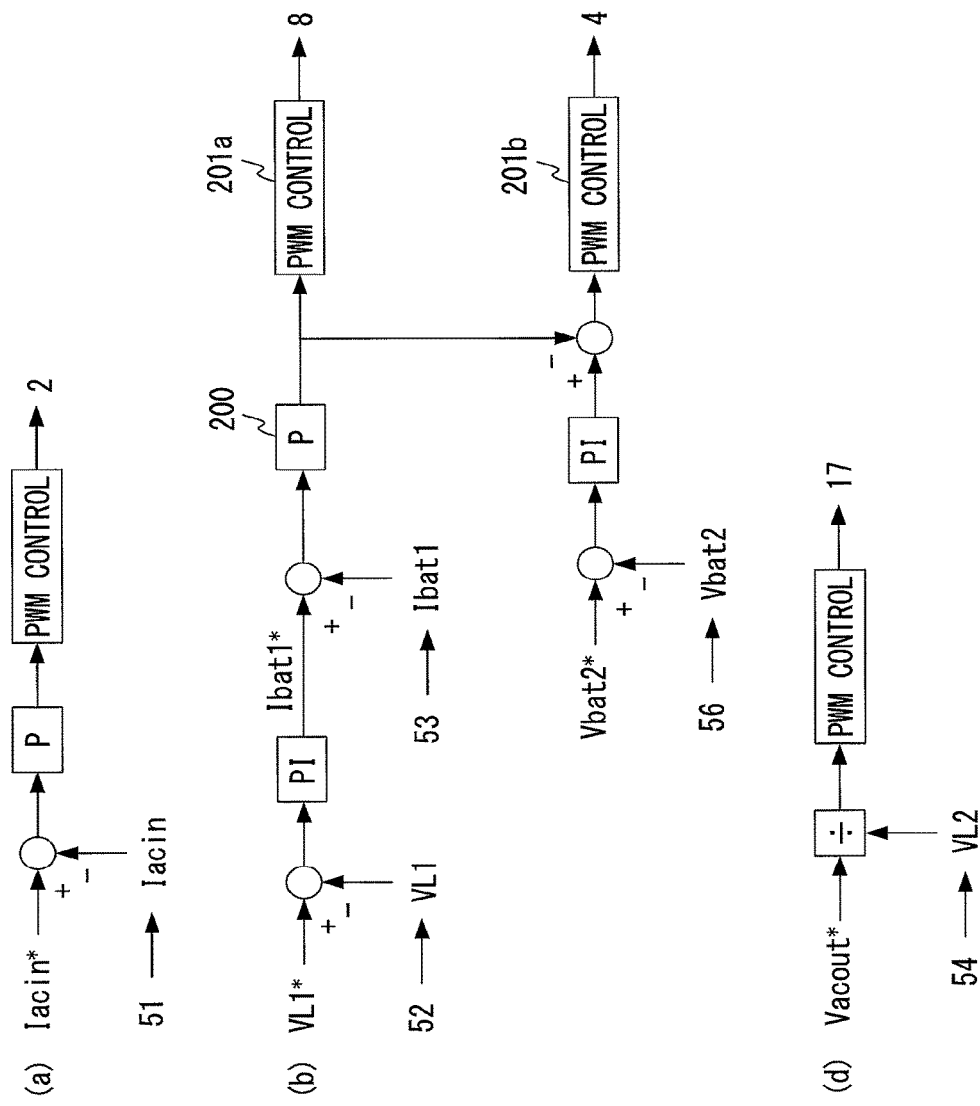
FIG. 61 is a diagram illustrating the control unit for achieving the power flow shown in FIG. 35 and FIG. 36.

Block diagrams of power distribution control by the control unit 100 for executing the above switching patterns (FIG. 39, FIG. 48, FIG. 49, FIG. 58) are FIG. 59 and FIG. 60, or FIG. 61. The difference between control based on FIG. 59 and FIG. 60 and control based on FIG. 61 is as follows.

In the control shown in FIG. 59 and FIG. 60, the total ON time of the first switching circuit 4 and the second switching circuit 8 is made constant, and the voltage VL1 of the capacitor 3 is controlled by the ratio between the ON time of the first switching circuit 4 and the ON time of the second switching circuit 8.

In the control shown in FIG. 61, the total ON time of the first switching circuit 4 and the second switching circuit 8 is calculated from a constant-voltage control system for the second DC power supply 34, whereby the voltage Vbat2 of the second DC power supply 34 is controlled to be constant by the total ON time, and the voltage VL1 of the capacitor 3 is controlled by the ratio between the ON time of the first switching circuit 4 and the ON time of the second switching circuit 8.

Hereinafter, the details of the control shown in FIG. 59 and FIG. 60 and the control shown in FIG. 61 will be described.

In FIG. 59 and FIG. 60, for the AC/DC converter 2, the control unit 100 performs proportional control (P control) on a deviation between a current command value Iacin* for the AC power supply 1 and a current detected value Iacin from the voltage current detection unit 51, and then performs PWM control based on a result thereof, thereby supplying power at constant current from the AC/DC converter 2 to the capacitor 3. At the same time, the control unit 100 controls the AC current at a high power factor. Here, the current command value Iacin* for the AC power supply 1 may be arbitrarily set (FIG. 59(a)).

For the second switching circuit 8, the control unit 100 performs proportional integral control (PI control) on a deviation between a voltage command value VL1* for the capacitor 3 and the voltage detected value VL1 from the voltage current detection unit 52, to calculate a charge current command value Ibat1* for the first DC power supply 11. Next, the control unit 100 performs proportional control (P control) on a deviation between the charge current command value Ibat1* for the first DC power supply 11 and the current detected value Ibat1 from the voltage current detection unit 53, and then performs PWM control based on a result thereof, thereby operating the second switching circuit 8. At the same time, the control unit 100 calculates a difference between the output of the proportional control (P control) and a reference duty Dref, and then performs PWM control based on a result thereof, thereby operating the first switching circuit 4. Thus, the voltage VL1 of the capacitor 3 is controlled at constant voltage (FIG. 59(b)).

For the inverter 17, the control unit 100 performs PWM control using, as a modulation factor for a sinewave inverter, a quotient between a command value Vacout* for the output AC voltage and the voltage detected value VL2 from the voltage current detection unit 54, thereby outputting the AC voltage Vacout to the load device connection end (FIG. 60(a)).

For the step-down chopper circuit which is the switching circuit between the second DC power supply 34 and the transformer 6, the control unit 100 performs proportional integral control (PI control) on a deviation between a voltage command value Vbat2* for the second DC power supply 34 and the voltage detected value Vbat2 from the voltage current detection unit 56, and then performs PWM control based on a result thereof, thereby driving the switch 33 to perform charge voltage control for the second DC power supply (FIG. 60(b)).

Here, by arbitrarily changing the current command value Iacin* for the AC power supply 1, the ratio between the supply power P1 from the AC power supply 1 and the supply power P2 from the first DC power supply 11 can be arbitrarily controlled. In this control, the total ON time of the first switching circuit 4 and the second switching circuit 8 is made constant, and the voltage VL1 of the capacitor 3 is controlled by the ratio between the ON time of the first switching circuit 4 and the ON time of the second switching circuit 8. The total ON time is defined by the reference duty Dref and can be arbitrarily set.

Next, in FIG. 61, for the AC/DC converter 2, the control unit 100 performs proportional control (P control) on a deviation between a current command value Iacin* for the AC power supply 1 and the current detected value Iacin from the voltage current detection unit 51, and then performs PWM control based on a result thereof, thereby supplying power at constant current from the AC/DC converter 2 to the capacitor 3. At the same time, the control unit 100 controls the AC current at a high power factor. Here, the current command value Iacin* for the AC power supply 1 may be arbitrarily set (FIG. 61(a)).

For the second switching circuit 8, the control unit 100 performs proportional integral control (PI control) on a deviation between a voltage command value VL1* for the capacitor 3 and the voltage detected value VL1 from the voltage current detection unit 52, to calculate a charge current command value Ibat1* for the first DC power supply 11. Next, the control unit 100 performs proportional control (P control) on a deviation between the charge current command value Ibat1* for the first DC power supply 11 and the current detected value Ibat1 from the voltage current detection unit 53, and then performs PWM control based on a result thereof, thereby operating the second switching circuit 8. At the same time, the control unit 100 performs proportional integral control (PI control) on a deviation between a voltage command value Vbat2* for the second DC power supply 34 and the voltage detected value Vbat2 from the voltage current detection unit 56. Then, the control unit 100 calculates a deviation between the output of this proportional integral control (PI control) and the output of the proportional control (P control) calculated above, and then performs PWM control based on a result thereof, thereby operating the first switching circuit 4. Thus, while the voltage VL1 of the capacitor 3 is controlled at constant voltage, the voltage Vbat2 of the second DC power supply 34 is controlled at constant voltage (FIG. 61(b)).

For the inverter 17, the control unit 100 performs PWM control using, as a modulation factor for a sinewave inverter, a quotient between a command value Vacout* for the output AC voltage and the voltage detected value VL2 from the voltage current detection unit 54, thereby outputting the AC voltage Vacout to the load device connection end (FIG. 61(c)).

Here, by arbitrarily changing the current command value Iacin* for the AC power supply 1, the ratio between the supply power P1 from the AC power supply 1 and the supply power P2 from the first DC power supply 11 can be arbitrarily controlled. In this control, the total ON time of the first switching circuit 4 and the second switching circuit 8 is calculated from a constant-voltage control system for the second DC power supply 34, whereby the voltage Vbat2 of the second DC power supply 34 is controlled to be constant by the total ON time, and the voltage VL1 of the capacitor 3 is controlled by the ratio between the ON time of the first switching circuit 4 and the ON time of the second switching circuit 8.

The power flows that can be achieved by the control shown in FIG. 59 to FIG. 60 and by the control shown in FIG. 61 are the same. However, in the control shown in FIG. 61, since the switching element 33 is merely kept in an ON state, the switching element 33 and the flyback diode 36 are not necessary. Therefore, simplification of the control unit such as a microcomputer can be achieved.

In the control shown in FIG. 59 and FIG. 60 or the control shown in FIG. 61, constant current charge control is performed for the first DC power supply 11, and constant voltage charge control is performed for the second DC power supply 34. However, any charging method may be used for each of the first DC power supply 11 and the second DC power supply 34, and therefore it is possible to employ an appropriate charging method in accordance with each DC power supply. For example, the first DC power supply 11 may be charged at constant voltage, and the second DC power supply 34 may be charged at constant current.

By performing operation under the control shown in FIG. 59 and FIG. 60 or the control shown in FIG. 61, voltage of the capacitor 3 is always controlled in the power flow in which the first DC power supply 11 is discharged, when the AC power supply 1 is not connected. Thus, the capacitor 3 can be protected from voltage increase.

As described above, in the present embodiment 2, since the above power distribution can be performed, the usage rate of the AC power supply 1 is dramatically improved. That is, if power for one of the loads increases and power consumed in the load cannot be covered by only the input power from the AC power supply 1, the first DC power supply 11 supplies only power corresponding to a difference between the power consumed in the load and the input power from the AC power supply 1, while the power input from the AC power supply 1 is maintained. Thus, it is possible to utilize the input power from the AC power supply 1 to the maximum extent while minimizing discharge of power charged in the DC power supply. Therefore, power saving can be achieved as compared to the case of using only power from the first DC power supply 11 charged from the AC power supply 1.

In the above description, in one switching period, supply of power from the AC power supply 1 via the AC/DC converter 2 and the first switching circuit 4, and supply of power from the first DC power supply 11 via the second switching circuit 8, are performed in a temporally divided manner. However, without limitation thereto, it is also possible that, as shown in FIG. 37 and FIG. 38, in one switching period, supply of power from the AC power supply 1 via the AC/DC converter 2 and the first switching circuit 4, and supply of power from the second DC power supply 34 via the fourth switching circuit 30, are performed in a temporally divided manner.

In this case, the switch 33 operates so as to make the voltage VL1 of the capacitor 3 constant, and the second switching circuit 8 is controlled so as to make voltage or current of the first DC power supply 11 constant. In this way, operation is performed so that, while constant input power P1_in is received from the AC power supply 1, if the input power P1_in alone is insufficient for outputting the supply power P3_out having the AC voltage Vacout and the supply power (charge power) P2_out for the first DC power supply 11, the supply power P4_in from the second DC power supply 34 is supplied for the insufficient power.

In one switching period, all of the AC power supply 1, the first DC power supply 11, and the second DC power supply 34 may be used as power supplies. The operation in this case can be achieved by increasing the division number of the temporal divisions within one switching period. Further, even if a plurality of power supplies are connected, the same effect can be achieved by dividing one switching period in accordance with the number of power supplies to be transmitted.

The AC power supply 1 and the AC/DC converter 2 in the above description may be replaced with a DC voltage source. In this case, the same effect as in the above control is obtained by providing a reactor between the replacement DC voltage source and the capacitor 3. In the case where the AC power supply 1 and the AC/DC converter 2 are replaced with a DC voltage source, the first switching circuit 4 connected to the DC voltage source is, in the claims, referred to as a second switching circuit connected to a DC power supply.

The second switching circuit 8 is capable of bidirectional power transmission, and has the switching elements 8a to 8d configured in a bridge form and each having a switching element and a diode connected in antiparallel to the switching element. In this case, even if the amount of power received by the first DC power supply 11 is attempted to be controlled by PWM control, rectification is performed by the diodes connected in a bridge form, and therefore the amount of charging for the first DC power supply 11 cannot be controlled. Therefore, in the present embodiment, the step-up coil 7 is provided between the second winding 6b and the second switching circuit 8, and when the first DC power supply 11 is charged, output voltage of the second winding 6b of the transformer 6 is set to be lower than voltage of the first DC power supply 11, and the second switching circuit 8 is caused to function as a step-up chopper.

As described above, in the case where the second switching circuit connected to the DC power supply is capable of bidirectional power transmission and has a bridge configuration using switching elements and diodes connected in antiparallel to the switching elements, the second switching circuit only needs to have a step-up function when power is transmitted from the second switching circuit to the DC power supply.

In the case where the second switching circuit connected to the DC power supply is capable of bidirectional power transmission and has a bridge configuration using switching elements and diodes connected in antiparallel to the switching elements, instead of causing the second switching circuit to have a step-up function, a DC/DC converter may be provided between the second switching circuit and the DC power supply, and when power is transmitted from the second switching circuit to the DC power supply, charging for the DC power supply may be stopped by the DC/DC converter.

A part of the fourth switching circuit 30 forms a rectification circuit by the switching elements 30a and 30b being connected to the respective ends of the fourth windings 6d1 and 6d2 of the transformer 6 which are configured in a center-tap form. In addition, a part of the fourth switching circuit 30 forms a step-down chopper, i.e., a DC/DC converter by being provided with the switching element 33, the flyback diode 36, and the smoothing coil 31. That is, as described in claim 8 of the claims, the fourth switching circuit 30 has a function of rectifying voltage occurring on the winding of the transformer and controlling the voltage or current.

In the fourth switching circuit 30, the switching element 33, the flyback diode 36, and the smoothing coil 31, i.e., the DC/DC converter part may be removed, so that the fourth switching circuit 30 has only a function as a rectification circuit. In this case, as described in claim 7 of the claims, the fourth switching circuit 30 becomes a rectification circuit.

Claim 7 and claim 8 are described from the perspective of regarding the second DC power supply 34 as a load device, but as described above, the second DC power supply 34 has also a function of supplying power to the load side, as a power supply source.

Embodiment 3

Figure 62:
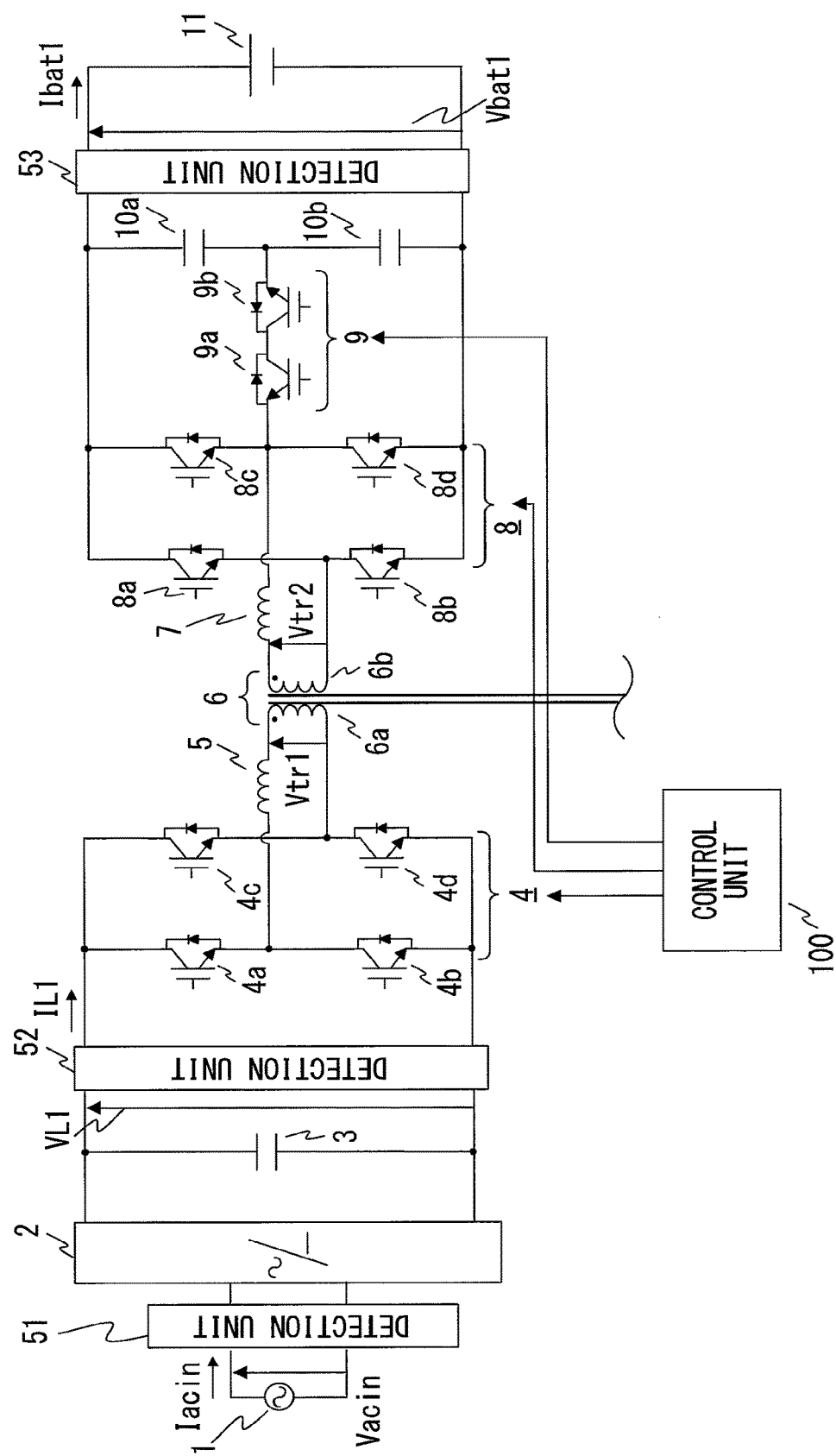
FIG. 62 is a circuit configuration diagram of an electric power conversion device according to embodiment 3 of the present invention.
Figure 63:
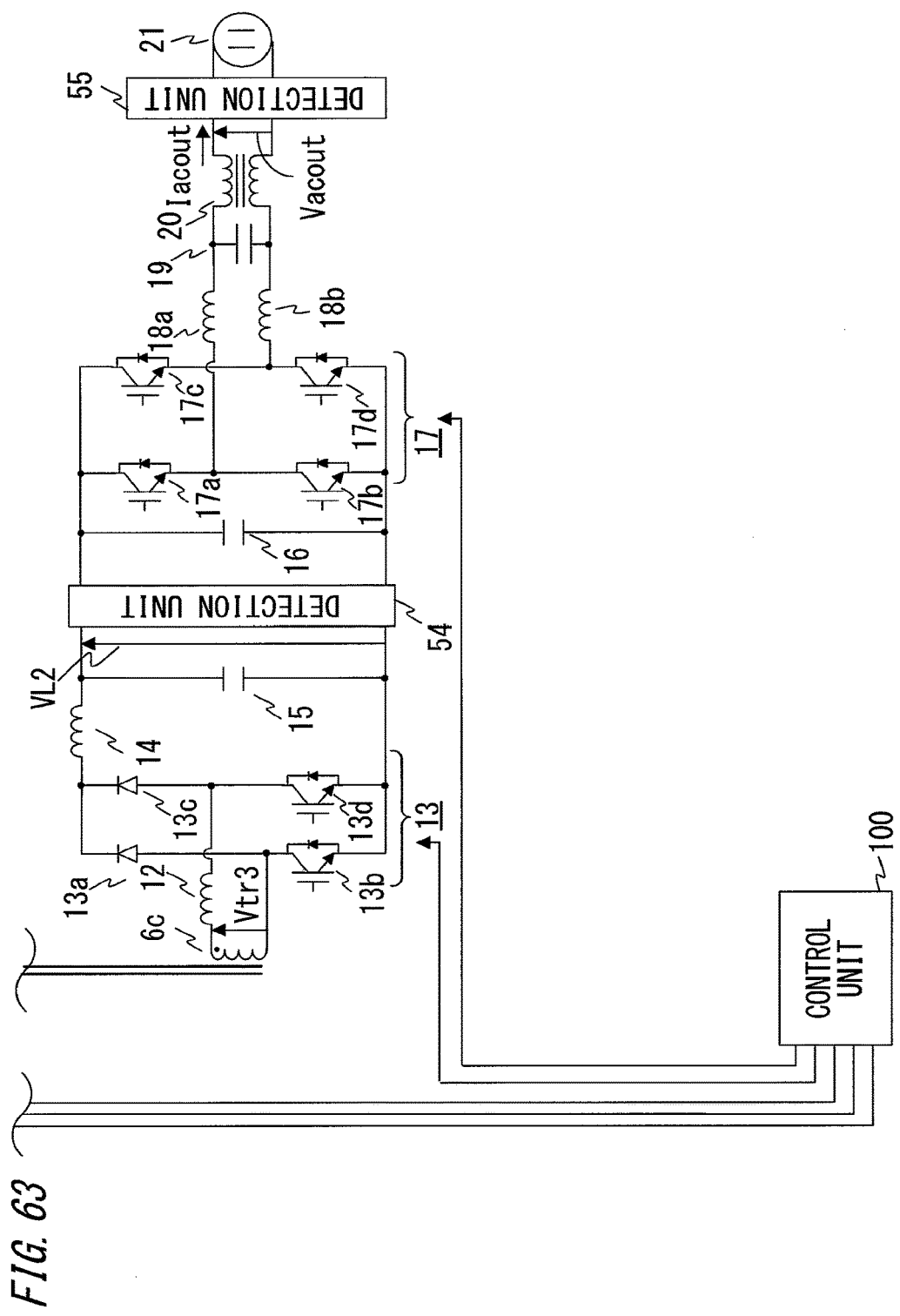
FIG. 63 is a circuit configuration diagram of the electric power conversion device according to embodiment 3 of the present invention.

FIG. 62 and FIG. 63 are circuit configuration diagrams of an electric power conversion device according to embodiment 3 of the present invention. The components that correspond to or are the same as those in embodiment 1 shown in FIG. 1 and FIG. 2 are denoted by the same reference characters.

A feature in embodiment 3 is that the circuit including: the fourth windings 6d1 and 6d2 of the transformer 6; and the fourth switching circuit 30 and the second DC power supply 34 connected to the fourth windings 6d1 and 6d2, is eliminated from the configuration in embodiment 1 shown in FIG. 1 and FIG. 2. The other configuration is the same as in embodiment 1.

Therefore, except for the operation of the circuit including the fourth switching circuit 30 and the second DC power supply 34 in embodiment 1, the basic operation in embodiment 3 is the same as in embodiment 1, and therefore the detailed description thereof is omitted here.

In the electric power conversion device of the present embodiment 3, when power supplied from the AC power supply 1 is insufficient for the output power to the load device connection end 21, power is supplied from the first DC power supply 11 while supply of power from the AC power supply 1 is continued, whereby the usage rate of the AC power supply 1 can be improved.

The AC power supply 1 and the AC/DC converter 2 in the above description may be replaced with a DC voltage source. In this case, the same effect as in the above control is obtained by providing a reactor between the replacement DC voltage source and the capacitor 3. In the case where the AC power supply 1 and the AC/DC converter 2 are replaced with a DC voltage source, the first switching circuit 4 connected to the DC voltage source is, in the claims, referred to as a second switching circuit connected to a DC power supply.

The second switching circuit 8 is capable of bidirectional power transmission, and has the switching elements 8a to 8d configured in a bridge form and each having a switching element and a diode connected in antiparallel to the switching element. In this case, even if the amount of power received by the first DC power supply 11 is attempted to be controlled by PWM control, rectification is performed by the diodes connected in a bridge form, and therefore the amount of charging for the first DC power supply 11 cannot be controlled. Therefore, in the present embodiment, the step-up coil 7 is provided between the second winding 6b and the second switching circuit 8, and when the first DC power supply 11 is charged, output voltage of the second winding 6b of the transformer 6 is set to be lower than voltage of the first DC power supply 11, and the second switching circuit 8 is caused to function as a step-up chopper.

As described above, in the case where the second switching circuit connected to the DC power supply is capable of bidirectional power transmission and has a bridge configuration using switching elements and diodes connected in antiparallel to the switching elements, the second switching circuit only needs to have a step-up function when power is transmitted from the second switching circuit to the DC power supply.

In the case where the second switching circuit connected to the DC power supply is capable of bidirectional power transmission and has a bridge configuration using switching elements and diodes connected in antiparallel to the switching elements, instead of causing the second switching circuit to have a step-up function, a DC/DC converter may be provided between the second switching circuit and the DC power supply, and when power is transmitted from the second switching circuit to the DC power supply, charging for the DC power supply may be stopped by the DC/DC converter.

Embodiment 4

Figure 64:
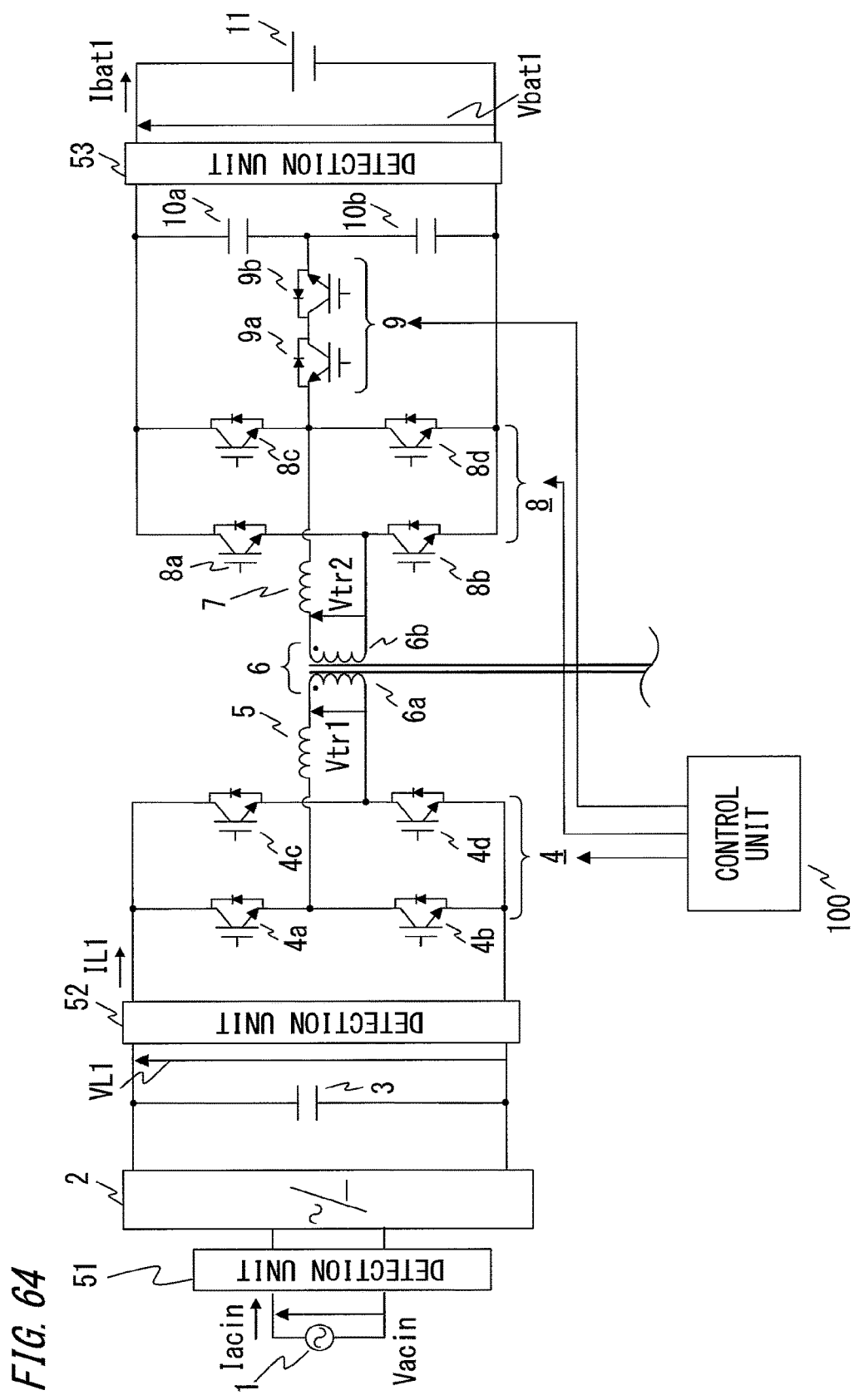
FIG. 64 is a circuit configuration diagram of an electric power conversion device according to embodiment 4 of the present invention.
Figure 65:
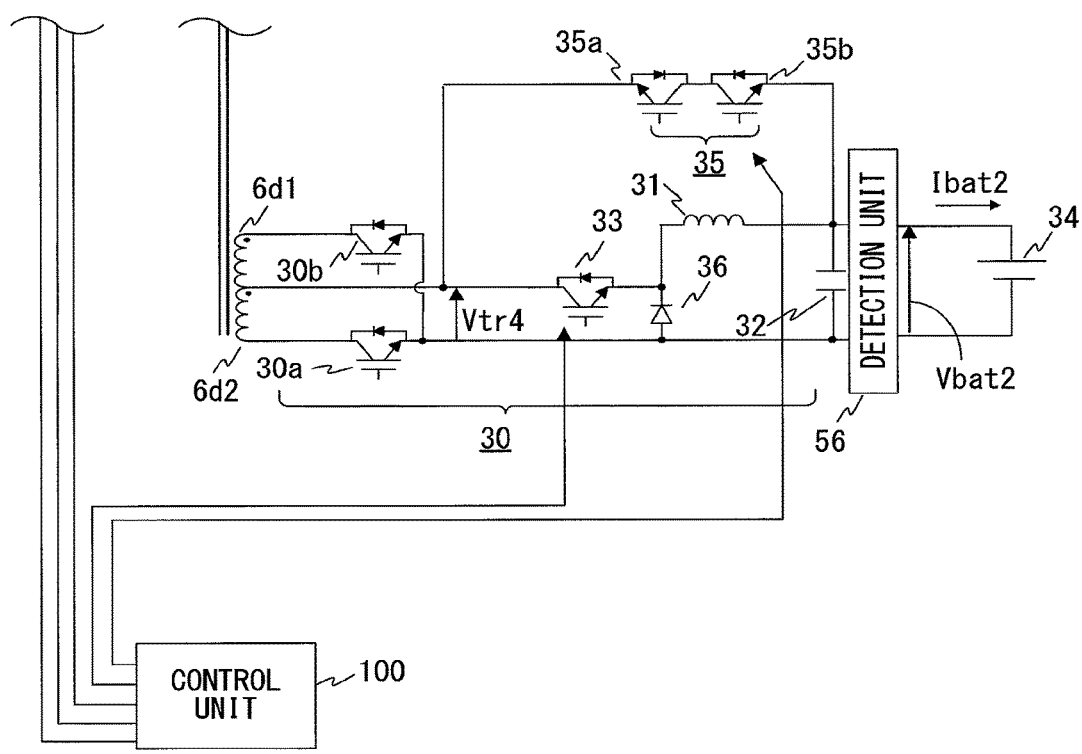
FIG. 65 is a circuit configuration diagram of the electric power conversion device according to embodiment 4 of the present invention.

FIG. 64 and FIG. 65 are circuit configuration diagrams of an electric power conversion device according to embodiment 4 of the present invention. The components that correspond to or are the same as those in embodiment 1 shown in FIG. 1 and FIG. 2 are denoted by the same reference characters.

A feature in embodiment 4 is that the circuit including: the third winding 6c of the transformer 6; and the third switching circuit 13 and the inverter 17 connected to the third winding 6c, is eliminated from the configuration in embodiment 1 shown in FIG. 1 and FIG. 2. The other configuration is the same as in embodiment 1.

Therefore, except for the operation of the circuit including the third switching circuit 13 and the inverter 17 in embodiment 1, the basic operation in embodiment 4 is the same as in embodiment 1, and therefore the detailed description thereof is omitted here.

In the electric power conversion device of the present embodiment 4, when power supplied from the AC power supply 1 is insufficient for the output power to the first DC power supply 11 or the output power to the second DC power supply 34, power is supplied from the first DC power supply 11 or the second DC power supply 34 while supply of power from the AC power supply 1 is continued, whereby the usage rate of the AC power supply 1 can be improved.

The AC power supply 1 and the AC/DC converter 2 in the above description may be replaced with a DC voltage source. In this case, the same effect as in the above control is obtained by providing a reactor between the replacement DC voltage source and the capacitor 3. In the case where the AC power supply 1 and the AC/DC converter 2 are replaced with a DC voltage source, the first switching circuit 4 connected to the DC voltage source is, in the claims, referred to as a second switching circuit connected to a DC power supply.

The second switching circuit 8 is capable of bidirectional power transmission, and has the switching elements 8a to 8d configured in a bridge form and each having a switching element and a diode connected in antiparallel to the switching element. In this case, even if the amount of power received by the first DC power supply 11 is attempted to be controlled by PWM control, rectification is performed by the diodes connected in a bridge form, and therefore the amount of charging for the first DC power supply 11 cannot be controlled. Therefore, in the present embodiment, the step-up coil 7 is provided between the second winding 6b and the second switching circuit 8, and when the first DC power supply 11 is charged, output voltage of the second winding 6b of the transformer 6 is set to be lower than voltage of the first DC power supply 11, and the second switching circuit 8 is caused to function as a step-up chopper.

As described above, in the case where the second switching circuit connected to the DC power supply is capable of bidirectional power transmission and has a bridge configuration using switching elements and diodes connected in antiparallel to the switching elements, the second switching circuit only needs to have a step-up function when power is transmitted from the second switching circuit to the DC power supply.

In the case where the second switching circuit connected to the DC power supply is capable of bidirectional power transmission and has a bridge configuration using switching elements and diodes connected in antiparallel to the switching elements, instead of causing the second switching circuit to have a step-up function, a DC/DC converter may be provided between the second switching circuit and the DC power supply, and when power is transmitted from the second switching circuit to the DC power supply, charging for the DC power supply may be stopped by the DC/DC converter.

A part of the fourth switching circuit 30 forms a rectification circuit by the switching elements 30a and 30b being connected to the respective ends of the fourth windings 6d1 and 6d2 of the transformer 6 which are configured in a center-tap form. In addition, a part of the fourth switching circuit 30 forms a step-down chopper, i.e., a DC/DC converter by being provided with the switching element 33, the flyback diode 36, and the smoothing coil 31. That is, as described in claim 8 of the claims, the fourth switching circuit 30 has a function of rectifying voltage occurring on the winding of the transformer and controlling the voltage or current.

In the fourth switching circuit 30, the switching element 33, the flyback diode 36, and the smoothing coil 31, i.e., the DC/DC converter part may be removed, so that the fourth switching circuit 30 has only a function as a rectification circuit. In this case, as described in claim 7 of the claims, the fourth switching circuit 30 becomes a rectification circuit.

Claim 7 and claim 8 are described from the perspective of regarding the second DC power supply 34 as a load device, but as described above, the second DC power supply 34 has also a function of supplying power to the load side, as a power supply source.

Embodiment 5

Regarding the method for generating gate signals for performing power transmission in a temporally divided manner in the electric power conversion device shown in embodiment 1, the details of PWM control units 201a and 201b shown in FIG. 27(b) will be described. The PWM control units 201a and 201b are, in the claims, referred to as a second control unit and a first control unit.

Figure 66:
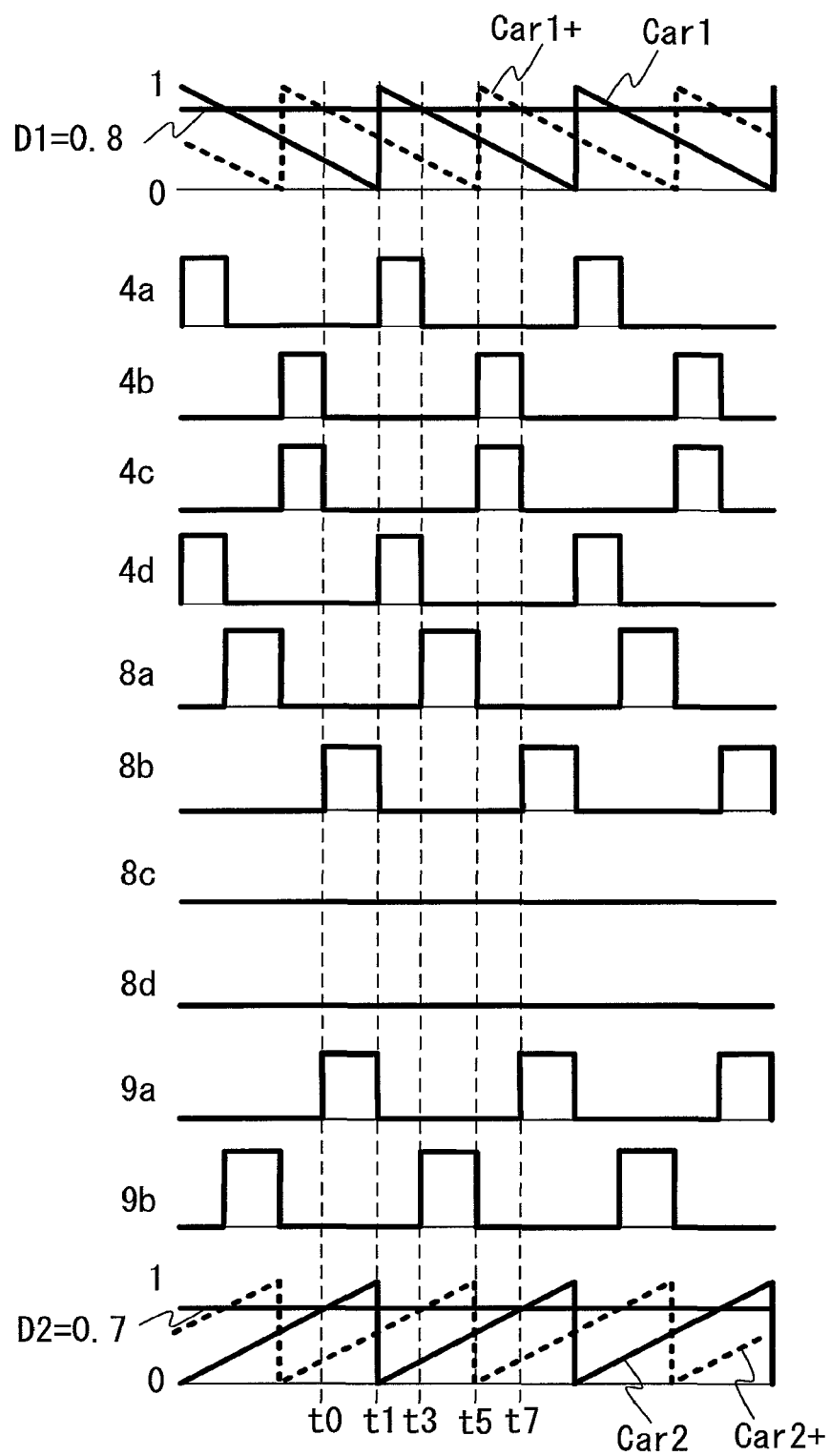
FIG. 66 is a diagram illustrating PWM control for calculating gate signals according to embodiment 5 of the present invention.

FIG. 66 shows calculation in PWM control in the case where t1=t2, t3=t4, t5=t6, and t7=t8 are assumed in FIG. 16.

In FIG. 66, Car1 and Car2 are saw-tooth waves having the same amplitude and the same phase and having wave orientations reversed from each other. Car1+ and Car1 are saw-tooth waves having phases different from each other by 180 degrees, and Car2+ and Car2 are saw-tooth waves having phases different from each other by 180 degrees. An ON time ratio D2 for the second switching circuit 8 and the switch 9 is the output of the proportional control (P control) 200 in FIG. 27(b), and the relationship between the ON time ratio D2 and an ON time ratio D1 for the first switching circuit 4 is represented by the following expression (1).

$$D1 = Dref - D2 \tag{1}$$

Here, if the amplitude of the saw-tooth waves is set at 1, and 0.5<D1<1 and 0.5<D2<1 are satisfied, Dref is 1.5.

Here, from expression (1), temporally divided ON times can be allocated for the first switching circuit 4 and the second switching circuit 8, respectively. That is, the power supplying period of the first switching circuit 4 and the power supplying period of the second switching circuit 8 can be provided within one switching period which is the minimum repetitive period, and thus it becomes possible to supply power to the load device from both the AC power supply 1 and the first DC power supply 11 at the same time.

The PWM control unit 201b compares the ON time ratio D1 for the first switching circuit 4 with the saw-tooth wave Car1, and only when Car1 is higher than D1, outputs a High level to the gates, thereby calculating the gate signals for the switching elements 4a and 4d of the first switching circuit 4. Similarly, the PWM control unit 201b compares the ON time ratio D1 for the first switching circuit 4 with the saw-tooth wave Car1+, and only when Car1+ is higher than D1, outputs a High level to the gates, thereby calculating the gate signals for the switching elements 4b and 4c of the first switching circuit 4. Thus, the gate signals for the first switching circuit 4 can be calculated.

The PWM control unit 201a compares the ON time ratio D2 for the second switching circuit 8 and the switch 9 with the saw-tooth wave Car2, and only when Car2 is higher than D2, outputs a High level to the gates, thereby calculating the gate signals for the switching element 8b and the switching element 9a. Similarly, the PWM control unit 201a compares the ON time ratio D2 for the second switching circuit 8 and the switch 9 with the saw-tooth wave Car2+, and only when Car2+ is higher than D2, outputs a High level to the gates, thereby calculating the gate signals for the switching element 8a and the switching element 9b. Thus, the gate signals for the second switching circuit 8 and the switch 9 can be calculated.

As described above, by performing PWM control using saw-tooth waves synchronized in phases and amplitudes and having wave orientations reversed from each other, it becomes possible to perform power transmission in a temporally divided manner.

Figure 67:
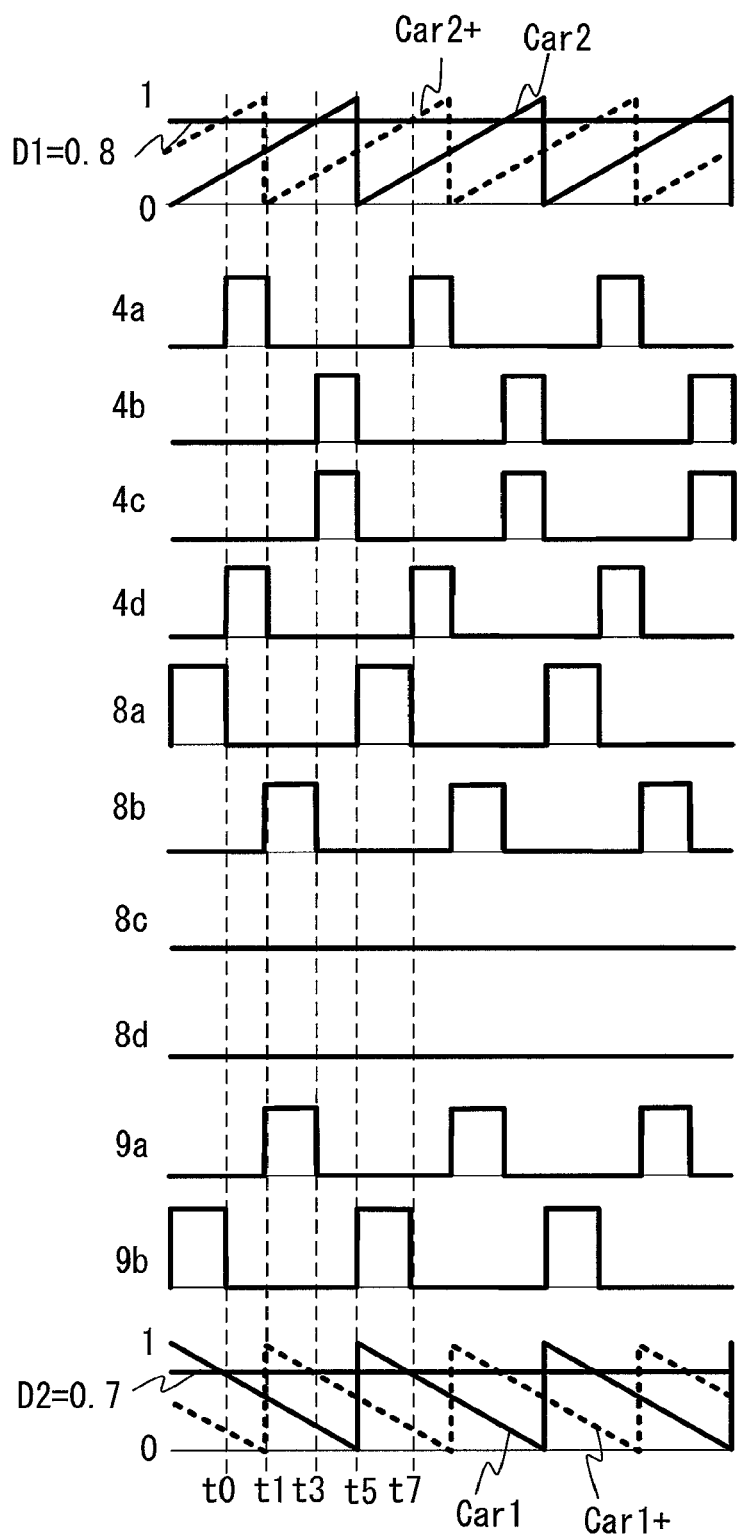
FIG. 67 is a diagram illustrating PWM control for calculating gate signals according to embodiment 5 of the present invention.

Similarly, as shown in FIG. 67, by comparing the saw-tooth waves Car2 and Car2+ with the ON time ratio D1 for the first switching circuit 4, the gate signals for the first switching circuit 4 are calculated. In addition, by comparing the saw-tooth waves Car1 and Car1+ with the ON time ratio D2 for the second switching circuit 8 and the switch 9, the gate signals for the second switching circuit 8 and the switch 9 are calculated. As a result, the gate signals shown in FIG. 7 as described in embodiment 1 can be calculated.

In addition, as shown in FIG. 27(b), FIG. 29(b), and FIG. 31(b), by calculating the ON time ratio D2 from a deviation between the voltage detected value VL1 and the target value VL1* for the capacitor 3, the ratio between supply of power from the AC power supply 1 and supply of power from the first DC power supply 11 can be controlled and the voltage VL1 of the capacitor 3 can be stabilized.

Further, in FIG. 29(b), by calculating Dref from a deviation between the detected value Vbat2 and the target value Vbat* for voltage of the load (second DC power supply 34), power supplied to the load can be controlled. In addition, in FIG. 31(b), by calculating Dref from a deviation between the detected value VL2 and the target value VL2* for voltage of the load (capacitor 15), power supplied to the load can be controlled.

In addition, in FIG. 29(b), by calculating Dref from a deviation between a current detected value Ibat2 and a target value Ibat2* for the load (second DC power supply 34), and in FIG. 31(b), by calculating Dref from a deviation between a current detected value IL2 and a target value IL2* for the load, power supplied to the load can be controlled in the same manner as described above.

Figure 68:
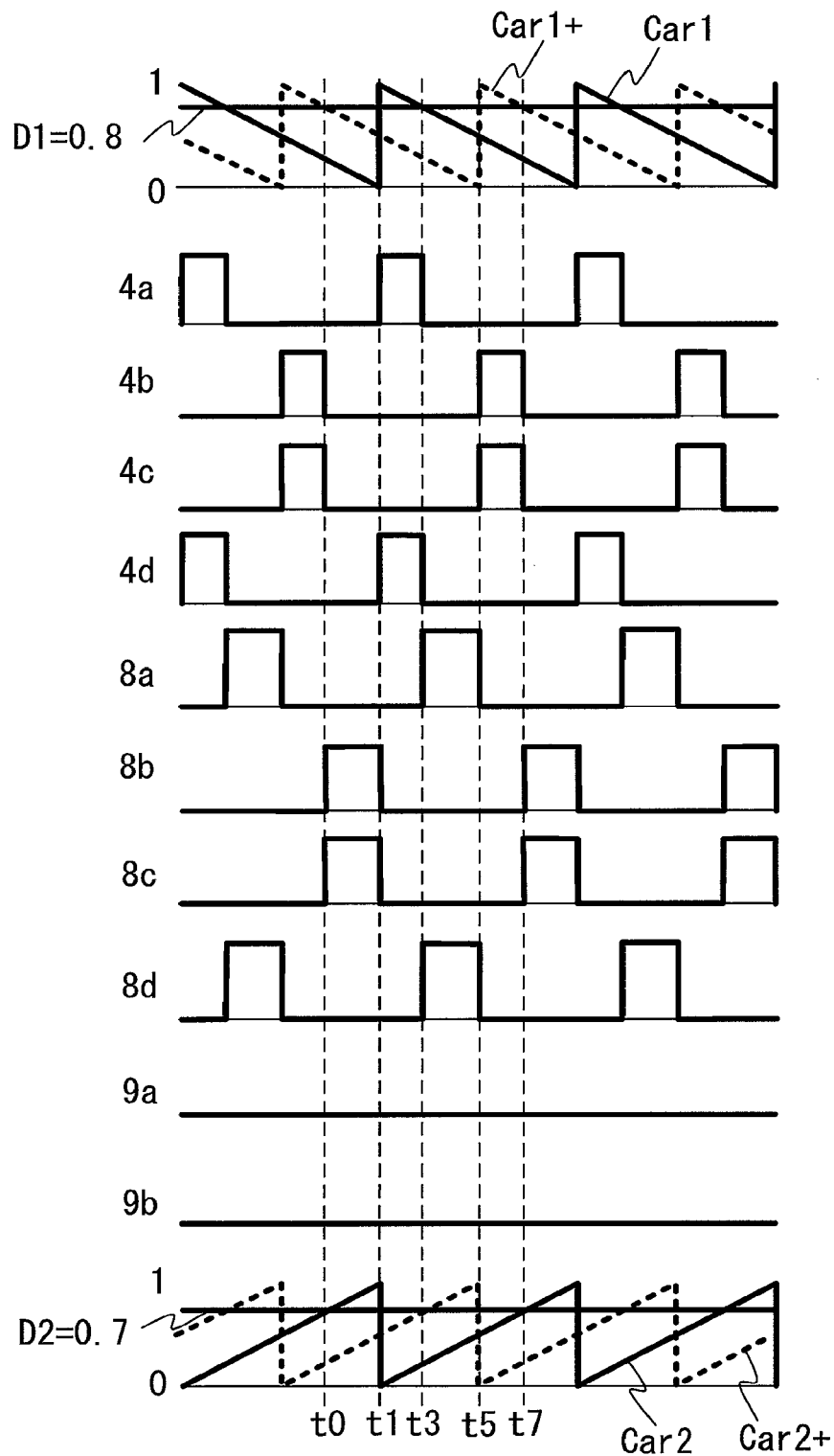
FIG. 68 is a diagram illustrating PWM control for calculating gate signals according to embodiment 5 of the present invention.

FIG. 68 shows calculation in PWM control in the case where t1=t2, t3=t4, t5=t6, and t7=t8 are assumed in FIG. 26.

In FIG. 68, Car1 and Car2 are saw-tooth waves having the same amplitude and the same phase and having wave orientations reversed from each other. Car1+ and Car1 are saw-tooth waves having phases different from each other by 180 degrees, and Car2+ and Car2 are saw-tooth waves having phases different from each other by 180 degrees. An ON time ratio D2 for the second switching circuit 8 is the output of the proportional control (P control) 200 in FIG. 27(b), and the relationship between the ON time ratio D2 and an ON time ratio D1 for the first switching circuit 4 is represented by the following expression (2).

$$D1 = Dref - D2 \tag{2}$$

Here, if the amplitude of the saw-tooth waves is set at 1, and 0.5<D1<1 and 0.5<D2<1 are satisfied, Dref is 1.5.

Here, from expression (2), temporally divided ON times can be allocated for the first switching circuit 4 and the second switching circuit 8, respectively. That is, the power supplying period of the first switching circuit 4 and the power supplying period of the second switching circuit 8 can be provided within one switching period which is the minimum repetitive period, and thus it becomes possible to supply power to the load device from both the AC power supply 1 and the first DC power supply 11 at the same time.

The PWM control unit 201b compares the ON time ratio D1 for the first switching circuit 4 with the saw-tooth wave Car1, and only when Car1 is higher than D1, outputs a High level to the gates, thereby calculating the gate signals for the switching elements 4a and 4d of the first switching circuit 4. Similarly, the PWM control unit 201b compares the ON time ratio D1 for the first switching circuit 4 with the saw-tooth wave Car1+, and only when Car1+ is higher than D1, outputs a High level to the gates, thereby calculating the gate signals for the switching elements 4b and 4c of the first switching circuit 4. Thus, the gate signals for the first switching circuit 4 can be calculated.

The PWM control unit 201a compares the ON time ratio D2 for the second switching circuit 8 with the saw-tooth wave Car2, and only when Car2 is higher than D2, outputs a High level to the gates, thereby calculating the gate signals for the switching elements 8b and 8c. Similarly, the PWM control unit 201a compares the ON time ratio D2 for the second switching circuit 8 with the saw-tooth wave Car2+, and only when Car2+ is higher than D2, outputs a High level to the gates, thereby calculating the gate signals for the switching elements 8a and 8d. Thus, calculation for the second switching circuit 8 can be performed.

As described above, by performing PWM control using saw-tooth waves synchronized in phases and amplitudes and having wave orientations reversed from each other, it becomes possible to perform power transmission in a temporally divided manner.

Figure 69:
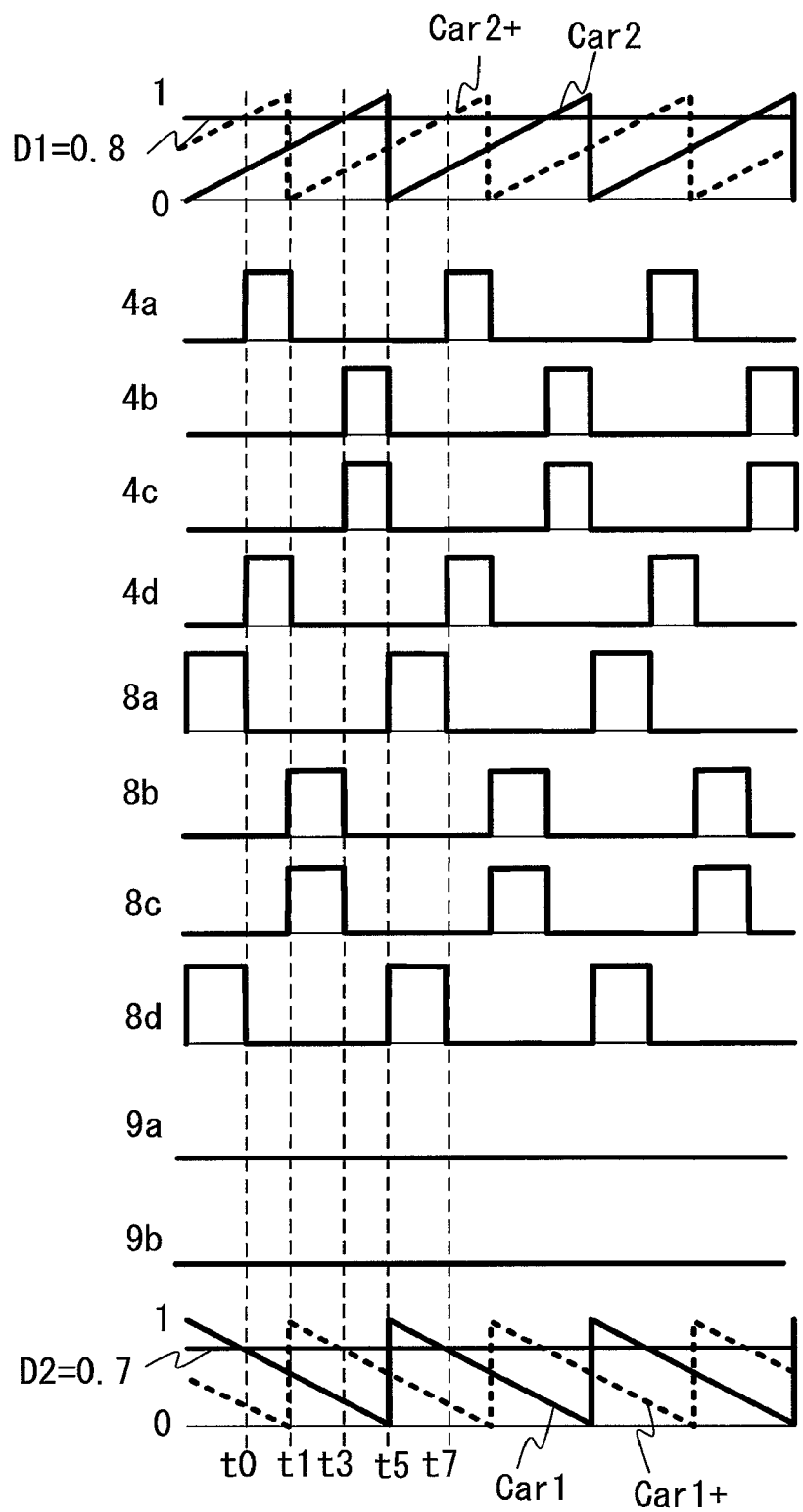
FIG. 69 is a diagram illustrating PWM control for calculating gate signals according to embodiment 5 of the present invention.

Similarly, as shown in FIG. 69, by comparing the saw-tooth waves Car2 and Car2+ with the ON time ratio D1 for the first switching circuit 4, the gate signals for the first switching circuit 4 are calculated. In addition, by comparing the saw-tooth waves Car1 and Car1+ with the ON time ratio D2 for the second switching circuit 8, the gate signals for the second switching circuit 8 are calculated. As a result, the gate signals shown in FIG. 17 as described in embodiment 1 can be calculated.

In addition, as shown in FIG. 27(b), FIG. 29(b), and FIG. 31(b), by calculating the ON time ratio D2 from a deviation between the voltage detected value VL1 and the target value VL1* for the capacitor 3, the ratio between supply of power from the AC power supply 1 and supply of power from the first DC power supply 11 can be controlled and the voltage VL1 of the capacitor 3 can be stabilized.

Further, in FIG. 29(b), by calculating Dref from a deviation between the detected value Vbat2 and the target value Vbat* for voltage of the load (second DC power supply 34), power supplied to the load can be controlled. In addition, in FIG. 31(b), by calculating Dref from a deviation between the detected value VL2 and the target value VL2* for voltage of the load (capacitor 15), power supplied to the load can be controlled.

In addition, in FIG. 29(b), by calculating Dref from a deviation between a current detected value Ibat2 and a target value Ibat2* for the load (second DC power supply 34), and in FIG. 31(b), by calculating Dref from a deviation between a current detected value IL2 and a target value IL2* for the load, power supplied to the load can be controlled in the same manner as described above.

Embodiment 6

Regarding the method for generating gate signals for performing power transmission in a temporally divided manner in the electric power conversion device shown in embodiment 2, the details of PWM control units 201a and 201b shown in FIG. 59(b) will be described. The PWM control units 201a and 201b are, in the claims, referred to as a second control unit and a first control unit.

Figure 70:
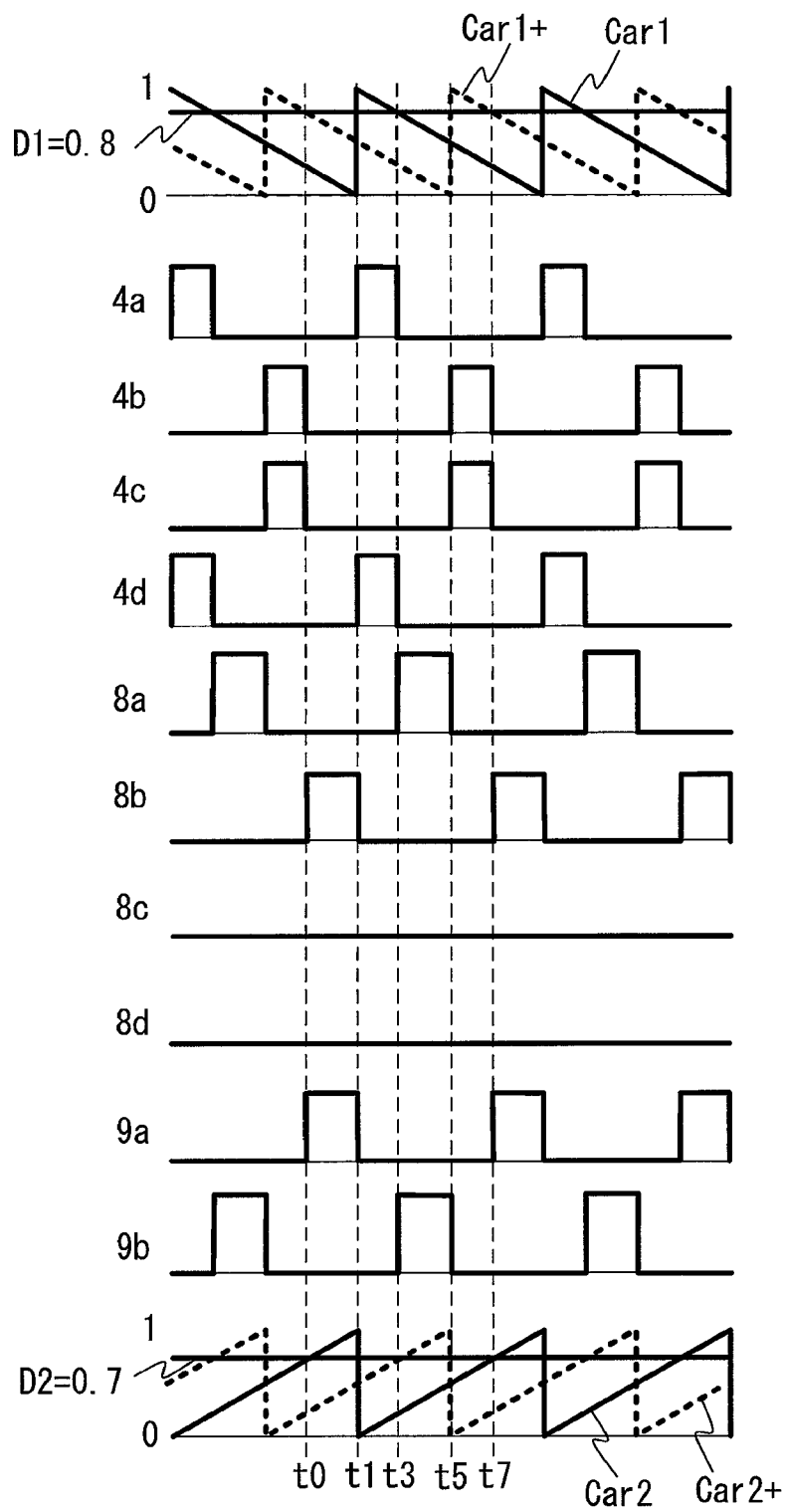
FIG. 70 is a diagram illustrating PWM control for calculating gate signals according to embodiment 5 of the present invention.

FIG. 70 shows calculation in PWM control in the case where t1=t2, t3=t4, t5=t6, and t7=t8 are assumed in FIG. 48.

In FIG. 70, Car1 and Car2 are saw-tooth waves having the same amplitude and the same phase and having wave orientations reversed from each other. Car1+ and Car1 are saw-tooth waves having phases different from each other by 180 degrees, and Car2+ and Car2 are saw-tooth waves having phases different from each other by 180 degrees. An ON time ratio D2 for the second switching circuit 8 and the switch 9 is the output of the proportional control (P control) 200 in FIG. 59(b), and the relationship between the ON time ratio D2 and an ON time ratio D1 for the first switching circuit 4 is represented by the following expression (3).

$$D1 = Dref - D2 \quad (3)$$

If the amplitude of the saw-tooth waves is set at 1, and 0.5<D1<1 and 0.5<D2<1 are satisfied, Dref is 1.5.

Here, from expression (3), temporally divided ON times can be allocated for the first switching circuit 4 and the second switching circuit 8, respectively. That is, the power supplying period of the first switching circuit 4 and the power supplying period of the second switching circuit 8 can be provided within one switching period which is the minimum repetitive period, and thus it becomes possible to supply power to the load device from both the AC power supply 1 and the first DC power supply 11 at the same time.

The PWM control unit 201b compares the ON time ratio D1 for the first switching circuit 4 with the saw-tooth wave Car1, and only when Car1 is higher than D1, outputs a High level to the gates, thereby calculating the gate signals for the switching elements 4a and 4d of the first switching circuit 4. Similarly, the PWM control unit 201b compares the ON time ratio D1 for the first switching circuit 4 with the saw-tooth wave Car1+, and only when Car1+ is higher than D1, outputs a High level to the gates, thereby calculating the gate signals for the switching elements 4b and 4c of the first switching circuit 4. Thus, the gate signals for the first switching circuit 4 can be calculated.

The PWM control unit 201a compares the ON time ratio D2 for the second switching circuit 8 and the switch 9 with the saw-tooth wave Car2, and only when Car2 is higher than D2, outputs a High level to the gates, thereby calculating the gate signals for the switching element 8b and the switching element 9a. Similarly, the PWM control unit 201a compares the ON time ratio D2 for the second switching circuit 8 and the switch 9 with the saw-tooth wave Car2+, and only when Car2+ is higher than D2, outputs a High level to the gates, thereby calculating the gate signals for the switching element 8a and the switching element 9b. Thus, the gate signals for the second switching circuit 8 and the switch 9 can be calculated.

As described above, by performing PWM control using saw-tooth waves synchronized in phases and amplitudes and having wave orientations reversed from each other, it becomes possible to perform power transmission in a temporally divided manner.

Figure 71:
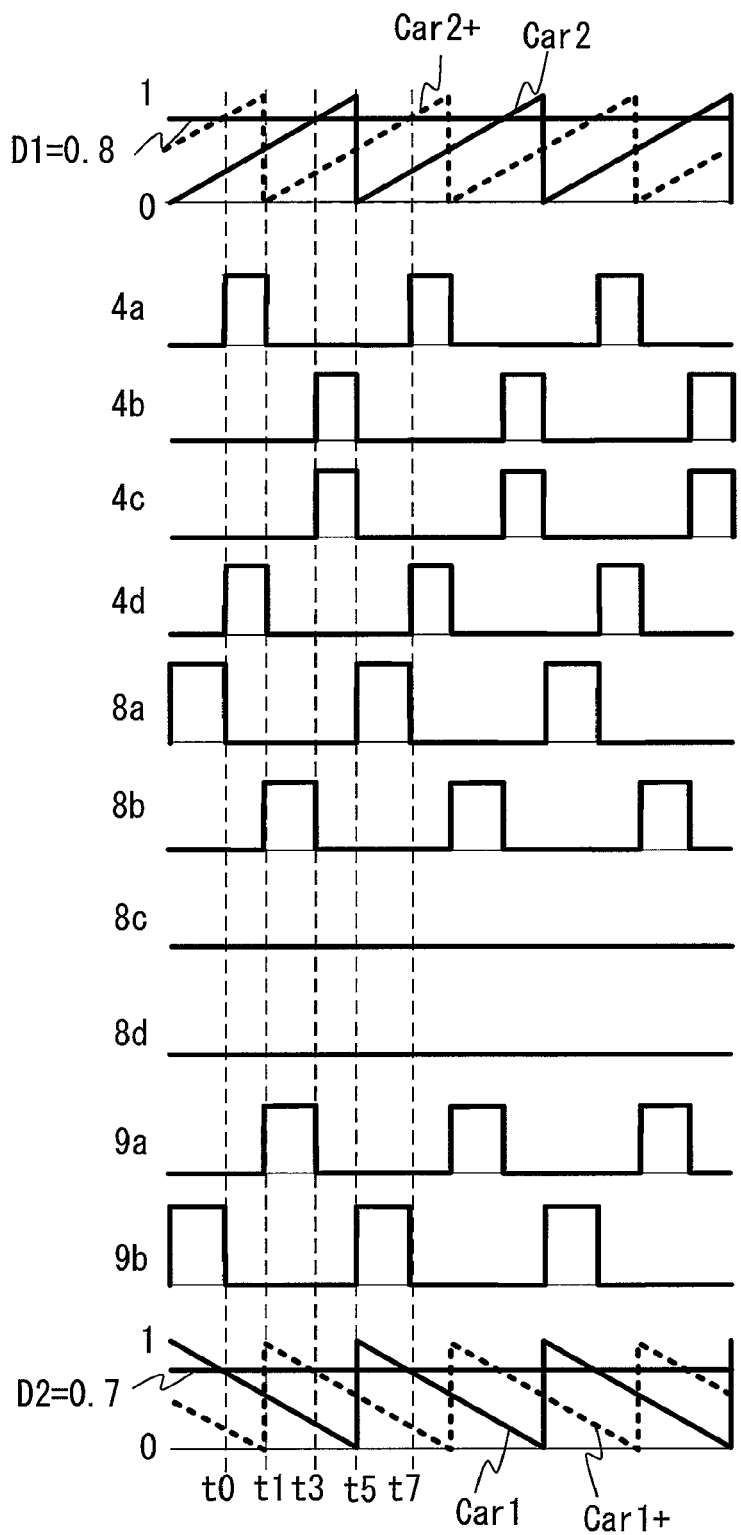
FIG. 71 is a diagram illustrating PWM control for calculating gate signals according to embodiment 5 of the present invention.

Similarly, as shown in FIG. 71, by comparing the saw-tooth waves Car2 and Car2+ with the ON time ratio D1 for the first switching circuit 4, the gate signals for the first switching circuit 4 are calculated. In addition, by comparing the saw-tooth waves Car1 and Car1+ with the ON time ratio D2 for the second switching circuit 8 and the switch 9, the gate signals for the second switching circuit 8 and the switch 9 are calculated. As a result, the gate signals shown in FIG. 39 as described in embodiment 2 can be calculated.

In addition, as shown in FIG. 59(b) and FIG. 61(b), by calculating the ON time ratio D2 from a deviation between the voltage detected value VL1 and the target value VL1* for the capacitor 3, the ratio between supply of power from the AC power supply 1 and supply of power from the first DC power supply 11 can be controlled and the voltage VL1 of the capacitor 3 can be stabilized.

Further, as shown in FIG. 61(b), by calculating Dref from a deviation between the detected value Vbat2 and the target value Vbat2* for voltage of the load (second DC power supply 34), power supplied to the load can be controlled.

In addition, in FIG. 61(b), by calculating Dref from a deviation between a current detected value Ibat2 and a target value Ibat2* for the load (second DC power supply 34), power supplied to the load can be controlled in the same manner as described above.

Figure 72:
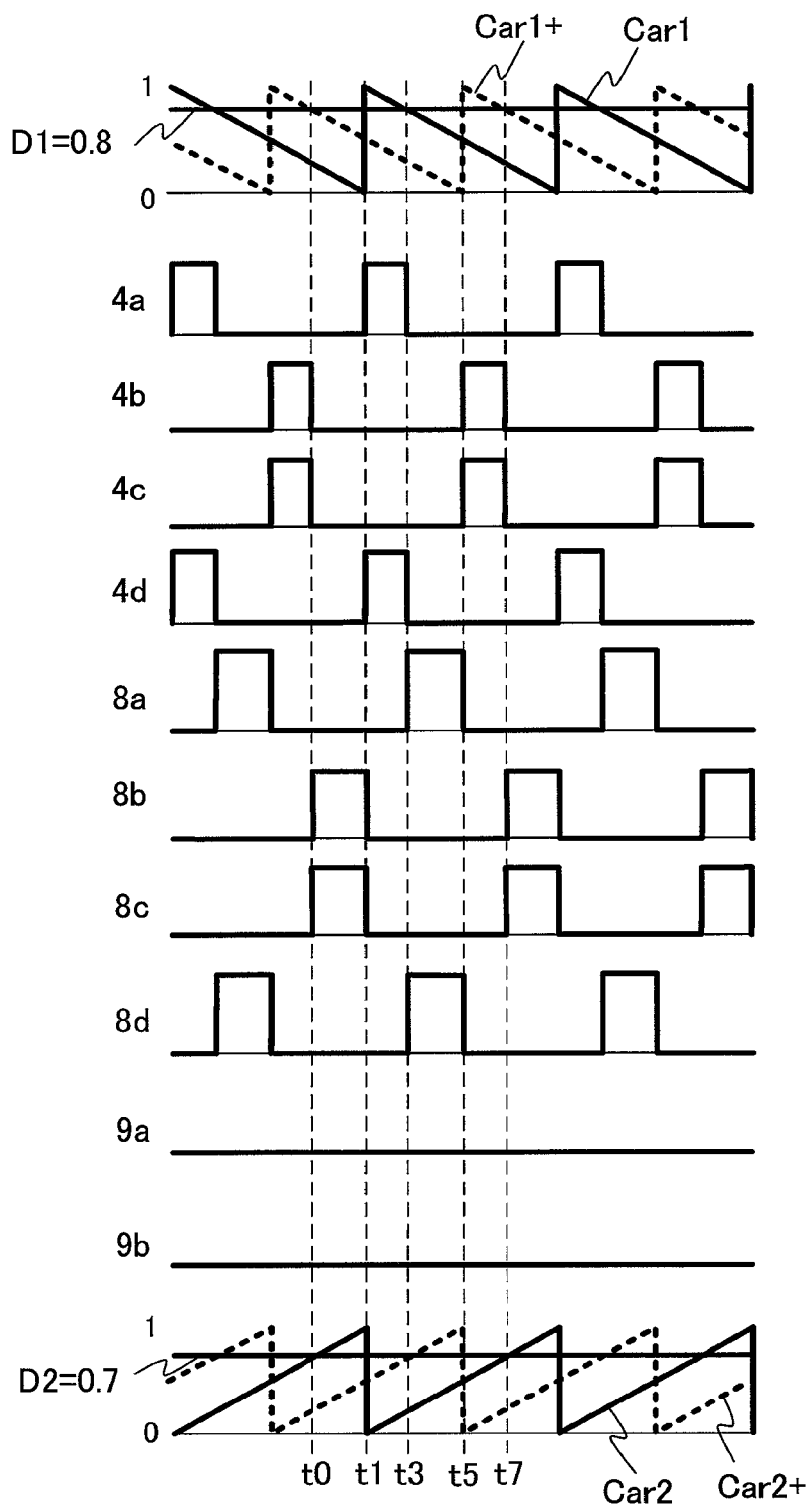
FIG. 72 is a diagram illustrating PWM control for calculating gate signals according to embodiment 5 of the present invention.

FIG. 72 shows calculation in PWM control in the case where t1=t2, t3=t4, t5=t6, and t7=t8 are assumed in FIG. 58.

In FIG. 72, Car1 and Car2 are saw-tooth waves having the same amplitude and the same phase and having wave orientations reversed from each other. Car1+ and Car1 are saw-tooth waves having phases different from each other by 180 degrees, and Car2+ and Car2 are saw-tooth waves having phases different from each other by 180 degrees. An ON time ratio D2 for the second switching circuit 8 is the output of the proportional control (P control) 200 in FIG. 59(b), and the relationship between the ON time ratio D2 and an ON time ratio D1 for the first switching circuit 4 is represented by the following expression (4).

$$D1 = Dref - D2 \quad (4)$$

If the amplitude of the saw-tooth waves is set at 1, and 0.5<D1<1 and 0.5<D2<1 are satisfied, Dref is 1.5.

Here, from expression (4), temporally divided ON times can be allocated for the first switching circuit 4 and the second switching circuit 8, respectively. That is, the power supplying period of the first switching circuit 4 and the power supplying period of the second switching circuit 8 can be provided within one switching period which is the minimum repetitive period, and thus it becomes possible to supply power to the load device from both the AC power supply 1 and the first DC power supply 11 at the same time.

The PWM control unit 201b compares the ON time ratio D1 for the first switching circuit 4 with the saw-tooth wave Car1, and only when Car1 is higher than D1, outputs a High level to the gates, thereby calculating the gate signals for the switching elements 4a and 4d of the first switching circuit 4. Similarly, the PWM control unit 201b compares the ON time ratio D1 for the first switching circuit 4 with the saw-tooth wave Car1+, and only when Car1+ is higher than D1, outputs a High level to the gates, thereby calculating the gate signals for the switching elements 4b and 4c of the first switching circuit 4. Thus, the gate signals for the first switching circuit 4 can be calculated.

The PWM control unit 201a compares the ON time ratio D2 for the second switching circuit 8 with the saw-tooth wave Car2, and only when Car2 is higher than D2, outputs a High level to the gates, thereby calculating the gate signals for the switching elements 8b and 8c. Similarly, the PWM control unit 201a compares the ON time ratio D2 for the second switching circuit 8 with the saw-tooth wave Car2+, and only when Car2+ is higher than D2, outputs a High level to the gates, thereby calculating the gate signals for the switching elements 8a and 8d. Thus, calculation for the second switching circuit 8 can be performed.

As described above, by performing PWM control using saw-tooth waves synchronized in phases and amplitudes and having wave orientations reversed from each other, it becomes possible to perform power transmission in a temporally divided manner.

Figure 73:
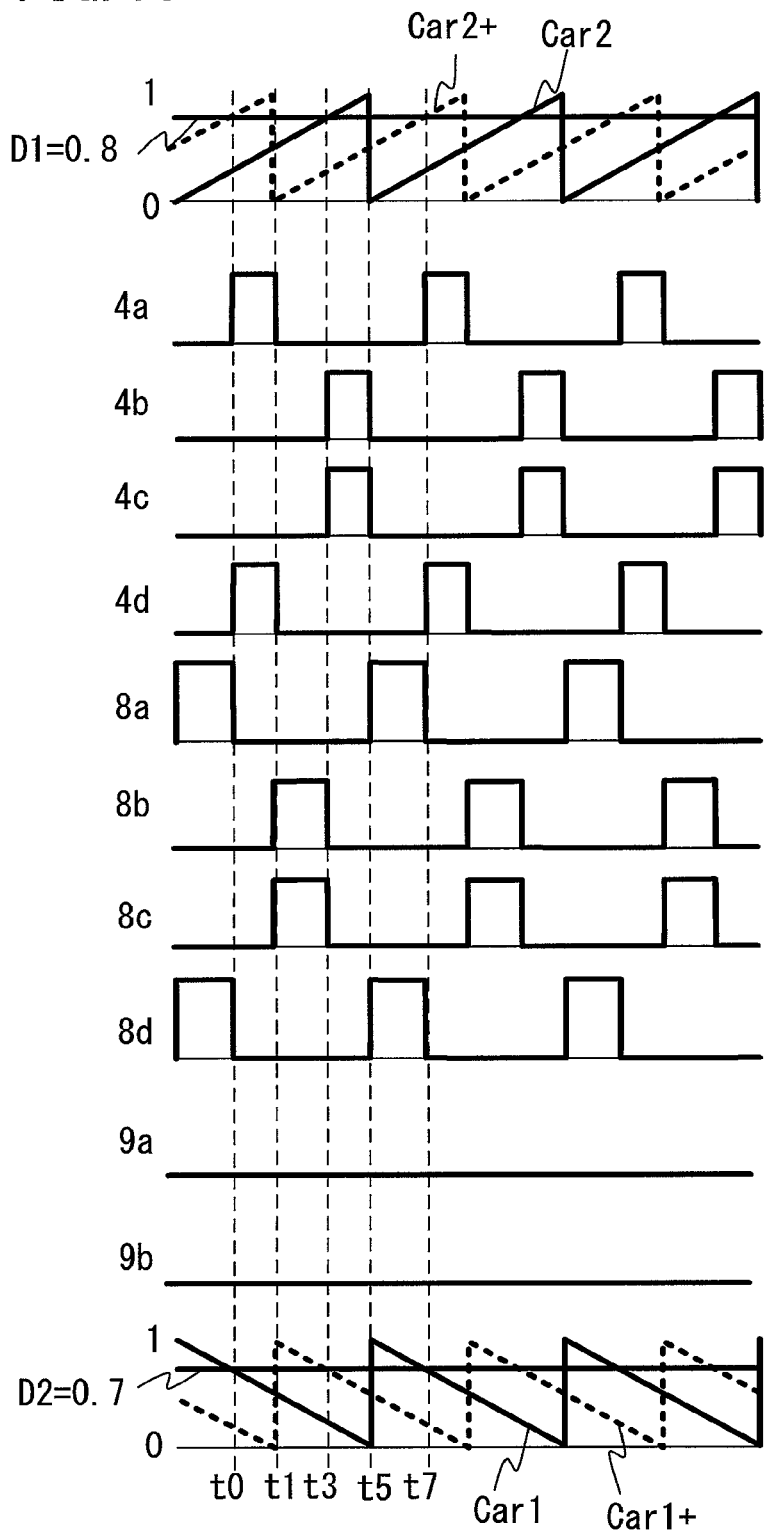
FIG. 73 is a diagram illustrating PWM control for calculating gate signals according to embodiment 5 of the present invention.

Similarly, as shown in FIG. 73, by comparing the saw-tooth waves Car2 and Car2+ with the ON time ratio D1 for the first switching circuit 4, the gate signals for the first switching circuit 4 are calculated. In addition, by comparing the saw-tooth waves Car1 and Car1+ with the ON time ratio D2 for the second switching circuit 8, the gate signals for the second switching circuit 8 are calculated. As a result, the gate signals shown in FIG. 49 as described in embodiment 2 can be calculated.

In addition, as shown in FIG. 59(b) and FIG. 61(b), by calculating the ON time ratio D2 from a deviation between the voltage detected value VL1 and the target value VL1* for the capacitor 3, the ratio between supply of power from the AC power supply 1 and supply of power from the first DC power supply 11 can be controlled and the voltage VL1 of the capacitor 3 can be stabilized.

Further, as shown in FIG. 61(b), by calculating Dref from a deviation between the detected value Vbat2 and the target value Vbat2* for voltage of the load (second DC power supply 34), power supplied to the load can be controlled.

In addition, in FIG. 61(b), by calculating Dref from a deviation between a current detected value Ibat2 and a target value Ibat2* for the load (second DC power supply 34), power supplied to the load can be controlled in the same manner as described above.

It is noted that the present invention is not limited to only the configurations described in the above embodiments 1 to 6, but without deviating the gist of the present invention, the configurations described in embodiments 1 to 6 may be combined with each other as appropriate or may be partially modified or partially omitted.

The invention claimed is:

1. An electric power conversion device comprising:
a transformer composed of three or more windings magnetically coupled with each other, power supply sources being connected to at least two of the three or more windings, a load being connected to at least one of the three or more windings;
a plurality of switching circuits via which the at least two of the three or more windings are respectively connected to the power supply sources; and
a control circuit for controlling the plurality of the switching circuits, wherein
the control circuit temporally divides, within one switching period, a total ON time during which power is supplied, in accordance with a number of the plurality of power supply sources to supply power, the one switching period being a repetitive period during which power is supplied alternately from the power supply sources, and the control circuit allocates temporally divided ON times to the plurality of the switching circuits connected to the power supply sources to supply power, respectively, and
the plurality of the switching circuits operate so as to supply power to a load side from the power supply sources connected to respective switching circuits, during respective ON times allocated by the control circuit.

2. The electric power conversion device according to claim 1, wherein the control circuit sets the total ON time to be constant.

3. The electric power conversion device according to claim 1, further comprising a detection circuit for detecting voltage or current on the load side to which power is supplied from the power supply sources, wherein
the control circuit calculates the total ON time on the basis of a preset target value and a detected value of the voltage or current on the load side detected by the detection circuit.

4. The electric power conversion device according to claim 1, wherein at least one of the power supply sources is an AC power supply,
the electric power conversion device further comprising a rectification circuit which is connected to the AC power supply and which converts AC power from the AC power supply to DC power to supply the DC power to the corresponding switching circuit.

5. The electric power conversion device according to claim 1, wherein at least one of the power supply sources is an AC power supply,
the electric power conversion device further comprising a power factor conversion circuit which is connected to the AC power supply and which controls a power factor of voltage and current of the AC power supply and converts AC power from the AC power supply to DC power to supply the DC power to the corresponding switching circuit.

6. The electric power conversion device according to claim 1, wherein at least one of the power supply sources is a DC power supply.

7. The electric power conversion device according to claim 1, further comprising a rectification circuit for rectifying voltage occurring on a corresponding winding of the transformer, wherein
the load is a load device which receives power supplied via the rectification circuit.

8. The electric power conversion device according to claim 1, further comprising a fourth switching circuit for rectifying voltage occurring on a corresponding winding of the transformer and for controlling voltage or current, wherein
the load is a load device which receives power supplied via the fourth switching circuit.

9. The electric power conversion device according to claim 1, wherein a load is connected to a connection line between at least one of the plurality of the power supply sources and the switching circuit connected to at least one of the plurality of power supply sources.

10. The electric power conversion device according to claim 1, wherein, of the power supply sources connected to the at least two of the three or more windings, one power supply source is an AC power supply,
the electric power conversion device further comprising:
a rectification circuit for converting AC power from the AC power supply to DC power; and a capacitor for smoothing output voltage from the rectification circuit, wherein
the switching circuit connected to the one power supply source is a first switching circuit for converting DC voltage smoothed by the capacitor to AC voltage,
another power supply source is a DC power supply,
the switching circuit connected to the another power supply source is a second switching circuit for converting DC power from the DC power supply to AC power, and
the control circuit divides the total ON time within the one switching period into a first power transmission period during which the first switching circuit performs power transmission and a second power transmission period during which the second switching circuit performs power transmission,
the electric power conversion device further comprising a voltage detection unit for detecting voltage of the capacitor, wherein
the control circuit controls ratios of the first power transmission period and the second power transmission period with respect to the total ON time, on the basis of a deviation between a detected value by the voltage detection unit and a preset target value.

11. The electric power conversion device according to claim 1, wherein, of the power supply sources connected to the at least two of the three or more windings, one power supply source is an AC power supply,
the electric power conversion device further comprising:
a power factor conversion circuit for controlling a power factor of voltage and current of the AC power supply and for converting AC power from the AC power supply to DC power; and a capacitor for smoothing output voltage from the power factor conversion circuit, wherein
the switching circuit connected to the one power supply source is a first switching circuit for converting DC voltage smoothed by the capacitor to AC voltage,
another power supply source is a DC power supply,
the switching circuit connected to the another power supply source is a second switching circuit for converting DC power from the DC power supply to AC power, and
the control circuit divides the total ON time within the one switching period into a first power transmission period during which the first switching circuit performs power transmission and a second power transmission period during which the second switching circuit performs power transmission,
the electric power conversion device further comprising a voltage detection unit for detecting voltage of the capacitor, wherein
the control circuit controls ratios of the first power transmission period and the second power transmission period with respect to the total ON time, on the basis of a deviation between a detected value by the voltage detection unit and a preset target value.

12. The electric power conversion device according to claim 10, wherein
the second switching circuit is capable of bidirectional power transmission and is configured in a bridge form using a switching element and a diode connected in antiparallel to the switching element, and
the second switching circuit has a function of, when transmitting power to the power supply source connected to the second switching circuit, stepping up voltage of the power.

13. The electric power conversion device according to claim 10, wherein the second switching circuit is capable of bidirectional power transmission and is configured in a bridge form using a switching element and a diode connected in antiparallel to the switching element,
the electric power conversion device further comprising a DC/DC converter between the second switching circuit and the power supply source connected to the second switching circuit.

14. The electric power conversion device according to claim 10, wherein
the control circuit calculates the ratios of the first power transmission period and the second power transmission period with respect to the total ON time on the basis of a deviation between a voltage detected value and a voltage target value for the capacitor,
a first saw-tooth wave linearly increasing during the one switching period, a second saw-tooth wave having a phase different by 180 degrees with respect to a switching cycle from that of the first saw-tooth wave, a third saw-tooth wave linearly decreasing during the one switching period and having a phase and an amplitude equal to those of the first saw-tooth wave, and a fourth saw-tooth wave having a phase different by 180 degrees from that of the third saw-tooth wave, are generated,
a first control unit for comparing each of the first saw-tooth wave and the second saw-tooth wave with a corresponding ratio, and a second control unit for comparing each of the third saw-tooth wave and the fourth saw-tooth wave with a corresponding ratio, are provided, and
a gate signal for the first switching circuit is calculated by the first control unit, and a gate signal for the second switching circuit is calculated by the second control unit.

15. The electric power conversion device according to claim 10, wherein the control circuit calculates the ratios of the first power transmission period and the second power transmission period with respect to the total ON time on the basis of a deviation between a voltage detected value and a voltage target value for the capacitor, a first saw-tooth wave linearly decreasing during the one switching period, a second saw-tooth wave having a phase different by 180 degrees with respect to a switching cycle from that of the first saw-tooth wave, a third saw-tooth wave linearly increasing during the one switching period and having a phase and an amplitude equal to those of the first saw-tooth wave, and a fourth saw-tooth wave having a phase different by 180 degrees from that of the third saw-tooth wave, are generated, a first control unit for comparing each of the first saw-tooth wave and the second saw-tooth wave with a corresponding ratio, and a second control unit for comparing each of the third saw-tooth wave and the fourth saw-tooth wave with a corresponding ratio, are provided, and a gate signal for the first switching circuit is calculated by the first control unit, and a gate signal for the second switching circuit is calculated by the second control unit.

16. The electric power conversion device according to claim 11, wherein the second switching circuit is capable of bidirectional power transmission and is configured in a bridge form using a switching element and a diode connected in antiparallel to the switching element, and the second switching circuit has a function of, when transmitting power to the power supply source connected to the second switching circuit, stepping up voltage of the power.

17. The electric power conversion device according to claim 11, wherein the second switching circuit is capable of bidirectional power transmission and is configured in a bridge form using a switching element and a diode connected in antiparallel to the switching element, the electric power conversion device further comprising a DC/DC converter between the second switching circuit and the power supply source connected to the second switching circuit.

18. The electric power conversion device according to claim 11, wherein the control circuit calculates the ratios of the first power transmission period and the second power transmission period with respect to the total ON time on the basis of a deviation between a voltage detected value and a voltage target value for the capacitor, a first saw-tooth wave linearly increasing during the one switching period, a second saw-tooth wave having a phase different by 180 degrees with respect to a switching cycle from that of the first saw-tooth wave, a third saw-tooth wave linearly decreasing during the one switching period and having a phase and an amplitude equal to those of the first saw-tooth wave, and a fourth saw-tooth wave having a phase different by 180 degrees from that of the third saw-tooth wave, are generated, a first control unit for comparing each of the first saw-tooth wave and the second saw-tooth wave with a corresponding ratio, and a second control unit for comparing each of the third saw-tooth wave and the fourth saw-tooth wave with a corresponding ratio, are provided, and a gate signal for the first switching circuit is calculated by the first control unit, and a gate signal for the second switching circuit is calculated by the second control unit.

19. The electric power conversion device according to claim 11, wherein the control circuit calculates the ratios of the first power transmission period and the second power transmission period with respect to the total ON time on the basis of a deviation between a voltage detected value and a voltage target value for the capacitor, a first saw-tooth wave linearly decreasing during the one switching period, a second saw-tooth wave having a phase different by 180 degrees with respect to a switching cycle from that of the first saw-tooth wave, a third saw-tooth wave linearly increasing during the one switching period and having a phase and an amplitude equal to those of the first saw-tooth wave, and a fourth saw-tooth wave having a phase different by 180 degrees from that of the third saw-tooth wave, are generated, a first control unit for comparing each of the first saw-tooth wave and the second saw-tooth wave with a corresponding ratio, and a second control unit for comparing each of the third saw-tooth wave and the fourth saw-tooth wave with a corresponding ratio, are provided, and a gate signal for the first switching circuit is calculated by the first control unit, and a gate signal for the second switching circuit is calculated by the second control unit.

* * * * *